US008589861B2

(12) United States Patent
Lovisa et al.

(10) Patent No.: US 8,589,861 B2
(45) Date of Patent: Nov. 19, 2013

(54) CODE GENERATION

(75) Inventors: Noel William Lovisa, Annadale (AU); Eric Phillip Lawrey, Townsville (AU)

(73) Assignee: Code Valley Corp Pty Ltd, Townsville, Queensland (AU)

( * ) Notice: Subject to any disclaimer, the term of this patent is extended or adjusted under 35 U.S.C. 154(b) by 1220 days.

(21) Appl. No.: 10/533,578

(22) PCT Filed: Nov. 6, 2003

(86) PCT No.: PCT/AU03/01474
§ 371 (c)(1),
(2), (4) Date: Feb. 3, 2006

(87) PCT Pub. No.: WO2004/042639
PCT Pub. Date: May 21, 2004

(65) Prior Publication Data
US 2006/0161888 A1      Jul. 20, 2006

Related U.S. Application Data

(60) Provisional application No. 60/424,859, filed on Nov. 8, 2002.

(30) Foreign Application Priority Data

Nov. 6, 2002  (AU) ................................. 2002952510
Apr. 22, 2003  (AU) ................................. 2003901926

(51) Int. Cl.
*G06F 9/44*       (2006.01)
(52) U.S. Cl.
USPC ........................................................ 717/103

(58) Field of Classification Search
USPC ......... 717/100, 104, 103; 705/7, 26; 709/209, 709/206; 707/200; 358/3.28; 700/1; 719/310; 345/435
See application file for complete search history.

(56) References Cited

U.S. PATENT DOCUMENTS

| 5,867,707 | A |   | 2/1999 | Nishida et al. |
| 5,913,061 | A | * | 6/1999 | Gupta et al. .................. 719/310 |
| 6,014,147 | A | * | 1/2000 | Politis et al. .................. 345/620 |

(Continued)

FOREIGN PATENT DOCUMENTS

| EP | 0817032 A2  | 1/1998 |
| EP | 1 211 598 A1 | 6/2002 |

(Continued)

OTHER PUBLICATIONS

Kebbal D. et al., Component Search Service and Deployment of Distributed Applications, Distributed Objects and Applications, 3rd International Symposium on Sep. 17-20, 2001, Piscataway, NJ.

(Continued)

*Primary Examiner* — Tuan A Vu
(74) *Attorney, Agent, or Firm* — Arent Fox LLP; John D. Harriman

(57) ABSTRACT

The present invention provides a method of generating computer executable code using components, each of which corresponds to a respective data manipulation service, typically implemented by a respective entity. The method includes defining a combination of components corresponding to a sequence of data manipulations. The data manipulations are then performed, which can be achieved by requesting the provision of each service from the respective entities in accordance with the defined component combination, thereby causing computer executable code to be generated.

8 Claims, 45 Drawing Sheets

(56) References Cited

U.S. PATENT DOCUMENTS

| | | | |
|---|---|---|---|
| 6,189,138 B1 | 2/2001 | Fowlow et al. | |
| 6,226,692 B1 | 5/2001 | Miloushev et al. | |
| 6,256,771 B1 * | 7/2001 | O'Neil et al. | 717/100 |
| 6,401,114 B1 | 6/2002 | Jenkins | |
| 6,405,361 B1 | 6/2002 | Broy et al. | |
| 6,721,747 B2 * | 4/2004 | Lipkin | 709/209 |
| 6,973,638 B1 * | 12/2005 | Gangopadhyay et al. | 717/104 |
| 7,139,728 B2 * | 11/2006 | Rigole | 705/26 |
| 7,154,638 B1 * | 12/2006 | Lapstun et al. | 358/3.28 |
| 2001/0056362 A1 * | 12/2001 | Hanagan et al. | 705/7 |
| 2002/0047865 A1 | 4/2002 | Bozionek et al. | |
| 2002/0055956 A1 | 5/2002 | Krasnoiarov | |
| 2002/0060566 A1 | 5/2002 | Debbins et al. | |
| 2002/0138582 A1 * | 9/2002 | Chandra et al. | 709/206 |
| 2003/0060896 A9 * | 3/2003 | Hulai et al. | 700/1 |
| 2003/0158915 A1 | 8/2003 | Gebhart | |
| 2004/0117759 A1 * | 6/2004 | Rippert et al. | 717/100 |
| 2004/0215665 A1 * | 10/2004 | Edgar et al. | 707/200 |
| 2005/0010454 A1 * | 1/2005 | Falk et al. | 705/4 |

FOREIGN PATENT DOCUMENTS

| | | |
|---|---|---|
| EP | 1246054 A1 | 10/2002 |
| WO | WO02069086 A2 | 9/2002 |
| WO | WO2004042639 A1 | 5/2004 |

OTHER PUBLICATIONS

H.R. Frost and M.R. Cutkosky: "Design for manufacturability via agent interaction" Proceedings of the 1996 ASME Design Engineering Technical Conferences and Computers in Engineering Conference [Online] Aug. 1996, pp. 1-12.

Kebbal et al., "Component Search Service and Deployment of Distributed Applications" Proceedings of IEEE 3rd International Symposium, pp. 125-134, Sep. 17, 2001.

Partial European search report dated Mar. 26, 2012 issued in corresponding European application 11175802.5.

* cited by examiner

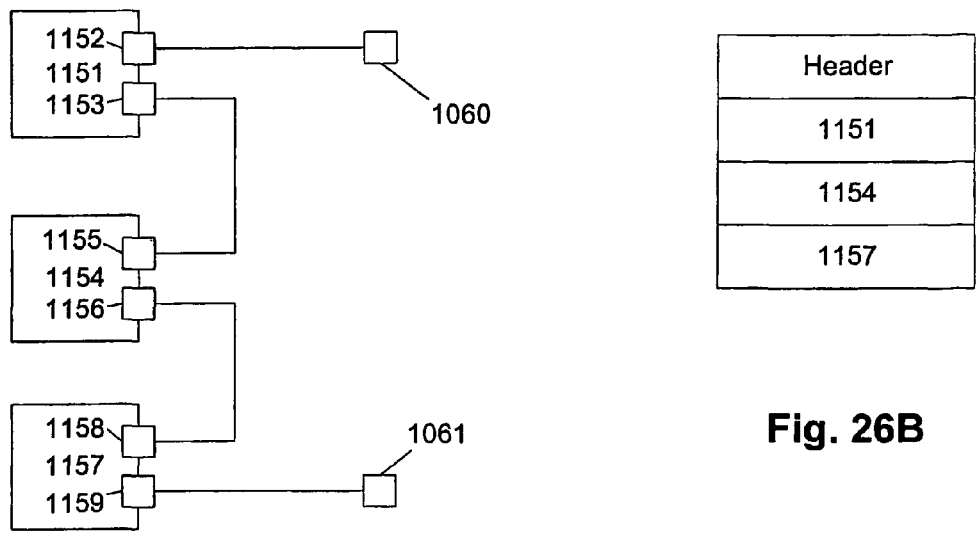
Fig. 26A
Fig. 26B
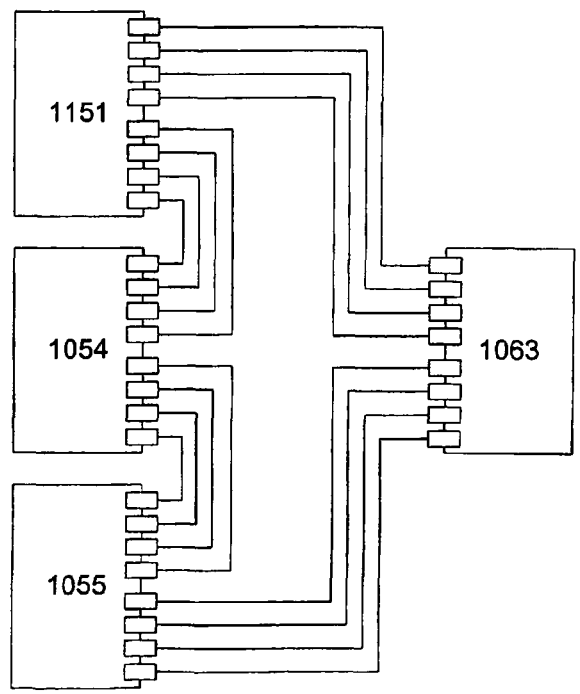
Fig. 26C

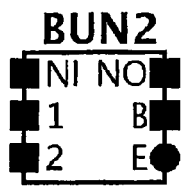
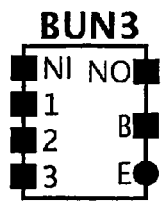
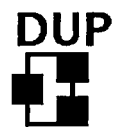
Fig. 31A  Fig. 31B  Fig. 31C  Fig. 31D
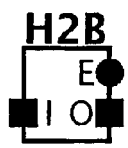
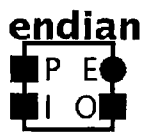
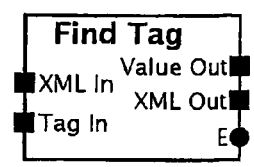
Fig. 31E  Fig. 31F  Fig. 31G  Fig. 31H
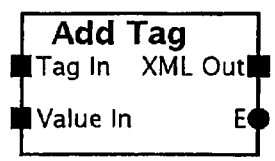
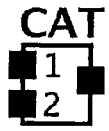
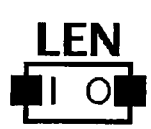
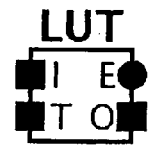
Fig. 31I  Fig. 31J  Fig. 31K  Fig. 31L
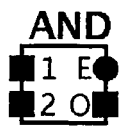
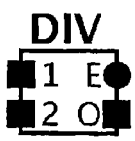
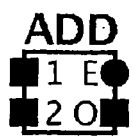
Fig. 31M  Fig. 31N  Fig. 31O  Fig. 31P Fig. 37B                    Fig. 37C

CODE GENERATION

CROSS-REFERENCE TO RELATED APPLICATIONS

This application is a U.S. National Stage of International Application No. PCT/AU2003/001474 filed Nov. 6, 2003, which claims priority to U.S. Provisional Application No. 60/424,859 filed Nov. 8, 2002, Australian Application No. 2002952510 filed Nov. 6, 2002, and Australian Application No. 2003901926 filed Apr. 22, 2003, all herein incorporated by reference in their entirety.

BACKGROUND OF THE INVENTION

The present invention relates to a method and apparatus for generating computer executable code, and in particular, to generating computer executable code using components, each of which corresponds to a respective service for manipulating data.

DESCRIPTION OF THE PRIOR ART

The reference to any prior art in this specification is not, and should not be taken as, an acknowledgment or any form of suggestion that the prior art forms part of the common general knowledge.

It is clear that software is developed in a competitive environment but history has detailed a flat productivity curve over the last thirty years. Any gains are insignificant compared to what has been achieved in other industries over the same period. This disparity is unique to the software industry and is a direct result of how software is constructed.

The majority of computer software is constructed through a manual process, utilising programmers to generate code for respective applications software projects. Each software application will generally be created using one or more programmers, to create the software application on a case-by-case basis, with little or no code reuse.

One of the reasons behind this is that typically only a limited number of entities (typically one company), which will invest in the development of any one software application. As a result, entities are generally unwilling to invest more than necessary in the development of software code. This means that once a functioning application is developed, little money and effort is invested in optimising the code forming the application.

Other reasons include:
Initially favouring an in-house model of development over a more difficult distributed model, which thereby required increased generalisation of limited resources.
Introduction of the Library/Linker, which established standard routines for performing predetermined functions, thereby reducing competitiveness and optimisation; and
The prevailing view of the very nature of software production, which requires customers to accept limits imposed on them by the programmers.

As a result of this, programmers have to be generalists that are capable of programming software to perform a wide range of functionality, allowing them to compete in the market place as it stands. Thus, it will be appreciated that in the current software programming environment, there is little call for a programmer that is very good at only one very minor programming task, when generalists are available that can adequately code entire programs.

This lack of specialisation leads to a number of problems in the field of software creation, including for example:

Bugs or mistakes—high levels of software defects;
Software bloating—significantly increasing size of executable code;
Complexity limits—growing software complexity threatens the ability of systems to be effectively maintained in a stable state; and,
Low barrier to entry.
Unpredictability—there is an inability to predict development costs, schedules, performance or resource usage
Productivity—there have been no significant gains in developer productivity in the past decade Bugs and mistakes arise, to a large extent, due to the large amounts of code each programmer must write. This has a number of problems such as limiting the amount of time the programmer can physically spend writing the code and increasing the number of variables the programmer must consider. Bugs are an extensive problem within the current software programming techniques. The result of this is additional time has been spent in correcting bugs and mistakes that arise, through the use of software patches, or upgrades, as well as correcting other after effects, such as damage caused by viruses, or the like.

Software bloating is another effect associated with the lack of specialisation within the programming field. As with any generalist, refining a product comes at the expense of productivity. In particular, a programmer may be able to construct a functioning program relatively quickly. However, optimising the code to minimise the code quantity, whilst improving operation can take a long time for only minimal improvements. The programmer's skill at optimising would generally also be rudimentary given the individual's knowledge is spread over many fields and similarly the coder gets paid by getting the product on the market. The result is a requirement for more powerful machines to handle the unnecessary size and complexity of modern software.

The complexity limit arises due to the fact that as the level of complexity rises, it becomes impossible for one person to understand all aspects of a particular software development effort. Most industries that have become highly specialised can field large complex projects whereas software development has not reached, let alone attained, any degree of specialisation.

In general, any industry has a barrier to entry that is proportional to its maturity. Well-developed industries like semiconductors have considerable barriers that even nations baulk at tackling. A feature of industrialisation is the large amounts of capital that are required to set up a business. However, in the case of more basic industries, such as craft industries, it is possible for anyone to enter the industry with dedication and a modest outlay, and achieve best practice. This is an indication that the software industry is undeveloped, as it has a minimal barrier to entry.

A number of subtle IT industry quirks have also contributed to this crisis:
Dysfunctional IP protection for software developers
Continued use of x86 architecture in the face of superior technologies
Customer acceptance of software errors or flaws
Increasing implementation complexity in attempts to deal with the software crisis (including reuse of code from code libraries, seeking compatibility with the shortfalls of legacy operating systems)

The effects of these problems are endemic within the software field. Studies have shown that "for every six, new, large-scale software systems that are put into operation, two others are cancelled. Indeed so severe is this software crisis that three quarters of large-scale systems commissioned are operating failures", either they do not function as intended or they are not used at all.

A committee consisting of over 50 top programmers, computer scientists and industry leaders first addressed this problem at the 1968 NATO Science Meeting. This Committee was given the task of finding a way out of the "software crisis".

A number of attempts have been made to solve the problems, including:

Development of 3rd, 4th and 5th Generation Languages, which seek to abstract the programmer away from machine code, are responsible for some of the early successes in productivity. So successful was the early productivity increases that languages continue today as the main thrust in the quest for productivity improvement.

Object Oriented Programming, a new type of abstraction encapsulating data with code used to process that data, is achieving limited success mainly through controlling complexity.

Computer Aided Software Engineering (CASE), which seeks to assist in managing the complexity of large software development.

Code Reuse, which is an effort to reuse previous intellectual endeavour.

Formal Methods, which use mathematical proofs to verify correctness and to acutely address the large numbers of defects and bugs synonymous with software development.

Decompilers that extract intellectual content from historical code.

Despite these initiatives however, little headway is being made in improving software production.

In particular, there remains little specialisation within the industry, with the majority of software applications being generated on a case by case basis, by a limited number of programmers. Accordingly, methods like 3rd, 4th, 5th GLs, OOP, CASE, Formal Methods, Decompilers and countless others do not address the problem but only the symptoms.

It can therefore be seen that thirty years after the NATO conference only minimal progress if any has been made, and "the vast majority of computer code is still hand-crafted from raw programming languages by artisans using techniques they neither measure nor are able to repeat consistently".

In circumstances where code reuse is attempted, this is generally achieved by making the code context independent so that the code may be deployed in any operating environment, and in any set of circumstances. This leads to a significant number of problems and in particular results in the code requiring a large number of commands and operations that are redundant in most cases. In addition to this, the formation of context independent code prevents, or at least substantially hampers the ability of code generators to protect their code through the use of suitable IP Protection.

One example of an existing system which attempts to overcome the problems outlined above is described in U.S. Pat. No. 6,405,361 which provides a method, apparatus and computer program product for automatically generating state based computer programs. The system operates by utilising a plurality of components which communicate with each other to generate a program based on interactions between sequence descriptions. In this example, all sequence descriptions are determined, normalised and used to determine a state based specification of the component. The state based program for the component is determined from the specification allowing the program to be generated.

However, this system addresses only one specific scenario of computer program generation and in particular only relates to state based systems. Furthermore, the system operates by taking individual state diagrams describing a communications system and transforming these diagrams into a state diagram and then into code. Accordingly, the effect of this is that the system operates to translate a diagram into code. The system does not allow general applications software to be developed and uses context independent code, resulting in many of the problems previously outlined.

EP-1,211,598 describes a method for generating executable code by translating high level code into instructions for one of a plurality of target processors. The system operates by selecting one or more predefined program code modules from a plurality of available modules in accordance with desired program characteristics. The program code for translating the high level code into instructions is then used to form the program code.

Thus the system allows for the generation of virtual Java for a variety of hardware platforms. The core of a system is the use of a module chooser which simply chooses available modules which are then combined before being compiled and assembled in the normal way.

This document therefore relates to a way of selecting code portions and then combining these to form the resulting code. This therefore requires that the code is initially written by programmers in the normal way and then simply cut and pasted together to form the final code. This is therefore only relevant in specific circumstances and prior to operation requires the formation of suitable source code portions. This therefore relies on context independent code and suffers from many of the disadvantages outlined above.

In 1999, Associate Professor Clemens Szyperski from the Faculty of Information Technology at Queensland University of Technology, Brisbane, Australia has published a book "Component Software", which set out some desirable features that would be useful in achieving industrialisation of computer software. However, this did not propose any implementable solution to overcoming the problems outlined above.

SUMMARY OF THE PRESENT INVENTION

In a first broad form the present invention provides a method of generating code using components, each component corresponding to a respective data manipulation service, the method including:
  a) Determining a combination of components that defines the code; and,
  b) Implementing the component combination to thereby perform the defined sequence of data manipulations, such that the computer executable code is generated.

Typically at least some of the components include one or more ports for receiving and/or outputting data to be manipulated.

Each port preferably has an associated agent adapted to control transfer of data to and from the component.

The method including having the component:
  a) Receive data including a number of data portions;
  b) Manipulate the data by:
    i) Adding data portions into the sequence at a predetermined location;
    ii) Moving data portions from a first location to a second location within the sequence;
    iii) Removing data portions from the sequence; and,
    iv) Modifying data portions in the sequence.

Typically at least a portion of the method is performed using a processing system including a store, the method including storing one or more of the data portions in the store.

Some of the components may be formed from a number of combined sub-components, the sub-components also being components.

One or more of the services may be performed using at least one of:
  a) Manual manipulation of the data by an individual;
  b) Computer executable code adapted to be executed by a processing system, to thereby manipulate of the data automatically; and,
  c) Combinations of sub-components.

The method can be performed using one or more processing systems.

In this case, the method preferably includes causing a first processing system to:
  a) Select a number of components in response to input commands received from a user;
  b) Define the component combination using the selected components; and,
  c) Cause the component combination to be implemented such that the defined sequence of data manipulations is performed.

If at least some of the components include one or more ports, the method preferably includes causing the processing system to:
  a) Provide an indication of the ports of each selected component to the user, and,
  b) Interconnect selected ones of the ports in response to input commands from the user to thereby define the component combination.

The method usually includes causing a second processing system to:
  a) Determine details of a number of components;
  b) Provide at least an indication of the details to the user via the first processing system.

In this case, the method can include causing the processing system to:
  a) Select respective ones of the components in response to input commands from the user, and,
  b) Provide the details of the selected components to the user via the first processing system.

The details are typically in the form of component specifications, the processing system including:
  a) A store for storing the component specifications including at least one of:
    i) An indication of the manipulation service;
    ii) A graphical representation of the component; and,
    iii) Port specifications defining the operation of the agents associated with each port; and,
  b) A processor, the method typically including causing the processor to:
    i) Obtain one or more component specifications from the store; and,
    ii) Provide the component specifications to the user via the first processing system.

The method may include causing the first processing system to:
  a) Generate a graphical representation of the one or more selected components; and,
  b) Manipulate the graphical representation in response to input commands received from a user to thereby define the component combination.

The first processing system can be coupled to one or more component processing systems via a communications network each component processing system being adapted to implement one or more respective components, in which case the method preferably includes:
  a) Generating an service request for each component in the component combination; and,
  b) Transferring the service request to each entity via the communications network, each entity being adapted to respond to the service request to implement the data manipulation embodied by the respective component.

The method typically includes:
  a) Determining any data required by the components; and,
  b) Providing the data in the service request.

Each service request may include an indication of the interconnections for each of the ports of the respective component.

The method can include causing each component processing system to:
  a) Implement one or more respective component instances in accordance with the received service request; and,
  b) Cause each component instance to:
    i) Interact with other components in accordance with the interconnections defined n the service request; and,
    ii) Perform any required data manipulations.

The method may include causing each component processing system to:
  a) Implement a respective agent associated with each port; and,
  b) Cause each agent to cooperate with an agent of another component in accordance with the defined interconnections, to thereby allow data to be transferred between the ports.

The method preferably includes causing the second processing system to:
  a) Determine performance information, the performance information being representative of one or more criteria regarding the implementation of the components;
  b) Provide the performance information to a user, the user selecting the components in accordance with the performance information.

The performance information generally includes at least one of:
  a) An indication of the entity implementing the component;
  b) An indication of the geographical location of the entity;
  c) An indication of the duration for implementing the component;
  d) An indication of a cost associated with implementing the respective component; and,
  e) A rating, the rating being indicative of the success of the component.

The method preferably includes:
  a) Providing a number of different components for performing equivalent services, the different components being provided by different entities; and,
  b) Inducing competition between the entities to thereby drive improvement of the components.

The method typically includes generating revenue by charging a cost for the use of each component.

The method typically includes:
  a) Providing at least some of the revenue to a respective entity implementing the component; and,
  b) Having the operator of the second processing system retain at least some of the revenue.

The method typically includes causing the generated code to be context dependent.

In this case, the method typically includes causing at least some of the components to:
  a) Determine a context for the executable code; and for the processing system; and, b) Perform the data manipulation service in accordance with the determined context such that the performed data manipulation is dependent on the context.

The processing system typically includes at least a memory, stack and registers, the context including at least one of:
 a) The state of at least one of the registers, stack and memory;
 b) Other components in the defined component combination; and,
 c) Random factors.

The method generally includes making the data manipulation context dependent by at least one of:
 a) Dithering;
 b) Meshing; and,
 c) Obscuring.

In a second broad form the present invention provides apparatus for generating computer executable code using components, each component corresponding to a respective service for manipulating data in a predetermined manner, the apparatus including one or more processing systems adapted to:
 a) Define a combination of components corresponding to a sequence of data manipulations; and,
 b) Implement the component combination to thereby perform the defined sequence of data manipulations, such that the computer executable code is generated.

The apparatus preferably includes:
 a) One or more component processing systems, each component processing system being adapted to implement a respective component; and,
 b) A first processing system, the first processing system being adapted to:
  i) Define the component combination in accordance with input commands received from a user; and,
  ii) Determine the component processing systems implementing the respective components; and
  iii) Transfer service requests to each of the determined component processing systems.

The component processing system can be adapted to:
 a) Receive the service request;
 b) Generate a respective component instance; and,
 c) Perform the service using the respective component instance.

The apparatus typically includes a second processing system adapted to store details of available components.

In this case, the second processing system can be adapted to obtain the details of a component from a respective component processing system.

The first processing system may be adapted to cooperate with the second processing system to thereby allow a user to:
 a) Select one or more of the available components; and
 b) Define the component combination.

Preferably the apparatus is adapted to perform the method of any one of the first broad form of the invention.

In a third broad form the present invention provides a computer program product for generating computer executable code using components, each component corresponding to a respective service for manipulating data in a predetermined manner, the computer program product including computer executable code which when executed on a suitable processing system causes the processing system to perform the method of the first broad form of the invention.

In a fourth broad form the present invention provides a method of allowing users to manipulate data, the method including using one or more processing systems to:
 a) Store details of a number of components, each component representing a respective data manipulation service implemented by a respective entity; and,
 b) Provide details of selected components to users, thereby allowing the users to define a component combination defining a sequence of data manipulation services for manipulating the data.

In a fifth broad form the present invention provides a method of providing a component embodying a data manipulation service using a processing system, the method including:
 a) Determining a data manipulation service to be performed;
 b) Determining a method of performing the data manipulation service; and,
 c) Generating a component specification defining the data manipulation service, the component specification including ports specifications representing ports used for receiving or outputting data.

In a sixth broad form the present invention provides a method of providing a service embodied in a component using a processing system, the method including causing the processing system to:
 a) Receive a service request;
 b) Generate a respective component instance in response to the received service request;
 c) Receive data to be manipulated;
 d) Manipulate the data using the respective component instance; and,
 e) Supply the manipulated data to an output.

In a seventh broad form the present invention provides a method of manipulating data by implementing a defined combination of components, each component corresponding to a respective service for manipulating data, the method including:
 a) Determining from the component combination:
  i) The components to be implemented;
  ii) Connections between ports of respective ones of the components;
 b) Any data required by the components;
 c) For each component:
 d) Generate a service request, requesting the provision of the respective service;
 e) Transfer the service request to an entity implementing the respective component, the entity being responsive to the service request to perform the respective service thereby allowing the data manipulations to be performed.

In an eighth broad form the present invention provides a method of defining a component combination using a processing system, each component representing a respective service for manipulating data, the method including:
 a) Selecting one or more components to be combined; and,
 b) Causing the processing system to:
  i) Generate a graphical representation of each selected component on a display, and,
  ii) Manipulate the graphical representation to define connections between ports of the components.

In a ninth broad form the present invention provides a method of performing context dependent data manipulations, the method including:
 a) Determining a number of techniques for performing a desired data manipulation;
 b) Defining a component embodying each of the determined techniques; and, c) In use, performing a selected one of the techniques in accordance with the context, such that the resulting manipulated data is dependent on the context.

In a tenth broad form the present invention provides a method of implementing an agent for use in component based data manipulation, the method including:
a) Receiving an agent indication;
b) Generating an agent; and,
c) Causing the agent to establish a connection with another agent in accordance with the agent indication.

In an eleventh broad form the present invention provides a method of providing a dynamic component for providing data manipulation services, the method including:
a) Determining a service to be performed;
b) Determining at least two methods of performing the service;
c) Determining a method of selecting one of the methods in accordance with received data; and,
d) Generating a component specification defining a component embodying the data manipulation service.

In a twelfth broad form the present invention provides a method of providing a service embodied in a dynamic component using a processing system, the method including causing the processing system to:
a) Receive a service request;
b) Generate a respective component instance in response to the received service request;
c) Receive data to be manipulated;
d) Select a method of manipulating the data in accordance with the received data;
e) Manipulate the data using the respective component instance; and,
f) Supply the manipulated data to an output.

In a thirteenth broad form the present invention provides a method of providing connections for a number of agents between two respective components in a component based data manipulation scheme, the method including:
a) Providing a bundling sub-component in each component; and,
b) Defining a connection between:
  i) First agents of the bundling sub-component and respective agents of the respective component; and,
  ii) A second agent of each bundling sub-component.

In a fourteenth broad form the present invention provides a method of constructing code using a root processing system and a number of component processing systems, each component processing system being adapted to implement a respective component defined in a schematic, the method including:
a) Causing the root processing system to generate an agent including a payload;
b) Transferring the agent to a number of components in sequence from a last component to a first component;
c) Causing the first component to interact with the agent to provide data in the payload;
d) Transferring the agent from the first component to the next component;
e) Causing the next component to interact with the agent to provide data in the payload;
f) Repeating steps (d) and (e) until the last component has interacted with the payload; and,
g) Transferring the agent to the root processing system, to thereby provide code.

In a fifteenth broad form the present invention provides a method of allowing users to manipulate data, the method including:

a) Providing details of a number of components, each component representing a respective data manipulation service implemented by a respective entity;
b) Allowing users to define a component combination defining a sequence of data manipulation services; and,
c) Causing the data manipulation services to be performed in accordance with the defined combination.

The present invention also provides apparatus and a computer program product for performing the broad forms of the invention.

BRIEF DESCRIPTION OF THE DRAWINGS

An example of the present invention will now be described with reference to the accompanying drawings, in which:

FIGS. 26A to 26G are examples of the use of chaining,

FIG. 37A to 37E are examples of internal schematics of an assign component;

DETAILED DESCRIPTION OF THE PREFERRED EMBODIMENTS

A number of examples of systems for combining formalised data manipulation services to allow code to be constructed at the byte level will now be described.

In particular, the systems utilise specific and ultimately highly specialised data manipulation services that are embodied as components. In general each component is adapted to receive and output data via one or more respective ports.

Combining these components in an appropriate fashion allows bytes to be inserted into a file which when completed represents code for use with a processing system. In general, the file is a binary file such that when completed it represents executable code. The resulting executable code can therefore represent applications software or the like. However, other forms of code can be generated such as source code, object code or linked code. This allows middleware applications such as Java applications to be generated. This allows computer executable code to be formed without the requirement for source codes, compilers, or the like.

The manner in which this is achieved will now be described in more detail.

Figure 1:
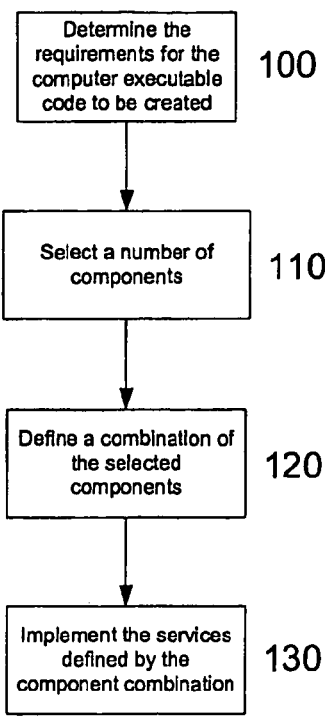
FIG. 1 is a flow diagram outlining an example of the production of software in accordance with the present invention.

An example of the process for producing computer executable code will now be described in outline with reference to FIG. 1.

As shown, the first step is to determine the requirements for the computer executable code to be created at step 100. This is achieved by considering the functionality that needs to be implemented by the resulting computer executable code, as will be explained in more detail below.

Once the desired functionality has been determined, a number of components are selected that when combined in an appropriate manner will allow executable code having this functionality to be created. In this regard, each component embodies a respective service for manipulating data, and combining components in a suitable sequence therefore allows computer executable code to be produced. Thus, for example, the services can include processes such as the modification, removal, movement or creation of data. This allows each component to contribute in some way to the formation of the computer executable code. The services may be performed automatically through the use of computer executable code, or the like. Alternatively the services may be performed manually, or through combination of manual and automatic implementation.

The level of complexity of the component services will vary as will be explained in more detail below. Thus, for example, simple components may operate to erect one or more bytes in a binary file, which are then, used in forming CPU instructions, whereas more complex components may operate to erect several CPU instructions simultaneously.

In order to achieve this, each component is adapted to receive data via one or more ports as acting as respective inputs, and then perform manipulations of the data as required. Similarly, the majority of components will also include one or more ports adapted to act as outputs for allowing manipulated data, or other information to be output. The ports will generally be referred to as inputs and outputs for ease of description, although it will be appreciated that generally ports are bi-directional, and are adapted to transfer data to or receive data from a respective port on another component.

In use, the components interact with each other by transferring data therebetween. Thus, for example, the output of one component may be connected to the input of another component, to allow two services to be performed in sequence. Combining appropriate ones of the more basic level components in a hierarchical structure can also be used to allow more complicated services to be implemented as a collection of more basic services.

Some examples of components are set out below and in Appendix A.

Accordingly, at step 120, a combination of the selected components is defined which will allow the computer executable code to be created. In particular, this specifies how the components should be interconnected via the ports, such that when the services provided by the components are implemented at step 130, the interaction results in the generation of the desired computer executable code.

Figure 2:
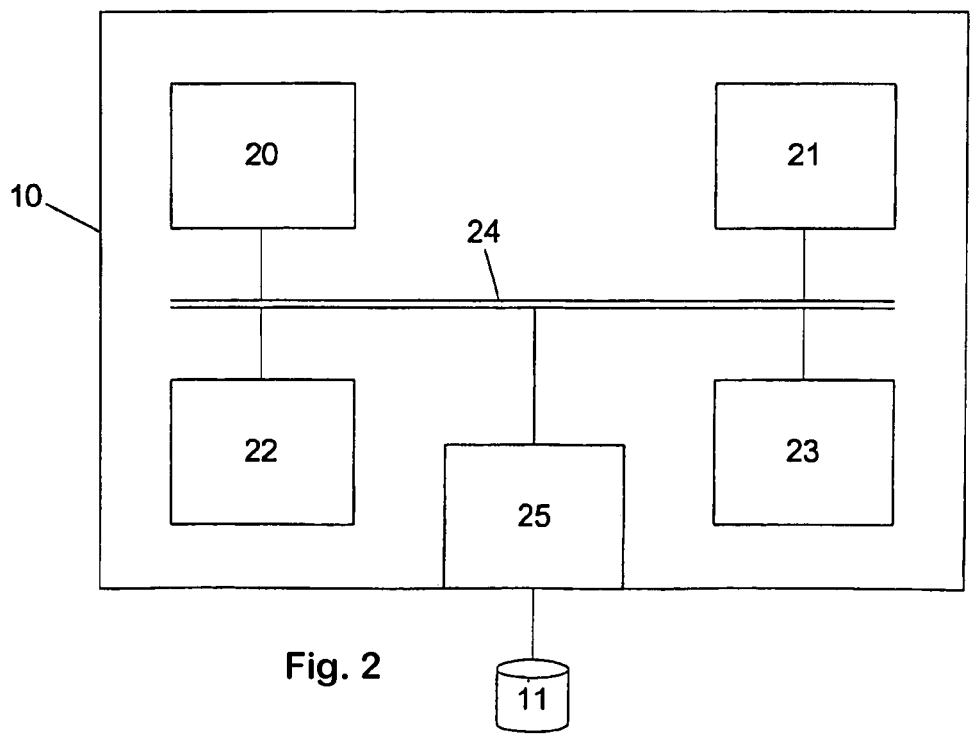
FIG. 2 is a schematic diagram of an example of a processing system for generating computer executable code.

It will be appreciated that the implementation of this technique can be achieved in a number of ways. However, in its broadest form, this process can be performed using a single processing system an example of which is shown in FIG. 2.

In particular, the processing system 10 generally includes at least a processor 20, a memory 21, and an input device 22, such as a keyboard, an output device 23, such as a display, coupled together via a bus 24 as shown. An external interface may also be provided as shown at 25, for coupling the processing system to a store, such as a database 11.

In use, the processing system is adapted to allow details of available components to be stored in the database 11. A user can then define a combination of selected components using the input and output devices 22, 23, allowing the processing system 10 to generate the computer executable code. From this, it will be appreciated that the processing system 10 may be any form of processing system such as a computer, a laptop, server, specialised hardware, or the like.

Figure 3A:
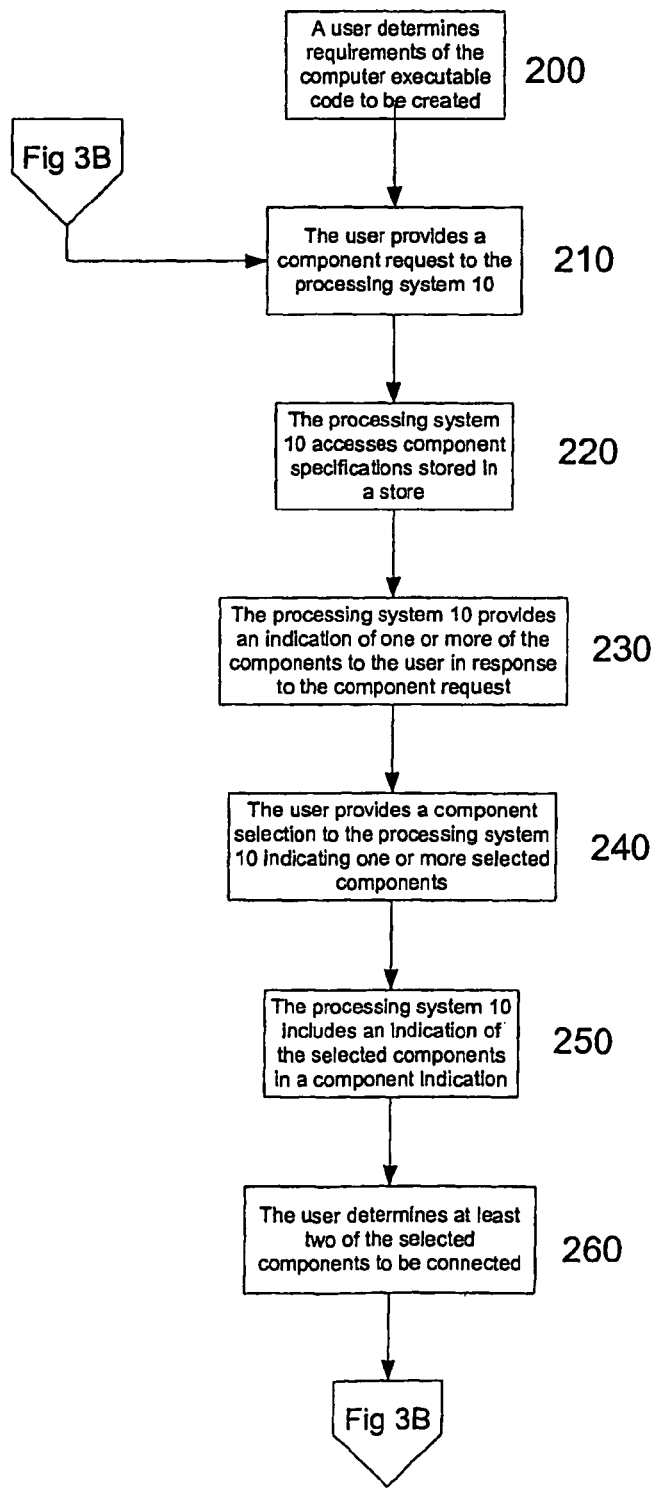
FIGS. 3A and 3B are a flow diagram of an example of the method of creating computer executable code using the processing system of FIG. 2.

The manner in which the processing system 10 may be used to generate computer executable code will now be described with reference to FIGS. 3A and 3B.

In particular, this example describes a situation in which a number of automated components are provided in the database 11. Accordingly, the components may be implemented automatically without manual intervention in order to perform the required services, thereby allowing a user to generate computer executable code using the processing system 10 alone.

In order to achieve this, the user determines requirements for the computer executable code to be created at step 200. At step 210 the user provides a component request to the processing system 10. The request may be in any form and will typically result in details of the available components stored in the database 11 being provided to the user.

In one example, details of the components are stored in the form of component specifications, which indicate at least the service embodied by the respective component. The component specifications may also include input and output specifications providing details of the type and/or form of data that the ports are adapted to receive/provide. The component specifications may be any one of a number of forms depending on the implementation of the system, and therefore may be provided as, or at least include a graphical representation, text data, operational parameters or the like.

At step 220, the processing system 10 accesses the component specifications stored in the database 11, and uses these to provide an indication of one or more of the components to the user at step 230, depending on the nature of the request. Thus, for example, the request may specify that only details of components providing respective types of service are provided. Thus, the user can specify one or more services to be performed in the request, with the processing system 10 responding to only provide details of those components able to complete all or part of the specified services. The indication may be in any one of a number of forms depending on the implementation, and may include graphical or textual representations, or the like. It will therefore be appreciated that the indication may be all or part of the specification itself.

The user uses the provided instructions to select appropriate ones of the components and provide a corresponding component selection to the processing system 10 at step 240, thereby indicating the one or more selected components.

The processing system 10 uses this information to generate a component indication at step 250. This may be in a graphical form or may be in the form of a list specifying the components selected, and can optionally be presented to the user on the display 23, or the like.

At step 260 the user determines at least two of the selected components to be connected. It will be appreciated that in order to perform the connection, it is important that the format and/or type of data handled by the respective components to be connected is compatible.

Thus, for example, if the output of a first component is coupled to the input of a second component, then it is important that the service of the second component is able to operate on the data output by the first component. This process may be performed manually by observation of the input and output specifications, or alternatively may be performed with the assistance of agents, as will be explained in more detail below.

The user then provides a connection indication representing the desired connections to the processing system 10 at step 270. This may be achieved by providing details of each input and output of the two different components to be connected, however alternatively the mechanisms may also be used such as manipulation of graphical representations or the like.

In any event, at step 280 the processing system 10 operates to interconnect the components in accordance with the connection indication.

At step 290 the user determines if more connections are required and if so returns to step 270 to define further connections. If not, the process moves on to step 300 at which point the user determines if additional components are to be selected. If so, the process returns to step 210, allowing steps 210 to 290 to be repeated.

Otherwise, the user optionally reviews the defined component interactions to determine if the executable code is to be constructed at step 310. In particular, this is generally performed to assess the expected performance of the code, the construction time, to determine if the code can be constructed by the specified component combination, or the like. Other factors that may be assessed include the expected cost, which may be relevant if the user has to pay a fee for the implementation of each component.

If it is determined that the specified component interactions are not acceptable for any reason and that the code is not to be built at step 320, then the process ends at step 330. It will be appreciated that as an alternative option, the user may return to any previous step in the process and revise the specified component interactions, for example through the removal, modification or addition of components, or component interactions.

Otherwise the user causes the services defined by the interconnected components to be performed at step 340.

The manner in which the services embodied in the components are implemented will vary depending on the respective component form. As described above, in this example, each of the components is formed from computer executable code stored in the store. Accordingly, when a component is to be executed an instance of the code can be downloaded on to the processing system 10 and executed in the normal manner.

Accordingly, each service embodied in the components will be implemented so as to manipulate data stored either in the memory 21, or the database 11, or received from another component, in accordance with the specified interconnections.

Thus, for example, initial data may be supplied to the input of a first component, which then operates to manipulate the data in accordance with the embodied service. When this has been completed, the manipulated data is provided at the first component output. The data will then be transferred to the input of a second component, allowing the service defined by the second component to be performed.

A similar process will occur for components having multiple inputs and/or outputs.

In the above example, each service is implemented using executable code. This should be distinguished from previous prior art system utilising so called "components", in which each "component" is a fragment of source or object code. In these systems, the fragments of source code are combined before being compiled or linked. This must be contrasted to the current system in which components embody data manipulation services, which in one example may be implemented by executable code.

It will be appreciated that variations may arise for different implementations. Thus, for example, the components may not all be implemented by the processing system 10 itself, and instead may be implemented remotely on other processing systems, as will be explained in a further example below.

Similarly the components may not all be performed automatically, and may require the user to provide inputs, transfer data, and perform some data manipulation. This can either be intentional arising as a result of the manner in which the service associated with the component is implemented. Alternatively, manual intervention can be unintentional, if for example a fault occurs in the implementation that requires user input to resolve an issue, such as the requirement to transfer incompatible data formats between components.

In the current example, once all the services embodied in the respective components, are completed the computer executable code will have been generated in the memory 21. Once generated, the code can be output to the user, allowing the code to be implemented on other processing systems, in the normal way.

It will be appreciated that this is feasible because the components interact both horizontally and vertically in a hierarchical fashion. Accordingly, complicated services can be performed easily by combining simple components in an appropriate manner.

Accordingly, it will be appreciated that through the creation of basic components, which are then combined in appropriate manners, complicated data manipulations can be performed, in turn allowing computer executable code having a complex functionality to be developed.

It will be appreciated that the process described above with respect to the processing system 10 may be implemented using a number of different architectures. Thus, for example, the system can be implemented using a distributed web based system, or the like, with user accessing facilities provided by a central processing system 10 via the Internet, or another communications network.

Figure 4:
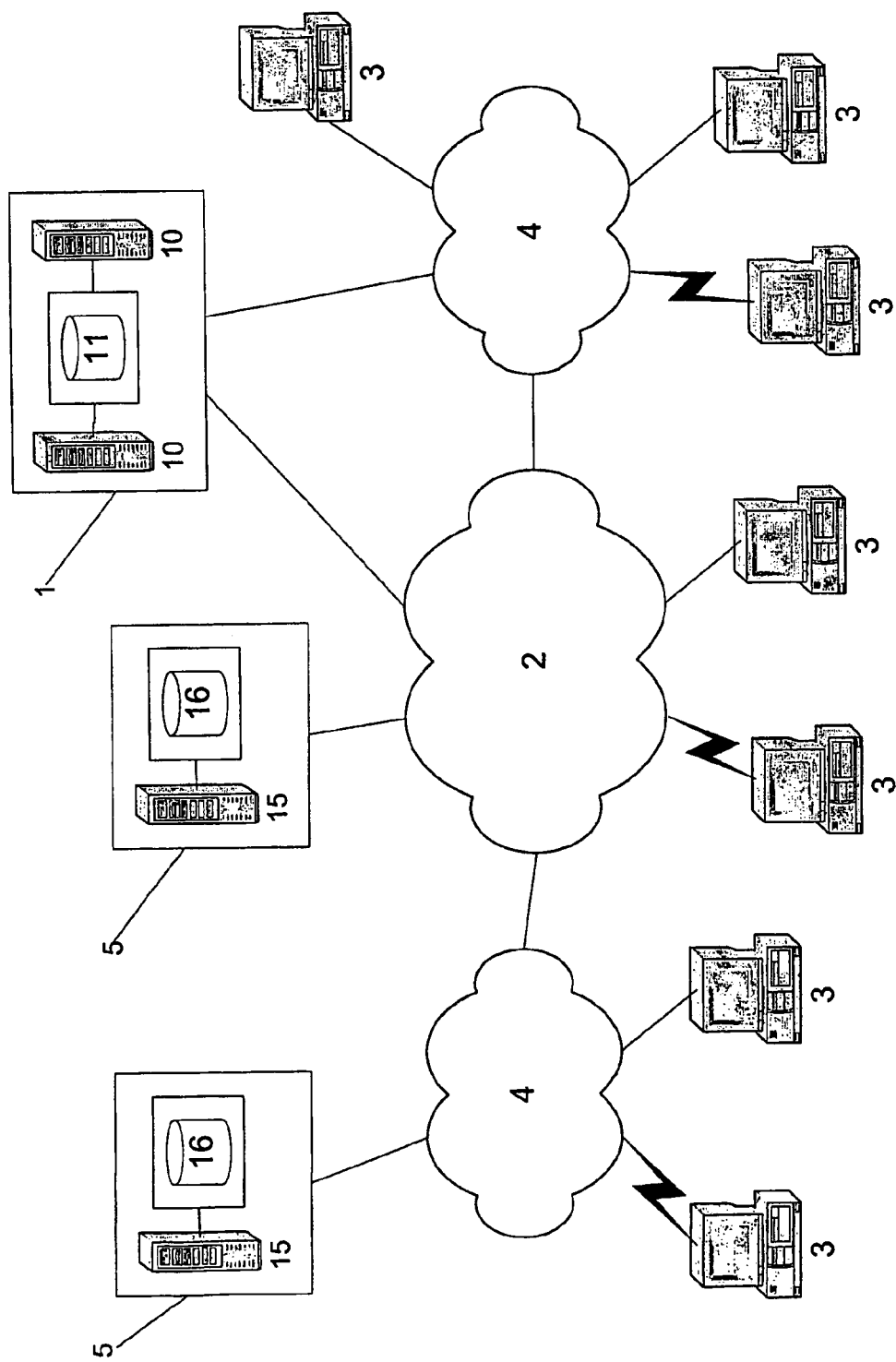
FIG. 4 is a schematic diagram of an example of a web based system for generating computer executable code.

An example of this will now be described in more detail with respect to FIG. 4.

In particular, in this example, one or more central processing systems 10 (two shown in this example for clarity purposes only) are provided at a base station 1, which is coupled via a communications network, such as the Internet 2, and/or a number of local area networks (LANs) 4, to a number of end stations 3.

In use, the components may be provided at, and implemented by, the processing system 10, as described above. Alternatively, the components may be provided by one or more respective entities, each of which operates one or more respective entity stations 5, which are also coupled to the Internet 2, and/or the LANs 4, as shown. In this example, each entity station 5 is formed from an entity processing system 15, coupled to a store, such as a database 16, as shown.

In use, users of the system can use the end stations 3 to communicate with the base station 1 to thereby obtain the provision of services embodied in suitable components.

This may be achieved in a number of manners however in this example, access to the services is provided through the use of web pages, although this is for illustrative purposes only. In order to achieve this, each end station 3 is therefore formed from a processing system that is adapted to access web pages and transfer data to the end station 1, as required.

Figure 5:
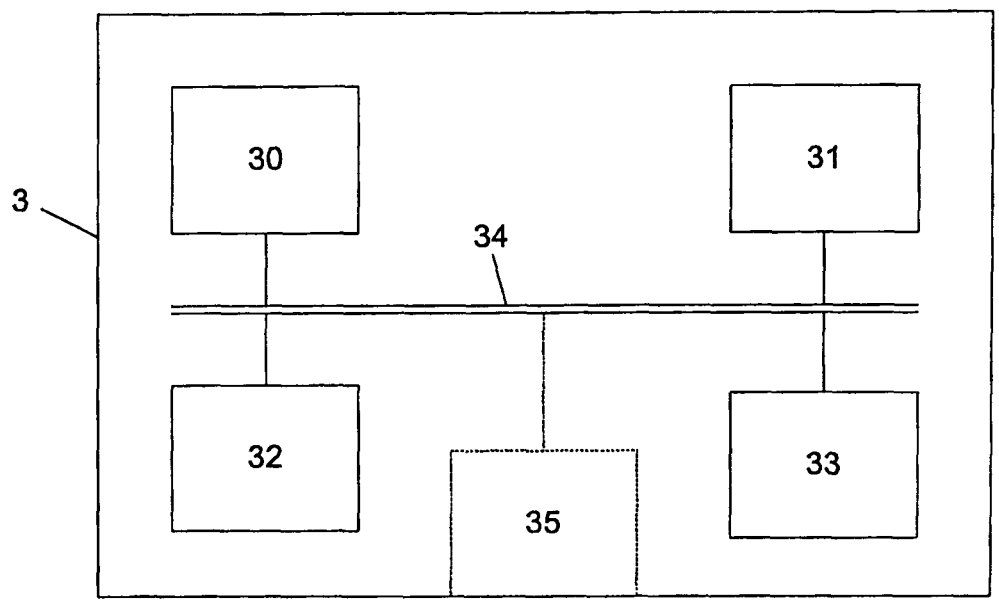
FIG. 5 is a schematic diagram of an example of an end station of FIG. 4.

An example of a suitable end station 3 is shown in FIG. 5. As shown the end station 3 includes a processor 30, a memory 31, an input device 32, such as a keyboard, or the like, an output device 33, such as a display, which are coupled together via a bus 34. The processing system is also provided with an external interface 35 for coupling the end station 3 to the Internet 2, or the LAN 4, as required.

In use, the processor 30 is adapted to communicate with the processing system 10 provided in the base station 1 via the communications networks 2, 4 to allow the processing system services to be accessed. Accordingly, it will be appreciated that the end stations 3 may be formed from any suitable processing system, such as a suitably programmed PC, Internet terminal, lap-top, hand-held PC, or the like, which is typically operating applications software to enable data transfer and in some cases web-browsing.

The components can be implemented either at the processing system 10 itself, or at one of the entity processing systems 15, depending on the nature of the component and the service provided therein.

Figure 6:
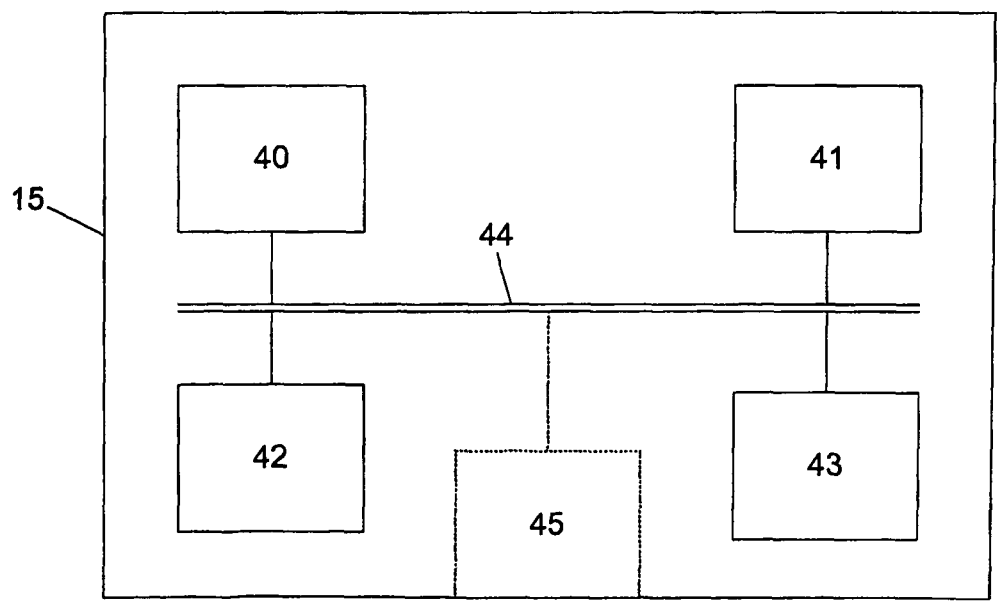
FIG. 6 is a schematic diagram of an example of an entity processing system of FIG. 4.

The entity processing system 15 must therefore be able to communicate with the processing system 10 via the communications networks 2, 4. In order to achieve this, the entity processing system 15 would generally be similar to the processing system shown in FIG. 6.

As shown the entity processing system 15 includes a processor 40, a memory 41, an input device 42, such as a keyboard, or the like, an output device 43, such as a monitor, which are coupled together via a bus 44. The processing system is also provided with an external interface 45 for coupling the entity station 5 to the Internet 2, or the LAN 4, as well as the database 16, as required.

In use, the processor 40 is adapted to allow the entity to perform the services encapsulated in respective components. Accordingly, it will be appreciated that the entity stations 5 may be formed from any suitable processing system, such as a suitably programmed PC, Internet terminal, lap-top, hand-held PC, or the like. As the services may be data intensive, the entity processing systems 15 are often formed from servers, or the like.

In any event, it will be appreciated that the end station 3 and the entity stations may be implemented using common processing systems, and the distinction between end stations 3 and entity stations 5 is primarily for the purpose of explanation only.

To allow components to be implemented by the entity stations 5, whilst still allowing users of the end stations 3 to access the services provided therein via the base station 1, it is typical for at least some details of the components to be stored in the database 11, in the form of component specifications. The component specifications may be in any one of a number of forms, and may include graphical representations, or the like. However, in general the component specifications include sufficient information for a user to determine the service embodied by the respective component. It should be noted that the component specification provides enough information to allow the component to be selected and used. Thus, it will include an indication of the data manipulation that can be performed, but nit how this achieved. The importance of this will be highlighted in more detail below.

Figure 7:
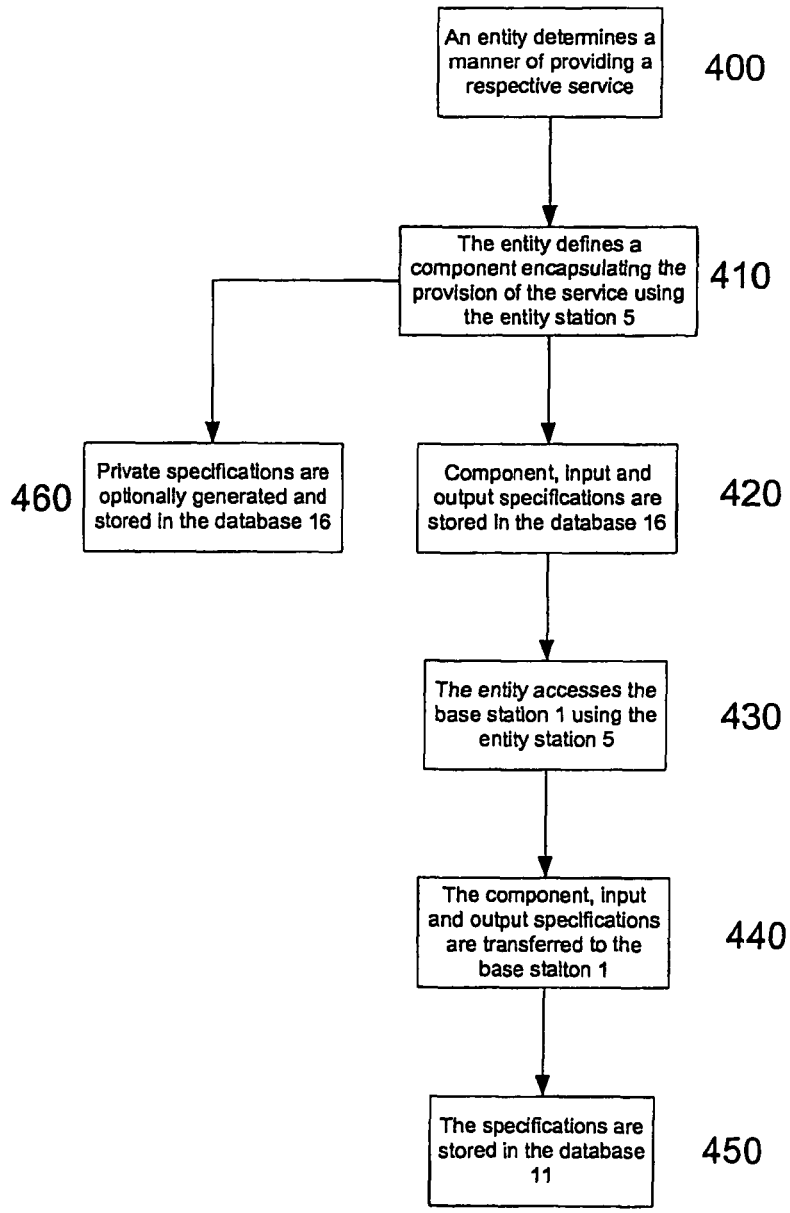
FIG. 7 is a flow diagram of an example of the method of having an entity provide a component to the base station of FIG. 4.

The manner in which computer executable code may be created will now be described with reference to FIG. 7.

In particular, at step 400 the entity determines a manner of providing a respective service. This may be achieved in a number of ways and will depend on the respective service and the manner in which the entity wishes to provide the service.

Thus, for example, the entity may provide the service manually such that the entity receives data at the entity station 5, modifies the data using the entity processing system 15, and then returns the modified data to the processing system 10 or the end station 3, all under control of the entity.

Alternatively, the process may be performed by computer executable code, executed by the entity processing system 15, in which case, the entity must first determine the necessary executable code.

A combination of manual and automatic processes may also be used. Furthermore, data may not be returned to the processing system 10 or the end station 3, but instead may be transferred to another one of the entity stations 5 for manipulation by another service embodied by a different component.

As a further option, the entity may provide a service in the form of a compound component. In this case, the entity effectively defines a combination of previously existing components, which when combined define a component allowing the required service to be performed. In this case, the entity station 5 will be adapted to "hand-off" implementation of the components contained within the compound component to other ones of the entities, such as through other entity stations 5, and/or the base station 1, as required.

In any event at step 410 the entity defines a component encapsulating the provision of the service using the entity station 5. In order to achieve this, the entity processing system 15 will generally execute applications software that aids the entity in this process. The software will prompt the entity to provide information that will be required by the processing system 10 to allow the functionality provided by the respective component service to be understood by an end user. Thus, for example the entity may be presented with a dialog box including fields defining the types of information that are required in order for users to determine the operation of the component.

In general, the required information includes at least component, input and output specifications. In particular, the component specifications are used to provide information regarding the service provided by the component, together with information regarding the component author, implementing entity, or the like. The component specification also includes sufficient information to allow the processing system 10 or the end station 3 to access the services embodied by the component.

Figure 8:
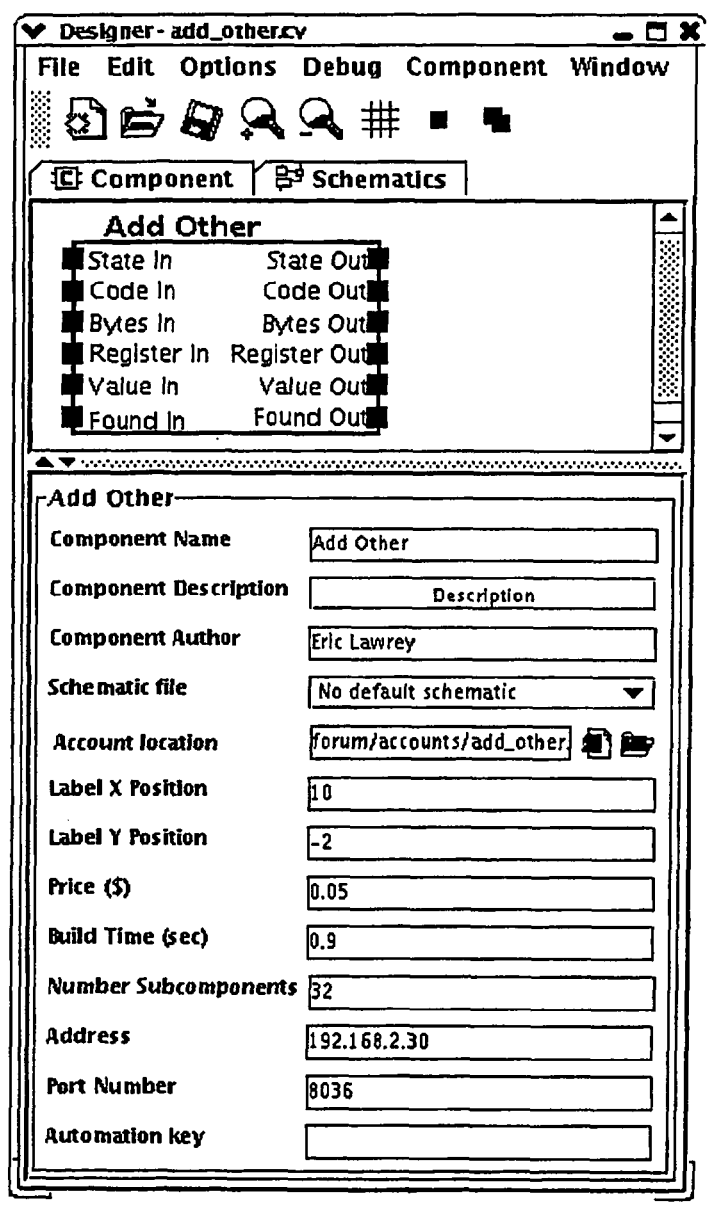
FIG. 8 is a schematic diagram of an example of a component properties dialog box.

Accordingly, the component specifications typically include at least:

Manufacturer ID—used to identify the entity providing the service
Component ID—used to identify the respective component
Location information—used to identify where the component is implemented
Description—an indication of the service provided by the component This information may be provided for example through the use of a properties dialogue box shown for example in FIG. 8. The properties dialogue box will prompt the entity to provide information such as the component name, the component description, the author, the address, report number or the like. In this example, the figure shows the graphical user interface (GUI) for a designer program which will be described in more detail below. In this case, the designer program has an "add_other" component loaded for editing. The GUI has three major fields, namely:

1. Tool bar—which permits the editing of the component representation.
2. Component representation—What will be available at the forum once published
3. Component details—additional information that will be combined with the component representation that is required by the end user.

The applications software installed on the entity processing system 15 can also be used to generate any identifiers that may be required. In particular, it is generally necessary to generate identifiers to allow both the entity, and the component to be uniquely identified.

Furthermore, when implementing the component to provide the embodied service, an entity station 5 may be implementing the same component simultaneously for a number of different code generation projects. In this case, several different component instances will exist, with one or more component instances being applied to each respective code generation project depending on the implementation. Accordingly, in this case, it is also necessary to generate respective identifiers allowing each component instance to be uniquely identified.

The component specification may be provided in any form, although typically this is provided in the form of an XML file generated in accordance with a predetermined XML schema. This will typically be achieved by having software implemented by the end station 3 translate the information provided through the use of the dialogue box into an XML file.

In addition to this, the input and output specifications, are used to indicate any information required to allow data to be transferred between the components, and this will therefore typically depend on the nature of the respective component.

For example, the components may be adapted to handle a variety of data at respective inputs. This may include for example, different data formats and/or different data types. In this case, the input and output specifications include details of the types and/or formats of data that can be received by the component inputs, or supplied by the component outputs. However, if components are only adapted to receive one form or type of data, this will not be required. Addressing information may also be provided to allow inputs and outputs to be connected. This allows components to communicate with each other, by transferring data from the output of one component to the input of a subsequent component.

In one example, control of this communication is achieved using agents, which are software applications executed at the location at which the respective component is implemented. The operation of the agents will depend on the implementation of the system, and in particular the nature of the components involved.

Thus, for components able to handle different types of data, the agents may be adapted to perform negotiation to select between available data types and formats specified in the input and output specifications, to allow respective components to communicate directly. Alternatively, the component may only be adapted to receive or output data in a single format Accordingly, no such negotiation is required.

Agents are generally software constructs operated by the entity station to allow a component instance to communicate with other content instances. The input and output specifications may therefore also include details of the manner of operation of the respective agent.

Figure 9:
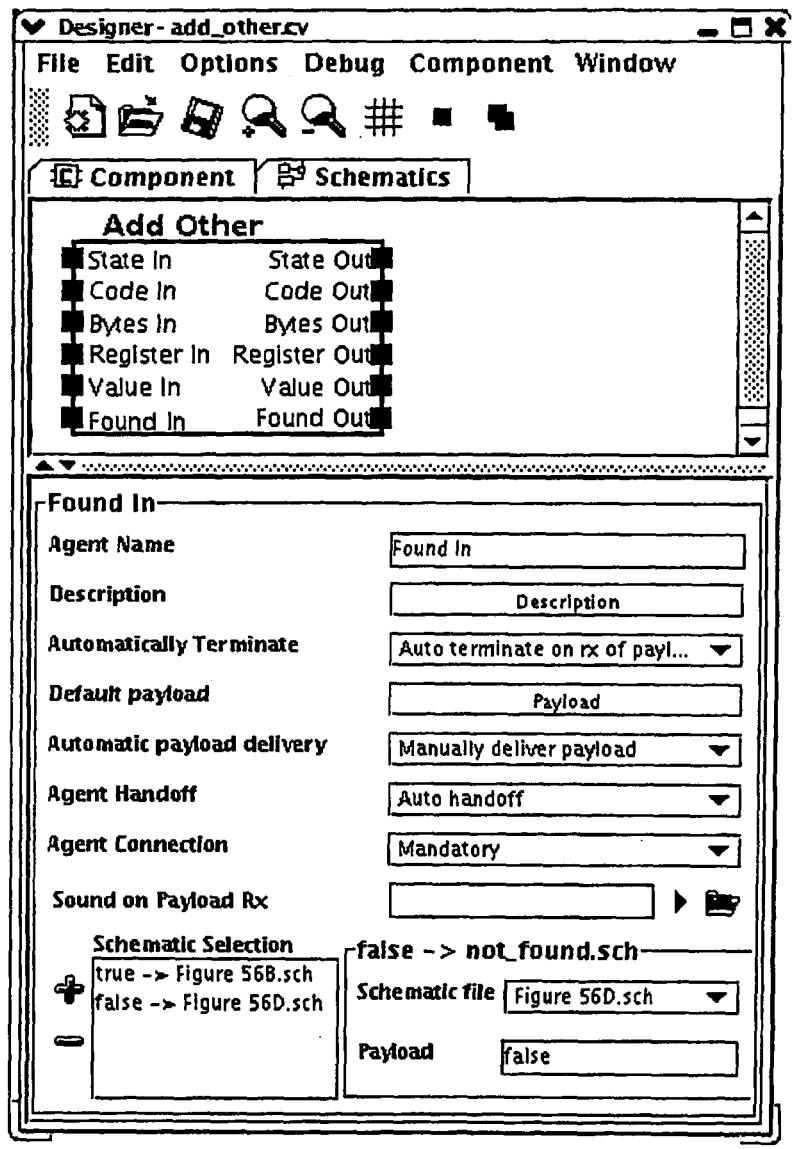
FIG. 9 is a schematic diagram of an example of an output properties dialog box.

In any case, details of the input and output specifications may be provided through the use of a dialog box that prompts the entity for details regarding the respective input and/or output and associated agent. An example of a dialog box for an output is shown in FIG. 9.

The input and output specifications are then typically integrated into the component specification, and therefore are incorporated into the respective XML file. However, this is not essential, and alternatives may be defined by respective XML files.

The operation of the agents will be described in more detail below. However, it will be appreciated that the entity also operates to construct agents when encapsulating the service as a component.

It is also possible for the negotiation to be performed using techniques other than agents, depending on the implementation of the invention.

In any event, at step 420 the entity processing system 15 operates to store the generated component, input and output specifications, and agent details, typically in the database 16. The entity station 5 is then used to access the base station 1 at step 430, allowing details of the component, input and output specifications, to be transferred to the base station 1 at step 440, for storage in the database 11 at step 450.

It will be appreciated that if the component is self contained, the entire component may be downloaded to the database 11, for storage thereon, in which case there is no requirement to store any information at the entity station 5. This allows the component service to be implemented by the processing system 10 automatically, as described above for example with respect to FIGS. 3A and 3B. Alternatively, the component may be transferred to the end station 3 for implementation thereon. These techniques will generally result in the manner of implementation of the services to be made publicly available.

The entity will usually wish to retain at least some form of control over the operation of the component and accordingly the component service is typically implemented at the entity station 5.

This is generally required if the service implementation requires manual input from the entity, but may also be desirable for other reasons.

Thus, for example, this allows the entity to monitor use and operation of the component, as well as making it easier for the entity to adjust and/or modify the operation of the component to improve its efficiency. Furthermore, this allows the entity supplying the service to provide only the manipulated data, or another output, and not divulge the method used to implement the service. This allows the technique for implementing the service to be retained as a trade secret, specialised knowledge or the like, as will be described in more detail below.

Furthermore, as the system is adapted to handle a large number of components, it is generally undesirable to have all these located at the base station 1, as the database 11, and processing systems 10 would rapidly become over used.

Accordingly, the components are usually implemented at the entity stations 5, with details of the specifications and the agents being transferred to the base station 1, to allow users of the end stations 3 to select the components for use. In particular, when the users of the system select components in this fashion, it is transparent to the user whether the component itself is actually provided at the base station 1 or whether the component is provided at an entity station 5. This is because all the specifications and agent details needed to access the entity station 5 providing the respective service are stored in the base station 1.

In the event that the service embodied by the component is implemented at the entity station 5, then it is typical to further generate a private component specification, which sets out details of the manner of implementation of the respective service. This may include executable code and/or instructions used by the entity when performing the service. Alternatively, if the entity implemented the data manipulation solely by using other components, the private specification may be in the form of a component schematic, which is constructed and implemented in accordance with the techniques described herein. It will be appreciated from this that entities can define service implementations by contracting out data manipulation services to other entities in a specific combination.

In any event, if a private specification is created this is stored at the entity station 5 at steps 460.

Private specification should be contrasted with the component specification described above which only describes the service provided, and not the manner of implementation. The private specifications are never made available to individuals outside the entity, thereby allowing the entity to retain the method by which the respective service is implemented as secret. This therefore helps the entity retain protection for their method, as will be appreciated by persons skilled in the art. In any event, by only providing a definition of the implemented service in the component specification, it will be appreciated that there is no danger in making the component specification available to the public, by having the component specification stored on the base station 1.

A detailed example of the manner in which a user uses the base station 1 to produce applications software will now be described in more detail, with respect to the flow chart set out in FIGS. 10A to 10E.

Figure 10A:
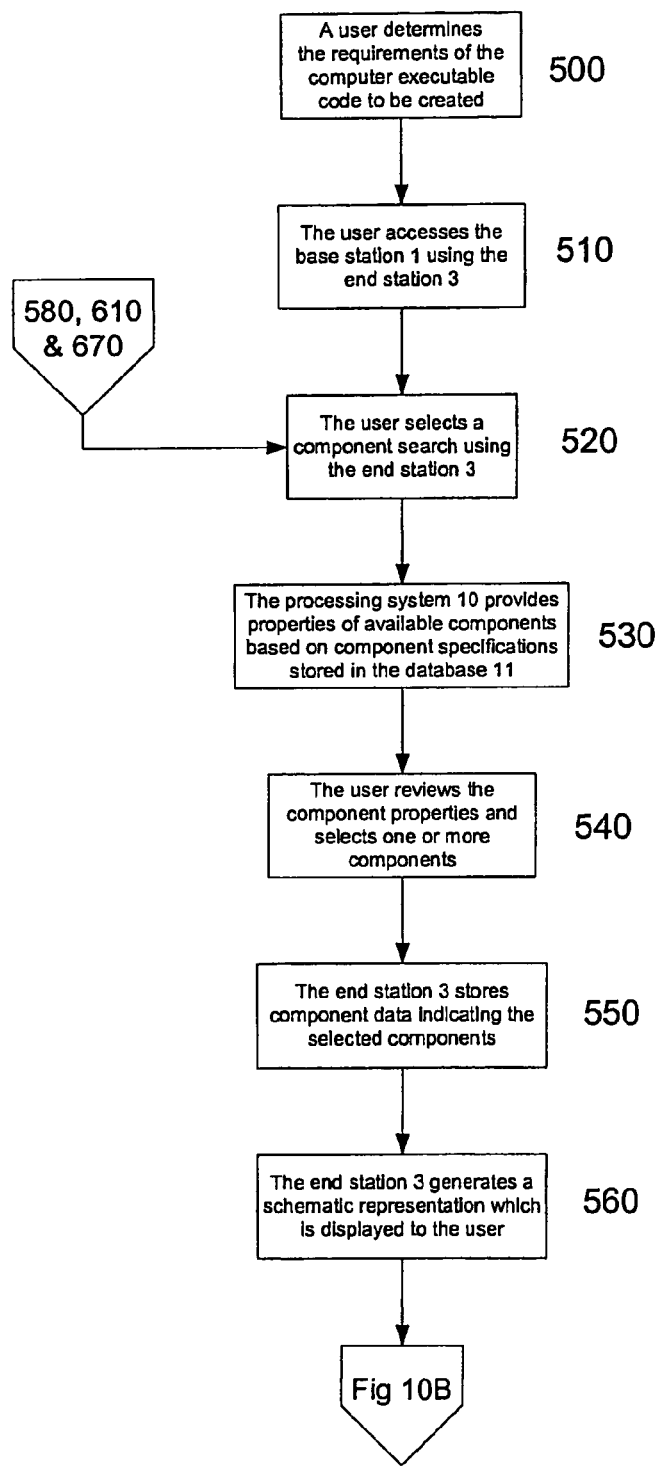
FIGS. 10A to 10E are a flow diagram of an example of the method of creating computer executable code using the system of FIG. 4.
Figure 10B:
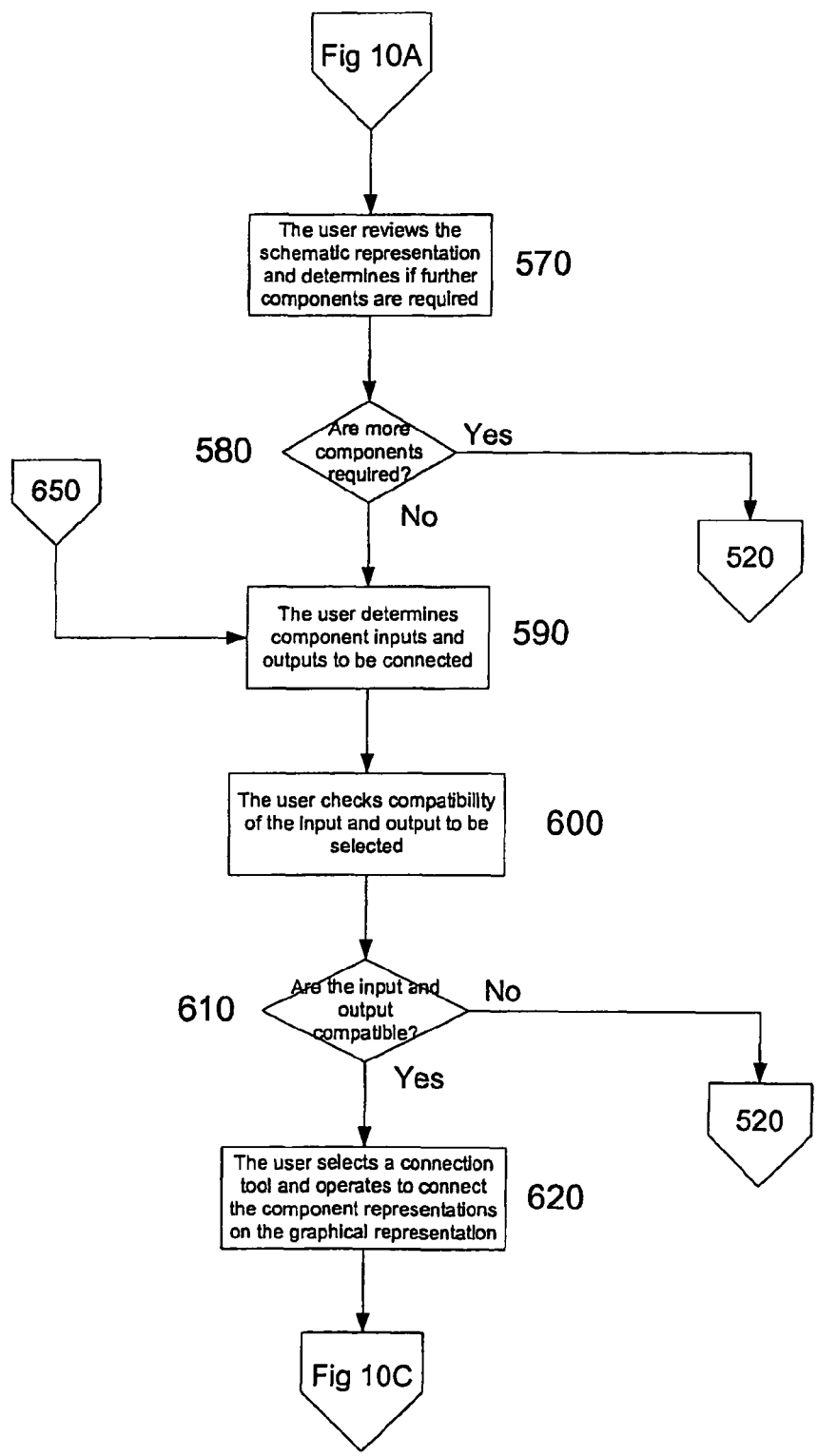
Figure 10C:
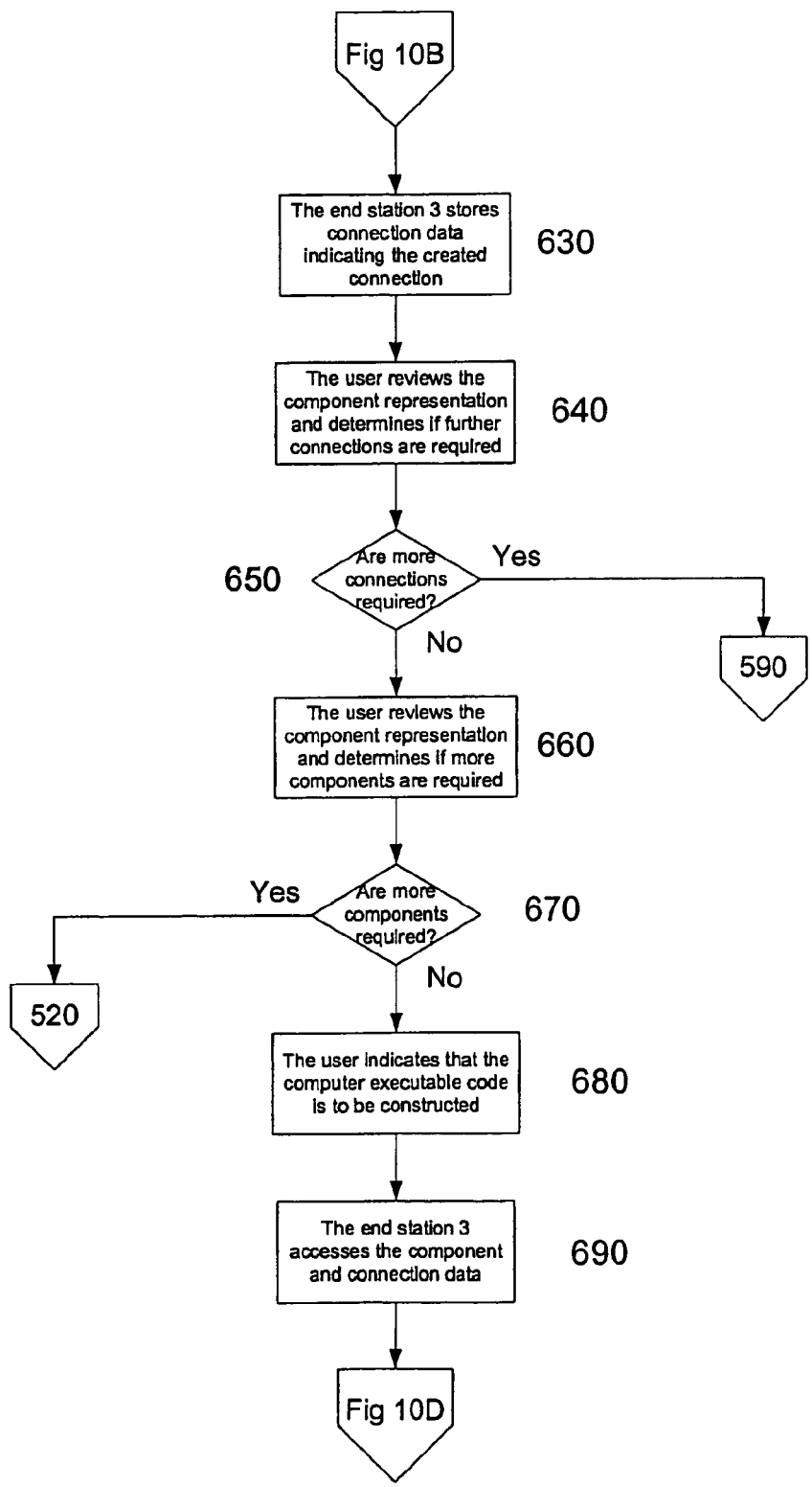
Figure 10D:
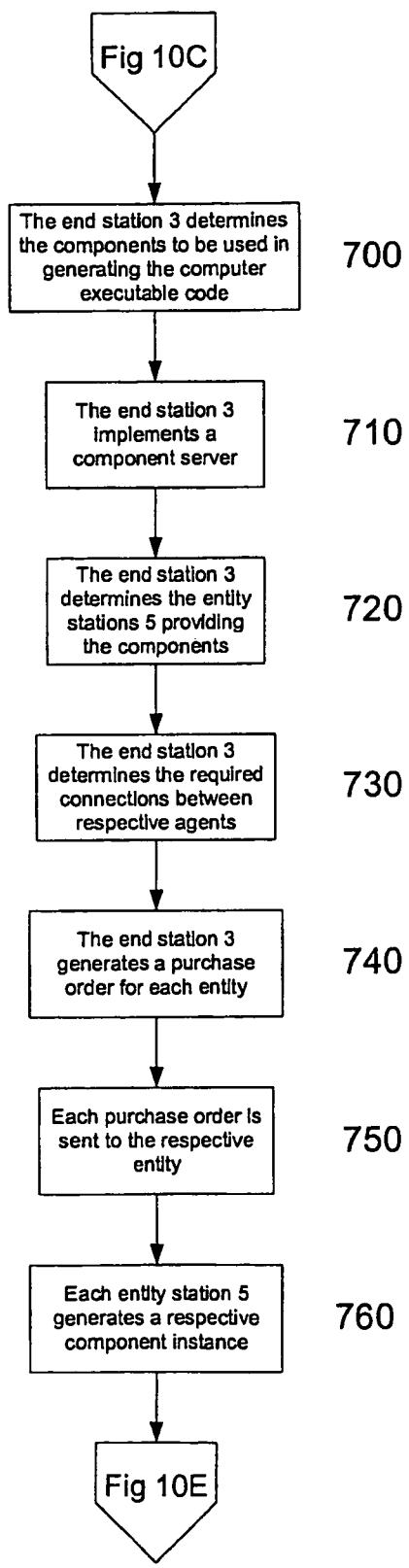
Figure 10E:
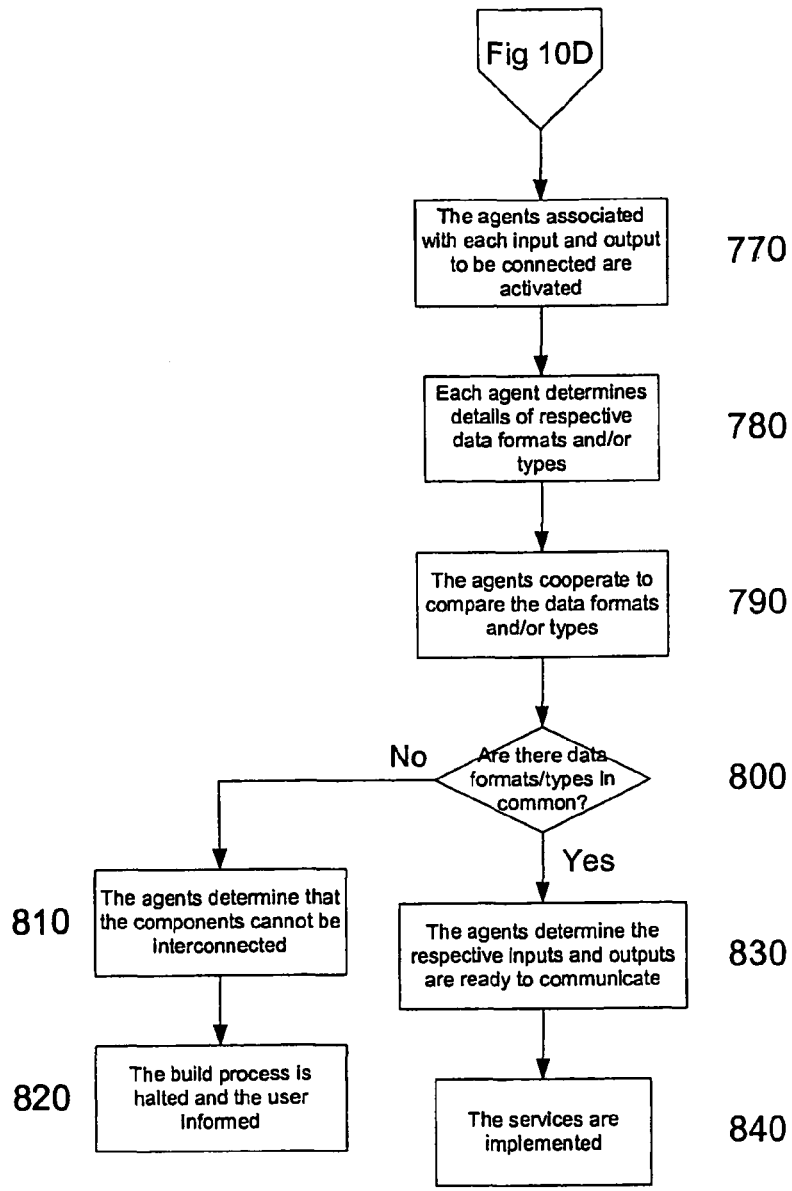

As shown at step 500 in FIG. 10A the first stage is for a user to determine the requirements of the computer executable code to be created. At step 510 the user then accesses the base station 1 using the end station 3.

At step 520 the user selects a component search using the end station 3 and this causes the processing system 10 to provide details of available components based on component specifications stored in the database 11, at step 530. In particular, the processing system will typically allow users to search through categories of components, with the categories defining different forms of functionality. This allows users to rapidly locate components that embody the required services.

At step 540 the user reviews the component properties and selects one or more components. This may be achieved in a number of ways, although typically the user will be presented with navigable lists that provide at least a component title and brief additional description of suitable components. The user can then select a respective one of the components allowing further details to be provided, and ultimately, the selection to be made.

The further details may be provided for example through the use of the properties dialogue box similar to that shown for example in FIG. 8. In this case, the details include information such as the component name, the component description, the author, the address, report number, or the like, and will be determined directly from the component specifications stored in the database 11.

At step 550 an indication of the selected components is stored. This may be achieved in a number of manners depending on the implementation. For example, the end station 3 may generate component data representing each component selected by the user, which is then stored in the memory 31. Alternatively, the processing system 10 may generate the component data and store it in the database 11.

At step 560, the end station 3 (or alternatively the processing system 10) generates a schematic representation, including representations of the selected components. The schematic representation is used to allow the user to define the component interconnections, as will be described in more detail below. In particular, this allows the user of the end station 3 to visualise the components and how these will need to interact with each other to produce the computer executable code.

The schematic representation includes a representation of each selected component and this is generally defined by the entity and transferred to the base station 1 as part of the component specifications. When the user selects a respective component, the corresponding component representation is transferred from the base station 1 to the end station 3, and added to the schematic representation, as required.

It will therefore be appreciated that the indication of the component stored by the end station 3 may be in the form of the component representations. Furthermore, selection of components may be achieved by simply dragging component representations, and dropping these into the schematic representation.

Figure 11:
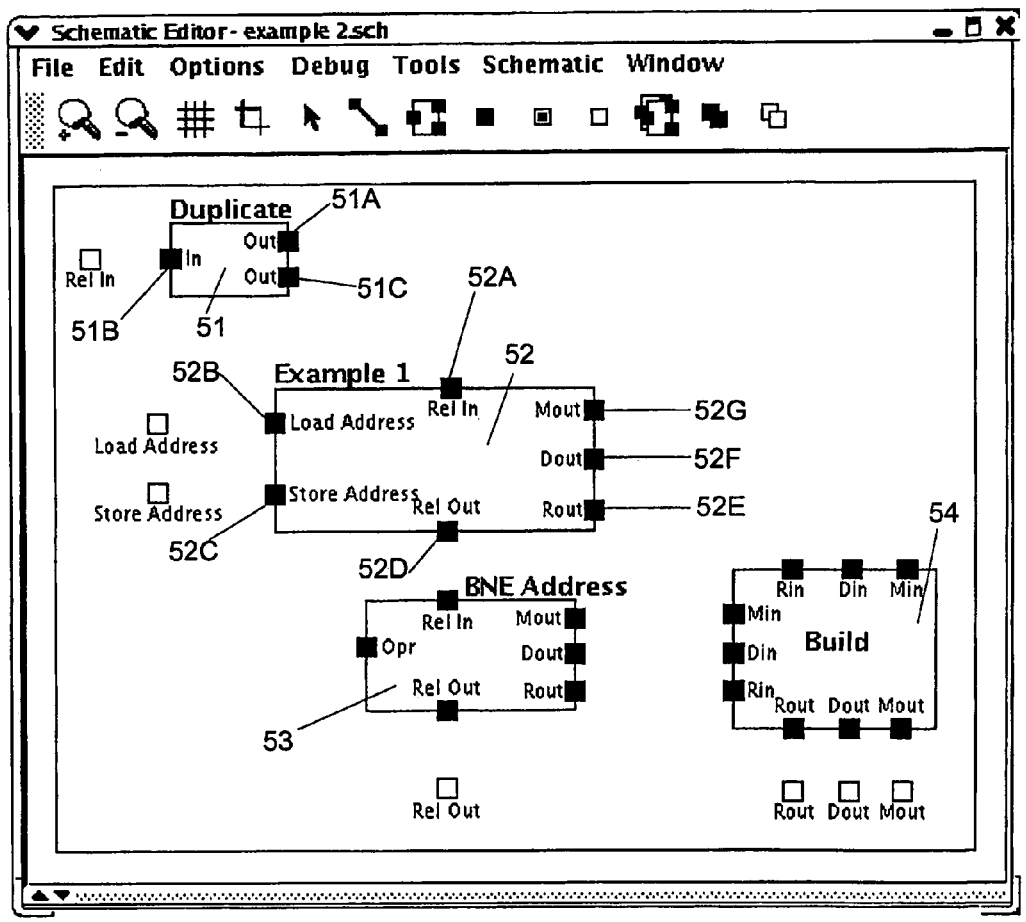
FIG. 11 is an example of a schematic representation that is presented to the user.

An example of a schematic representation is shown in FIG. 11. As shown, the schematic representation is displayed in a schematic window 50, and in this example, includes four component representations 51, 52, 53, 54. Each of the components has a number of inputs and outputs, as shown generally in the component representation at 51A, 51B 51C, . . . .

Figure 12:
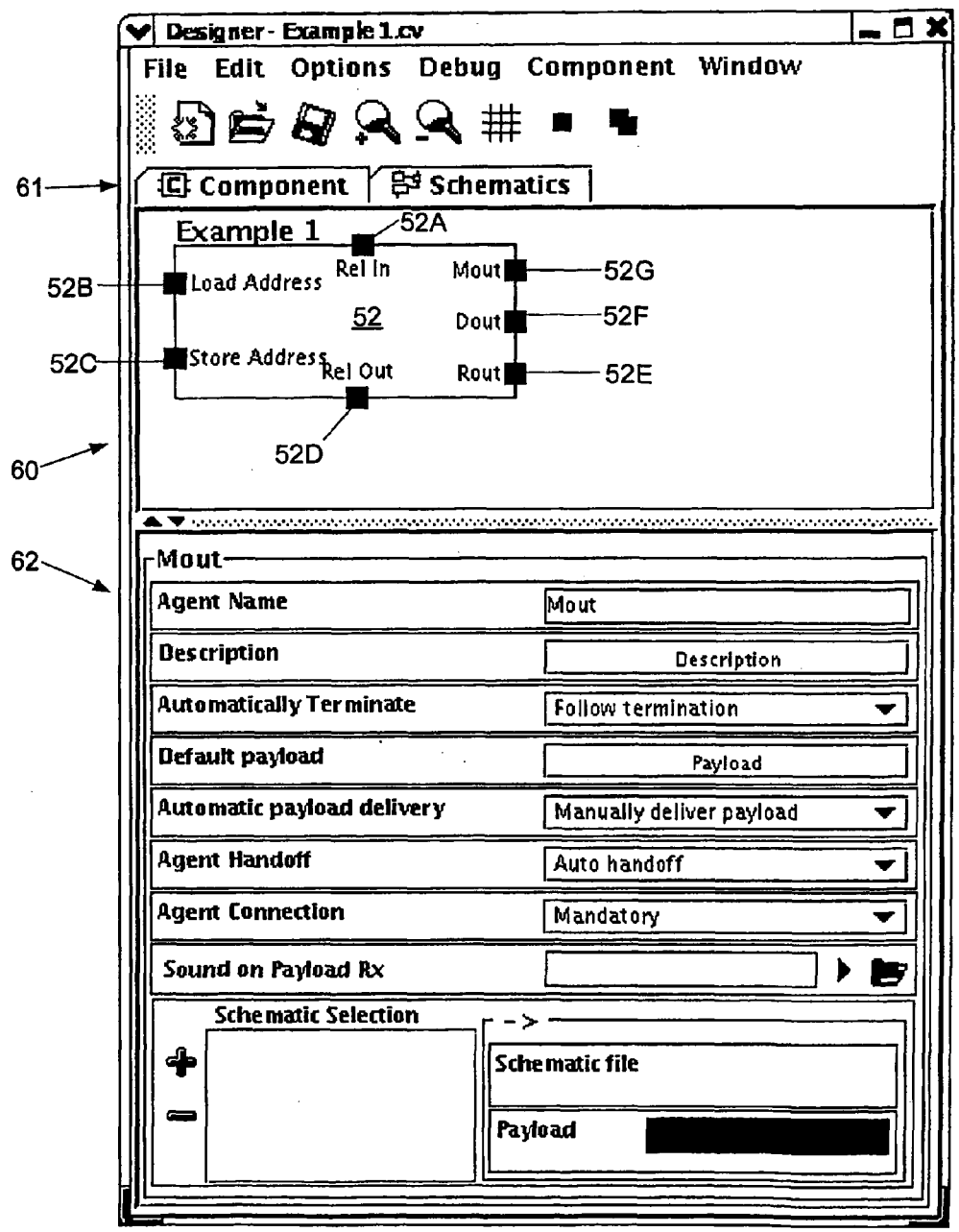
FIG. 12 is an example of a component representation that is presented to the user.

If the user selects a respective one of the components shown in the schematic representation, the user is presented with a single component representation, an example of which is shown in FIG. 12. In particular, FIG. 12 shows a component display screen 60 including a component representation 52 having a number of input and output representations 52A, 52B . . . , 52G presented thereon.

The component display screen also includes a number of window selection tabs 61, which allow the user to navigate between the component window 60 shown, the schematic window 50 mentioned above, and an auto select window.

An agent window 62 is also provided, which displays details of a selected input or output agent (in this example agent 52G), obtained from the respective input and/or output specification.

In use, the user can navigate around the component and schematic representations to allow various information regarding the components to be provided. Thus, for example, by selecting the component representation 52, this can allow the properties of the corresponding component to be displayed, as shown for example in FIG. 8. Similarly, by selecting a respective one of the input and/or output representations, details of the respective input or output will be displayed in the agent window 62. These details will typically be provided by displaying an input or output dialog box, similar to the one shown in FIG. 9, as appropriate.

In any event, the user reviews the presented schematic representation and determines if further components are required at step 570. If it is determined that more components are required at step 580, the process returns to step 520 to allow the user to return to the component search tool and select more components using the end station 3. Representations of these components can then be added to the schematic representation as required, for example using drag and drop techniques.

Once the required components (or at least some of the required components) are selected, through the placement of corresponding component representations on the schematic representation, the user determines component inputs and outputs that are to be connected at step 590.

In order to ensure that the components may interact successfully, the user will typically check at this point whether the input and output that are to be connected are compatible at step 600. In particular, the user checks whether the input and output can handle any common data types and/or formats. This information can be determined by examination of the input and output details contained in the input and output specifications. It will be appreciated that consideration of this is also usually taken into account when making initial selection of the components.

If the user determines that the input and output cannot be connected at step 610, the process returns to step 520 to allow one or more alternative components to be selected.

Figure 13:
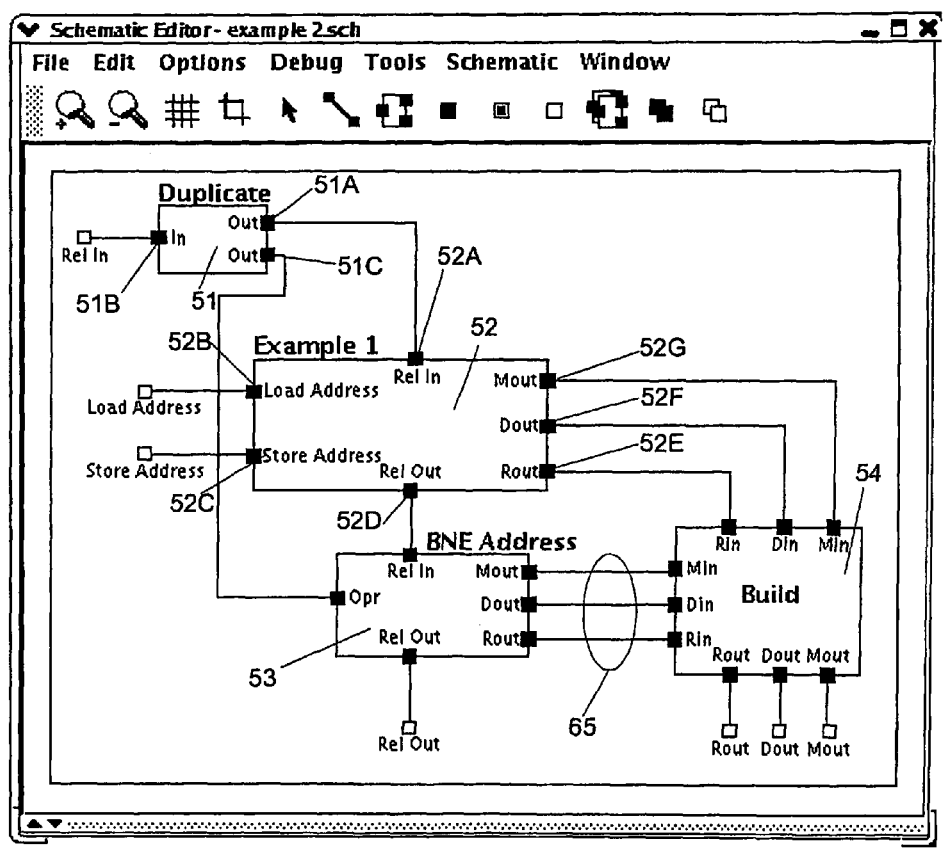
FIG. 13 is an example of the schematic representation of FIG. 11 modified to include interconnections.
Figure 14:
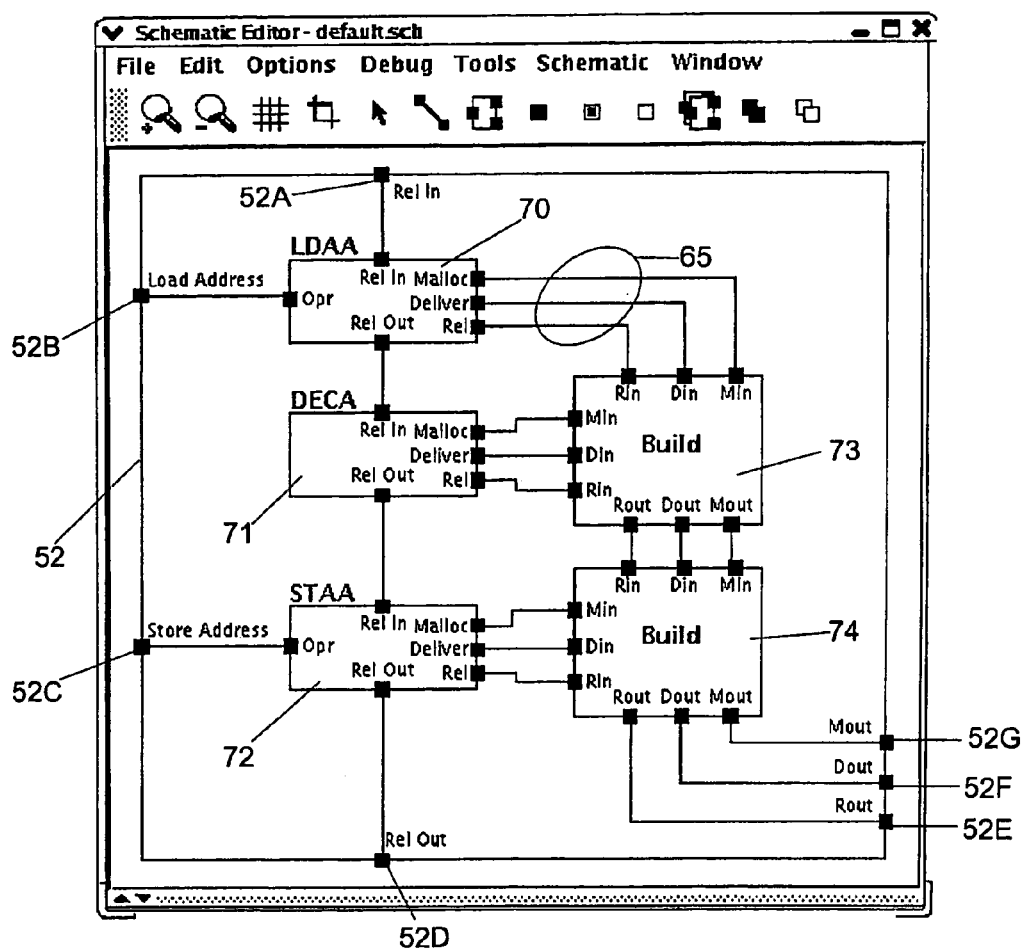
FIG. 14 is an example of a schematic representation of the internal structure of the component of FIG. 12.

Otherwise, the user selects a connection tool and operates to generate a connection representation between the input and output of the respective component representations on the schematic representation, at step 620. An example of this is shown in FIGS. 13 and 14. The end station 3 interprets the connection representation as a connection between the respective input and output, and generates connection data representing the connection.

In particular, FIG. 13 shows the schematic representation of the component representations 51, 52, 53, 54 of the component representations shown in FIG. 11, with the components being interconnected using the connection representations shown generally at 65. In particular, in this example, the component representation 52 is coupled to a duplicate component representation 51, a BNE addressed component representation 53, and a build component representation 54, as shown.

FIG. 14 shows that the component representation 52 corresponds to a compound component formed from a number of sub-components. These sub-components are in turn represented as a LDAA component representation 70, a DECA component representation 71, an STAA component representation 72, and two build component representations 73, 74, interconnected by the connection representations 65, as shown.

The combination of components represented by the schematic shown in FIG. 13 allow computer executable code forming a decrement counter to be produced. However, it will be appreciated that this example is provided to demonstrate the operation of the schematic representation and the actual functionality implemented is not important. Additional examples are described in more detail below.

In any event, the user can select a respective input and output on the schematic representation, and then draw on a connection representation between the inputs and outputs at step 620 thereby defining a connection between the respective input and output.

In this example, neither the end station 3 or the processing system 10 operate to examine the validity of the connections, and in particular it is not determined whether data can successfully be transferred from the output of the first component, to the input of the second component. However, it will be appreciated that checking by any of the processing systems may be performed in some implementations.

In any event, in this example, the end station stores an indication of the created connection in the form of connection data at step 630.

The user then reviews the schematic representation and determines if further connections are required at step 640. If it is determined that further connections are required at step 650, the process returns to step 590 to allow further connections to be defined in the manner described above.

Thus effectively, the user will use the drawing tool to define all the connections required in the schematic representation. This will typically require that each input and output of each component is coupled either to another output or input, although appropriate termination may be provided in some cases.

If it is determined that no further connections are required for the components in the schematic representation at step 650, the user reviews the schematic representation and determines if more components are required at step 660. This allows the method to return to step 520 so that more components may be included, if it is determined that more components are required at step 670.

Thus, the user can effectively select two or more components and operate to interconnect these, before going back to select further components.

If it is determined that no further components are required at step 670, the user indicates that the computer executable code is to be constructed at step 680.

It will be appreciated that the use of the graphical based system described above is for the purpose of example only, and that alternative techniques may be used to define component combinations. For example, components could be represented with a suitable text based language, where functions could represent components, statements could represent component combinations, and variables could represent agents.

Figure 3B:
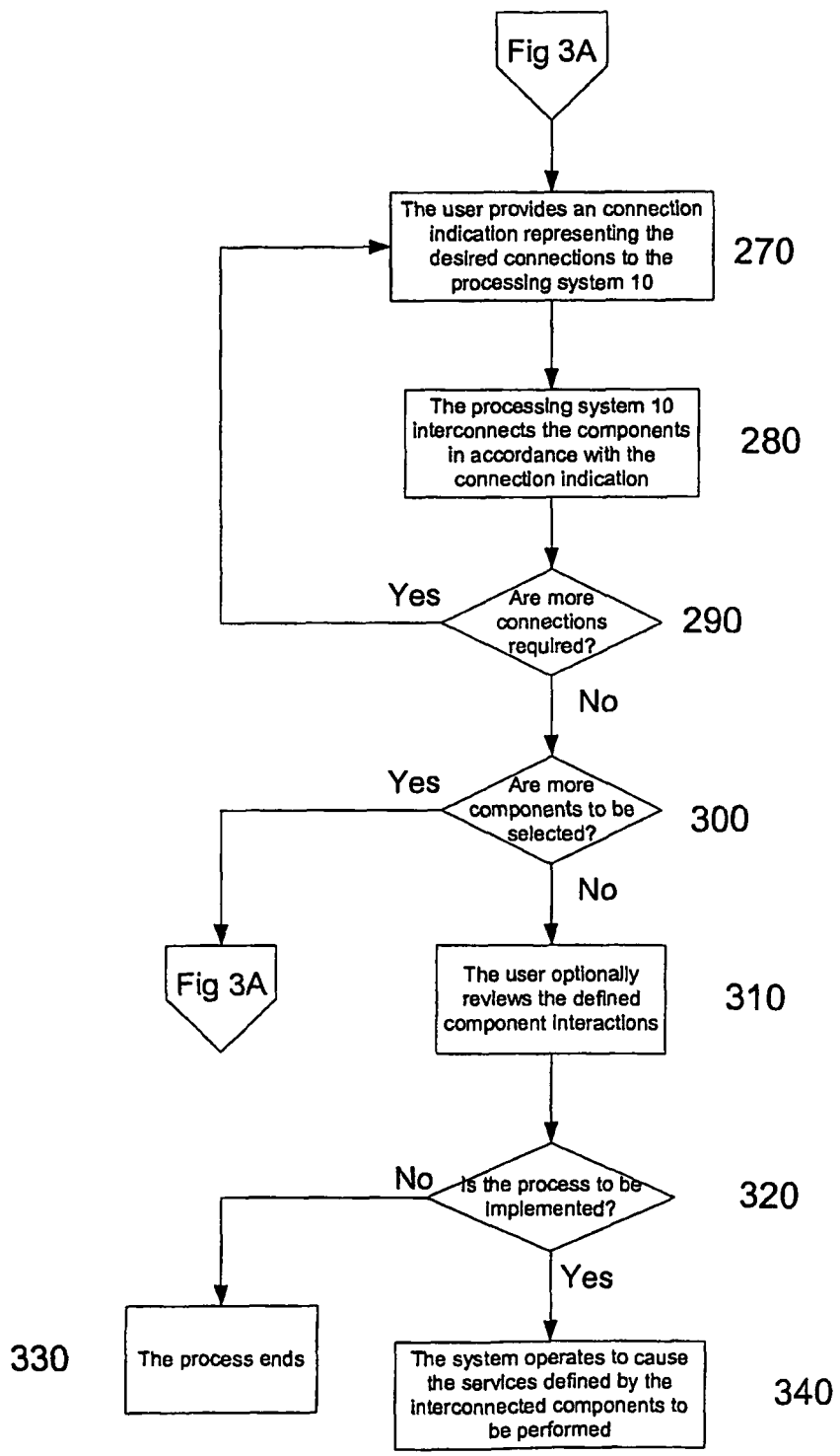

At this point, the user may optionally review the schematic representation and determine if the computer executable code is to be generated, as outlined above for example with respect to steps 310 to 340 in FIG. 3B. In particular, the user will generally be presented with information regarding the overall code generation process, such as an indication of the overall cost, time to build, resource usage, resultant performance, or the like.

This is typically generated by having the end station 3 and the base station processing system 10 cooperate to determine the relevant information. Thus for example, the end station 13 may transfer an indication of the schematic to the processing system to allow the relevant values to be determined, or the information may be included as part of the component specification. If the schematic build process is hosted by processing 10, then the information can be determined and simply displayed to the user on the end station.

In any event, the allows the user to assess whether they are satisfied with the construction process defined by the respective schematic representation, and therefore whether they wish to proceed with construction of the computer executable code.

The construction of the computer executable code by implementation of the services defined in the schematic representation is known as a build process. In one example, this is implemented through the use of agents, which operate to allow the components to interact.

The manner in which this is achieved will depend on the respective implementation. In one example, the agents are adapted to do no more than receive data from another component. In this case, a single transfer of data occurs between the agents on the respective components, and this form of communication may therefore be considered a single event transaction. However, in the event that components are adapted to handle different data formats, negotiation is required to determine common data formats. This will require transfer of a number of messages between the agents known as multiple event transactions. For the purpose of this example, multiple stage transactions will be described, although it will be appreciated that the general techniques equally apply to single stage transactions.

It will also be appreciated that the build process may alternatively, or additionally be performed by the processing system 10, one or more of the entity stations 5, other processing systems, or a combination of the above depending on the respective implementation. However, the remainder of this example will be described with reference to the build process being performed by the end station 3.

In this example, upon receiving instructions to proceed with the build process at step 680, the end station 3 accesses the component and connection data at step 690. At step 700, the end station uses the component data to determine the components to be used in generating the computer executable code.

At step 710, the end station 3 implements a component server which is a software entity executed by the end station 3, to allow the end station to implement a component instance. In this case, the component server is at the highest level in the hierarchy, and is therefore used to implement a root component containing all other components in the schematic. As a result, the component server is known as the root server.

At step 720, the end station 3 uses the schematic and the component specifications to determine those entity stations 5 that are supplying the respective components. At step 730, this information, together with the connection data from the schematic is used to determine details of the required connections between the agents of respective components.

At step 740 the end station 3 generates a purchase order corresponding to each component to be used. In particular, the purchase order is adapted to be sent to the entity providing the respective service, via a respective entity station 5, to request the provision of the services associated with the respective component. In general each purchase order will include at least the following information:

Manufacturer ID
Component ID
Build ID—used to identify the respective build instance
Restrictions—an indication of any restrictions placed on the implementation by the user
Details of the required agent connections.

It will be appreciated that whilst the above describes the use of purchase orders, these are not essential, and alternative techniques for ordering the implementation of services associated with respective components may alternatively be used.

At step 750 each purchase order is sent to the respective entity. In one example, this allows each entity to determine if it is capable of performing the respective service. Thus for example, an entity may become unavailable due to implementation problems such as faults with the computer executable code or unavailability of an individual performing the service manually, or the like.

In the event that a component is formed from a number of sub-components, the inability of an entity to implement the component may arise from the failure of one or more of the sub-components, which in turn may be the responsibility of other entities. This will be determined by the entity station 5 based on responses from entity stations 5 implementing the sub-components and will be indicated to the end station 3.

If an entity cannot perform a service, whether this is due to a problem with the respective component itself, or any associated sub-components, an indication of this can be transferred to the end station 3. If the end station 3 determines not all components can be performed, then the process can either end, or allow the user to update the schematic representation by selecting one or more alternative components.

Thus, for example, the process can return to step 520, to allow different components to be selected.

Assuming the service can be performed, or if no such assessment is made, the entity station 5 generates a component server at step 760 to allow the respective component instance to be performed.

In this regard, the component server implemented by the entity station 5, may need to generate respective purchase orders which are sent to any entity stations providing sub-components used in the implementation of the component. It will therefore be appreciated that the entity station 5 implementing the component can act in a manner similar to the end station 3 by sending out respective purchase orders to entity stations 5 implementing the sub-components. Thus the entity station 5 uses the component specification to determine the sub-components and so on, in a manner similar to steps 700 to 740 performed by the end station 3. This highlights the hierarchical nature of the process.

Alternatively, the data manipulation service may be implemented by executable code, in which case this will be implemented by the component server as a component instance, as will be appreciated by persons skilled in the art. Other options are also available as will be appreciated by persons skilled in the art.

At step 770 the agents associated with each input and each output to be connected are activated. In general, the agents are software entities implemented by the component server implementing the respective component instance. Accordingly, the agents will be activated as soon as the respective entity station 5 has received the purchase order, and has generated the respective component instance. Thus, activation of the required component instances and associated agents will occur in sequence throughout the schematic as the required purchase orders are propagated to the required entity stations 5.

In particular, the agents are activated in a predetermined sequence as will be described in more detail below. In a multiple event transaction environment, as an agent is activated, the agent determines details of the respective data formats and/or types from the respective input/output specification at step 780. At step 790 the agents then compare the determined data formats/types, by establishing a connection in accordance with the connection information provided to the respective component server in the purchase order. In particular, the agents of the respective input and output to be connected transfer messages via the communications networks 2,4 as required, based on the addressing information in the purchase orders.

In any event, to achieve the negotiation, the messages include indications of the respective data formats/types to determine if there are any data formats/types in common. In this regard, it will be appreciated an input and output can only successfully communicate if both the input and output are able to handle a common data format and/or type.

Whilst this may be performed automatically by forming the agents from executable code able to determine the common formats, negotiation may alternatively be performed manually, for example, if the service embodied by the components are manually implemented. In this case, the agent will launch a dialogue box to allow operators at different entity stations to communicate and negotiate. This will typically be implemented in a manner similar to a chat session between the two operators.

If it is determined that there are no data formats/types in common at step 800 the process proceeds to step 810 at which points the agents determine that the components can not be interconnected. This will occur for example if one of the components is outputting data in a first format whilst the other component needs to accept the data in a second format. If this occurs, the build process is halted and the user informed at step 820. This allows the user to take corrective measures to allow the build process to continue. This may be achieved, for example by adding in additional components or agents, or by manual manipulation of the data, to allow the error to be corrected.

In this regard, if the agents are provided on sub-components of a component implemented by one of the entity processing systems, it may be the responsibility of the entity implementing the respective component to ensure that the sub-components establish communication.

Alternatively, the build process can be terminated such that the software cannot be constructed.

In any event, if the respective input and output have data formats/types in common, then at step 830 the agents determine if the respective inputs and outputs are ready to communicate, in which case implementation of the services will commence at step 850.

It will be appreciated from this that in the case of a single transaction event connection being established between agents, this will general involve, simply activating an input agent to receive a message containing data from any another agent. Similarly, in the case of an output agent, the agent will be activated, and will take no action until output data is provided by the component, at which point it will generate an message including the output data and transfer this to another agent. In this case, the steps 780 to 830 are not required.

In any event, the entities will provide the respective services defined the respective component by having the entity stations 5 interact with data received by agents at the inputs in messages from other agents. The data is then manipulated or used as required, before being transferred to the end station 3, or another one of the entity stations 5, as required by the defined schematic representation.

In general, each component will be implemented at the respective entity station 5. In order to achieve this the data to be manipulated will be downloaded from the end station 3, the base station 1 or another one of the entity stations 5, to the respective entity station 5. This will be achieved by transferring the data to a specific port or the like on the processing system 15, as indicated in the component specification. The data will be transferred with the component instance ID to ensure that the correct component instance is used to manipulate the data.

It will be appreciated however that this may be achieved using other techniques, such as providing each content instance at a respective port, and transferring the data to the respective port.

In any event, when a respective component instance receives the data to be manipulated, the component server hosted by the respective entity station 5 will interact with the data, modifying the data as required before providing the modified data at one or more of the output ports. Thus, the data may be manipulated by the executable code implemented by the respective component server, or manually, in accordance with input commands from an operator. In this latter case, it will be typical for an agent receiving data to present this to the user via a suitable interface, and then allow the operator to modify the data before transferring it to an output agent. Accordingly, from this it will be appreciated that the agent may serve no more purpose than to provide an interface to allow an operator to interact with data and other components.

In any event, once the service has been performed the data will then be transferred to the base station 1, or the end station 3 for temporary storage in the memory 21 or the database 11, before being transferred to the input port of the entity station 5 hosting the next component instance. Alternatively however the data provided at the output port of a component at one of the entity stations 5 could be transferred directly to another entity station 5, for subsequent manipulation by another component.

It will be appreciated that during this process, data may also be manipulated simultaneously by several different components depending on the format of the component specification.

In addition to this, it will be appreciated that in practice not all of the components will interact with data that will ultimately form the executable code. Instead, some components may only operate to exchange data between themselves. In general, this can therefore be performed as soon as the agents are activated and have established communication between the respective component instances.

It will therefore be appreciated from this and the above description, that parts of the service implementation may begin almost immediately as soon as the build process is started. In particular, as soon as any two agents have connected and data is ready to be exchanged, this will be performed.

In contrast to that, components which require data to be received from other components will await for data before commencing to perform the respective associated service.

Furthermore, it is usual for the base station 1, the end stations 3, and the entity stations 5 to be effectively interchangeable or implementable on a common processing system in the examples outlined above. Accordingly, the processing system 10, 15 and the end station 3 will generally execute applications allowing the functionality of each of the base station 1, the end station 3, and the entity station 5 to be implemented. For example, this allows an entity to use the entity station 5 to create executable code in the manner outlined above for the end station 3, and vice versa.

Thus, for example, an entity may have a number of processing systems, some of which operate as entity stations 5, and some of which operate as end stations 3, depending on the functionality required at the time. Thus, for example, the entity may be providing a number of component instances, the implementation of which is distributed across the processing systems. In this instance the functionality provided by the processing systems will be equivalent to either or both of the end stations 3 and the entity stations 5, as required.

It will be appreciated that performing the implementation of components will typically require a support structure, and it is therefore common for the entity to have an infrastructure in place including a number of end stations 3 that will be used in supporting the implementation of the service, as well as to allow software to be generated.

In the case of an entity providing a service, the entity would typically have a number of entity stations 5 that will be automated. However, if an exception, or other error occurs, such that the component cannot complete the service, then the entity station 5 will hand-off or transfer the component to another entity station 5 that is operated by an individual. This allows the individual to provide manual feedback to allow the exception or error to be resolved, if possible. Otherwise, an indication that the problem cannot be resolved will be returned to another component or entity within the system. Thus, if the problem occurs with a sub-component an indication of the problem will initially be returned to the parent component. This will continue with the exception being passed up the chain until it can be resolved.

Some of the features of the implementation described above, such as the nature and operation of the agents is described in more detail below.

Example Implementation

It will be appreciated from the above that the base station 1 allows services provided by a number of different entities, typically at respective entity stations 5, to be accessed centrally by a number of different users. This allows components provided by entities to be reused a large number of times in the creation of numerous different software applications.

In one example, this in the form of a forum that provides users with a means to access the different services. The forum may be implemented using a single base station, as in the example described above. However, persons skilled in the art will appreciate the forum may be implemented using a number of base stations, the end stations 3, the entity stations 5, or any other suitable processing systems, with the forum being distributed between the base stations, end stations 3, entity stations 5 and/or other processing systems as required. The forum operates to provide a mechanism for marketing components to make these available for selection by the users.

The following description therefore focuses on the implementation of the system using a forum, although the techniques are equally applicable to any implementation, such as the use of a single base station.

In use, it is typical for each entity to define a fee associated with each component. This fee corresponds to a fee payable by users of the forum, for the use of a respective component instance service. Thus, the users pay one or more fees to each entity in return for the provision of one or more services provided by the entity.

This allows the entities to charge a fee for the provision of the respective services, thereby allowing the entities to obtain income to recoup the investment made in the development of the respective components. This in turn allows entities to specialise by providing, and obtaining financial return for, specific well-defined services.

This is in contrast to current software construction techniques in which entities typically only obtain financial benefit by constructing all the required executable code for entire software applications.

This in turn allows entities to focus on optimisation of a specific service provision, rather than trying to create an entire software application that typically would garner less detailed attention.

By having the forum provide users with access to a number of components, provided by different entities, and which provide similar services, this will force entities to compete against each other to provide similar services to the user. The resulting market forces will therefore drive competition between the entities, thereby forcing each entity to improve the provision of its respective service.

In particular, users will tend to select components that are deemed to be more successful. As a result, entities compete with each other at the component level to provide increasingly successful components. This allows the entities to invest more time and money in improving the implementation of the specific components, whilst recouping the investment as more successful components will be implemented a larger number of times.

In this regard, components may be deemed to be more successful if they are cheaper, faster, result in more optimal code, or the like, when compared to other components offering the same service.

From this, it can be seen that market forces and direct competition at a specialisation level will lead to improvement in each service provided through the forum. Thus, each component at every level within the hierarchical structure will be optimised resulting in the generation of optimal code with no bugs or other errors. This reflects an industrialised approach to software creation in which competition occurs directly at the specialisation level.

In order to help competition within the forum, the user will be provided with information to allow an assessment of which are the best components for use in constructing the respective application. The user can then select components in accordance with a wide variety of factors including, for example:

The entity performing the respective service;
The cost;
The location of the entity performing the respective service;
The popularity of the component;
The data format/types that can be received by or output from the component; and,
Ratings given to the component by previous users or the forum.

In this regard, the forum will generally provide a rating system allowing users to rate the effectiveness of components. Ratings can be determined statistically, for example by determining the number of build faults that occurred for each respective component, by user feedback, or by testing of the components by the forum itself.

It will be appreciated that whilst market competition through the use of reviews or the like exist, this is normally provided with respect to entire software code. In contrast, the review and rating in this instance is performed at the component level thereby forcing the improvement of individual components, as opposed to entire software applications.

It will be appreciated that other factors may also be used in judging the success of components.

In any event, in order to remain competitive, each entity will focus on providing well-defined, efficient service implementations, allowing vastly improved software to be created. It will be appreciated that as components improve so will entire software applications thus the development of the new software generation technique will lead to rapid improvement in software applications.

In order to allow the operators of the forum to make a profit, it will also be typical for at least a portion of any fees charged by the entities, to be provided to the operator of the forum, allowing the operator to obtain profit based on usage levels of respective components. However, alternatively, subscription charges or the like could be applied to individuals wishing to use the system, or entities wishing to submit components to the forum.

Accordingly, the above described system allows the software development process to accommodate international competition at every level of the binary code outcome, down to the bytes in the generated binary output.

This international competition leads to acute specialisation which in turn causes automation, where the specialisation achieves such an understanding of a narrow field that it can be captured and reduced to rules or the like. Once reduced in this way some semi-automatic means can be employed with the aid of a machine to improve productivity. With time and further specialisation this can evolve into fully automated means.

Thus specialisation in the process provides access to both competition and automation. The former results in ever improving quality as options are exercised based on market forces, while the latter greatly improves productivity.

In general, every software development effort starts with a requirements document distilled from customer expectations, needs and wants, and ends with an outcome of a binary program. It is therefore unimportant how the process arrives at the outcome.

The above system therefore allows executable binary files to be constructed by selecting and coordinating a number of specialists each of which provide a service. In analogy to building a house by coordinating services like roof truss supplier, a crane operator and transport contractor. The trusses can be manufactured, delivered to the site and erected into place with simple coordination.

Typically the system is embodied in two major parts, Workstations and a Forum. In this case, a large number of workstations and a singular Forum are networked together with some kind of LAN Internet, with each workstation being a specialist that is capable of providing some service based on their specialisation. Once the service is implemented and tested the specialist can use the network connection to retail the service via the Forum since potential customers must be aware of the service in order to locate the appropriate workstations and its respective specialist.

The Forum registers and organises advertising for all the services supplied by the specialists at each workstation. Accordingly, software can be constructed by simply visiting the Forum and noting a number of services that must be retained to build a required binary. Once this has been completed, the respective workstations used in implementing the offered services are contacted to thereby cause the various specialists to perform the necessary work.

Formally encapsulated services are an example of an implementation called components. As part of the encapsulation process a component representation is registered with the Forum.

Any workstation, including the specialist's workstation with access to this retail network of services can construct software. Workstations can include tools that can encapsulate services for retail and register them with the Forum, as well as tools that can build software by coordinating the component services across the network. Thus with suitable tools to both retail and retain services, workstations can be used to create our software and contribute to the creation of others.

In a preferred example, the Forum provides a portal through which the other tools can operate more effectively. For example, rather than visiting the Forum and noting the contact details of a service you would like to retain, the Forum can deliver a graphical symbol that represents the service in question complete with the service description, service retailer location, etc directly from within the coordination tool. This includes all the pertinent information needed to locate the retailer should they be required at some future date, like a business card.

The Forum allows the registration of other useful information in addition to the purchase details. Information like the cost and expected length of time to complete the service are obvious candidates while more interesting information about the outcome of the service like estimated resource usage and performance are exceedingly helpful in making a decision to proceed with construction.

A designer program can be used to create a schematic of the proposed binary considered for construction. A schematic consists of a collection of graphical symbols representing each of the services that make up the construction team. This collection of symbols are arranged and connected so that all the services will have sources for the necessary information to complete their task as well as the destination necessary to deliver their outcomes.

The designer program allows the operator to construct the schematic by opening a portal to the Forum and allowing the operator to select from the products advertised there. In this way the graphical symbols are dragged and dropped from the Forum onto the schematic, arranged and connected.

The portal to the Forum also provides details about the services that are of great assistance to the operator. When the schematic is complete the Designer Program can compute the total cost of the proposed binary, the total time to construct the proposed binary the expected size of the binary and expected performance of the binary.

The operator can then make a judgement on whether to proceed with construction and incur the associated costs, time etc.

Component servers can provide the retail services embodied in the components. When the component is registered with the Forum the component is available for purchase by any entity on the network. The operator should be expecting to perform the service immediately or risk losing business due to unreliable service. It is the component server that presents the retail interface to the network. To be in a position to perform the service the operator starts the component server on the workstation and loads the component that encapsulates the service into the server program. Once loaded the component server program waits for build requests from the network. A build request is a package of data that contains a purchase order for the component, details of sources of information the service requires, details of destinations the service requires, purchaser details etc.

A specific example of the process will now be outlined.

A user decides on the requirements for a binary program. The user starts the designer program on a workstation connected to a network of component servers and a Forum. Using the designer program the user selects a number of component representations from the Forum, which are dragged and dropped onto a new schematic for the binary program. When all the components are on the schematic they are connected together to satisfy the input and output requirements of the components selected. The schematic is then saved onto the hard drive for access by the component Server which will be used to coordinate the construction process.

When the schematic is finished the user makes a decision on whether to build based on the cost, resource usage, schedule etc.

The user then starts a component Server and loads the schematic into the server. Once loaded the component server is available to retail the component. It should be noted however that this component is not registered with the Forum since it is not intended to be retailed.

This is a special case component called the "Root Component". The user then issues a build request to this component server essentially purchasing an instance of this schematic. When the component server receives the build request it scans the schematic and compiles a list of build requests for each of the components in the schematic. These are then issued to the respective component servers over the network. They in turn create a new instance of their component and load their corresponding schematic and issue build requests and so on down the supply chain until all the services are activated.

The user's schematic thus decomposes into a collection of manual and automated components scattered across the network. As each service embodied by the respective component is completed the outcome is forwarded to the correct parent component until the binary result is returned to the root component server and the process completes. The user then has a binary program that is the result of the build process.

Further details of an example of the implementation of the processes outlined above will now be described Agents In the examples above, agents are the only form of inter-component communication. Agents are responsible for providing and gathering all the information a component needs to complete the service it embodies. An agent is generally formed from a simple piece of executable code with limited functionality, and this may form part of, or be implemented by the component server. In use the agent is adapted to communicate with agents of other components via respective ports. The agents typically communicate by transferring messages as will be described in more detail below.

In particular, when the end station 3 sends out purchase orders to the entity stations 5, the reception of a purchase order causes each entity station 5 to implement a component server to generate a new component instance, and corresponding agents that are capable of finding and connecting to the agents of other components. This may be performed as described above, or for example by having connection details specified in the purchase orders. The agents only ever connect to (communicate with) other agents, although manual interaction with the agent as part of the performance of the data manipulation may occur.

Figure 15:
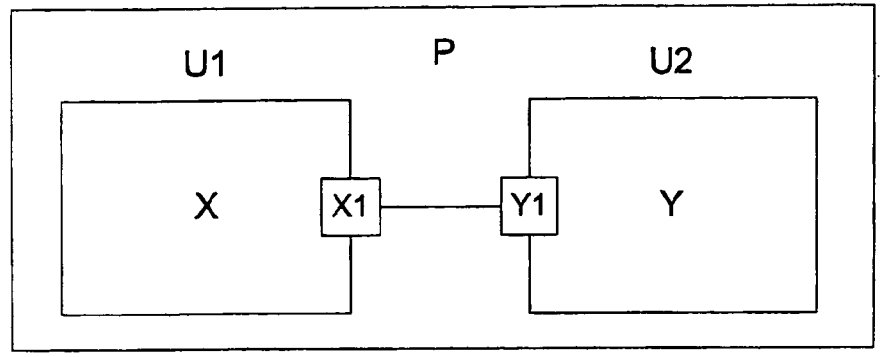
FIG. 15 is a schematic diagram of an example of a schematic representation for two interconnected components.

In particular, an example will now be described with reference to FIG. 15, which shows a schematic P having components X and Y connected by agents X1 and Y1.

In order to specify the address of a particular agent for a particular component instance, it is necessary to be able to identify the agent uniquely. Accordingly, for the purposes of this example, the component X is manufactured by an entity having a manufacturer ID IDx, and component Y is manufactured by a an entity having a manufacturer ID IDy.

When schematic P is laid out, the component representations for the components X and Y are downloaded, typically as part of the component specification, arranged and connected in the schematic representation P using the method described above with respect to FIGS. 10A to 10E. As the schematic is constructed, each component is given a unique label, as shown at U1 and U2. These labels allow schematics with more than one component of the same type to reference the correct instance of that component.

Associated with the respective component representations are the component specifications, including the manufacturer ID, and part number. The component specification will include input and output specifications detailing the agents, which for this example is exactly one for each component.

Before the schematic can be built, the user creating the schematic P must be specified so that the entities IDx, IDy can bill the user. In this example, the user is given an identifier IDp. Once this information is contained in the schematic it is ready to be built.

The process of building a schematic results in a number of entities being contracted with purchase orders. Thus the decision to build will incur costs and contractual responsibility. A mistake in the schematic may result in a bad build wasting time and money.

Assuming the build is to proceed, the next step is to submit schematic P to the builder program. The builder program interprets the schematic and compiles and issues purchase orders for each component in the schematic. The purchase orders for the component X would contain the following information:

Base station identifier 1
    Schematic identifier P
    X component label U1
    Entity identifier IDx
    Entity part number X
    Component X agent connection details, including:
        Entity identifier IDy
        Entity part number Y
        Component Y agent number Y1
        User's identifier IDp Schematic identifier P
Y component label U2

The purchase order for the component Y would include similar information.

Should the component being purchased have more than one agent, then each agent must have separate connection details included with the purchase order specifying each agent's respective target.

When the entity IDx receives the purchase order from the user IDp, the entity IDx creates an instance of the component using a component server. At this point, the agents are created by executing the code associated with each of the agents.

After the provision of the purchase orders, the respective instance of the component X now has the information it needs for the agent X1 to communicate with the agent Y1.

In a basic example, if the agents are only adapted to perform single event transactions, then the only form of communication is for one of the agents, in this example the agent X1 to generate a message including a header and payload. The header will specify routing information needed to the transfer the message to the agent Y1, whilst the payload will contain any data to be transferred.

The message will be transferred to the agent Y1, which will receive the message and extract the data from the payload. With the task complete, the agents can terminate.

However, alternatively the transaction may be a multi-event transaction, in which case the agents will operate to connect and perform multiple transactions, such as to perform negotiation. In this case, one of the agents will generate a message including a header and payload, as before. In this case, the purpose of the message is to establish communication, and accordingly, the nature is not important, although it may contain information used to authenticate the agents to each other.

In any event, once communication has been established, the multiple messages can be transferred between the agents as required, for example to allow agent negotiation to be performed.

Figure 16:
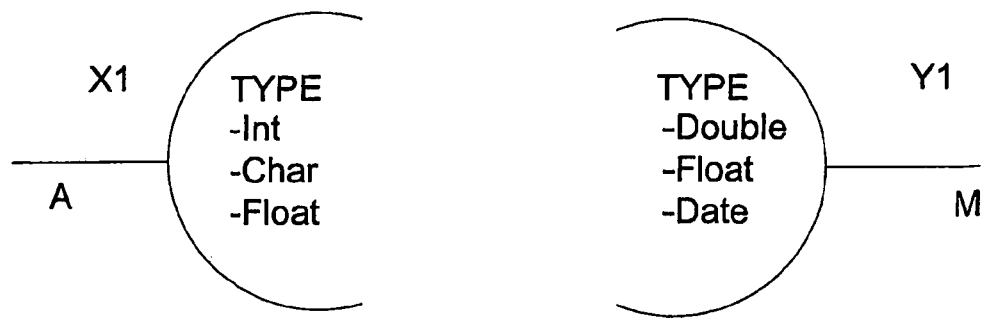
FIG. 16 is a schematic diagram demonstrating the operation of the agents of FIG. 15.

Thus, for example, in the event that the agents are adapted to handle the data types shown in FIG. 16, the agent X1 can handle integers INT, characters CHAR, and floating point numbers FLOAT, whereas the agent Y1 can handle double inputs DOUBLE, floating point numbers FLOAT, and dates DATE. Accordingly, the agents will determine the component X must provide the output in the form of floating point numbers FLOAT.

From the above it will be appreciated that the agents are the only form of inter-component communication. As a result the agents must be able to communicate via the communications networks 2, 4.

Whilst the agents are themselves simple, processes called bundling and hand-off allow agents to exhibit complex behaviour and powerful information providing and gathering capabilities.

The hand-off mechanism terminates an agent to agent transaction and opens another. This is most useful when a component is using the agent of a sub-component as if it were an agent on the component itself. Worked examples help to clarify the hand-off procedure and an example of hand-off to a sub-component is presented.

Bundling is a recursive mechanism by which multiple agents related by a specific purpose can be treated as a single simple agent. Worked examples help to clarify the bundling and debundling mechanism and an example of bundling and debundling components are presented.

Component Server

The component server is a software application provided at the entity stations 5 to allow the entity stations to implement components. In particular, the component server is adapted to receive a purchase order generated by the end station 3, and then use the purchase order to create a new component instance, together with appropriate agents.

Once this is completed, the local component server activates the agents associated with the component, in a process hereinafter referred to as presenting the agent. All agents by definition are connected to another agent associated with another remote component. When an agent is presented, it is made available for interaction with its counterpart operating in its remote component server.

Figure 17B:
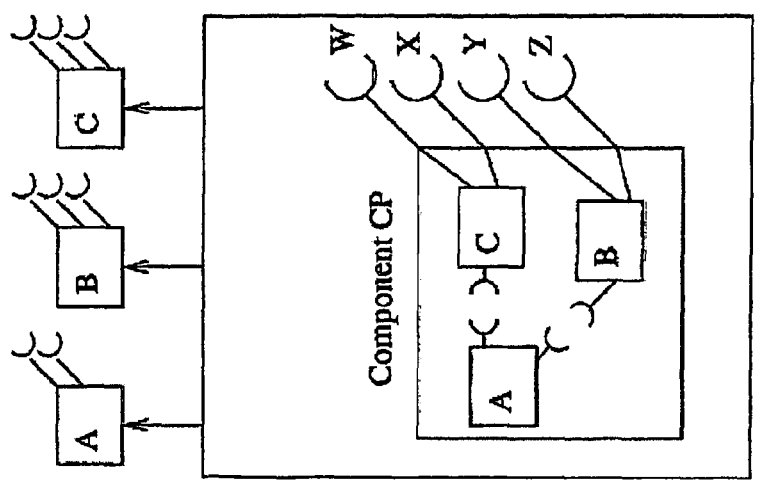
FIG. 17B is a schematic diagram demonstrating the operation of the component server of FIG. 17A to present components to the base station of FIG. 5.
Figure 17A:
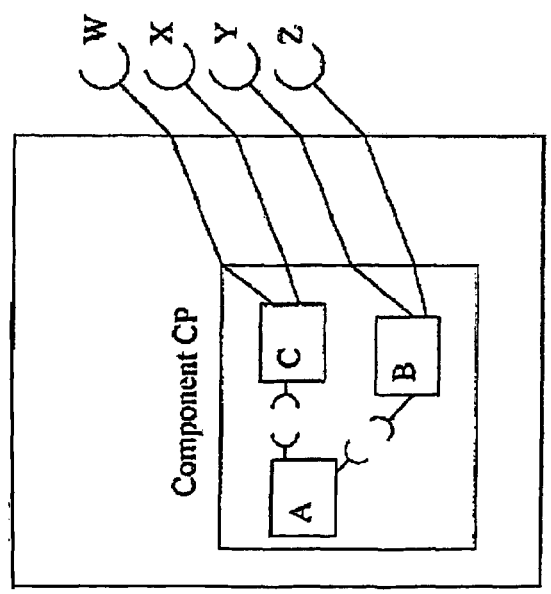
FIG. 17A is a schematic diagram demonstrating the operation of the component server.

An example will now be described with reference to FIG. 17A, which represents a component CP. In particular, the component CP is formed from three sub-components A, B and C, and is provided with four agents W, X, Y and Z.

Upon receiving the purchase order from the end station 3, the component server will initiate the construction of the component instance that is to perform the service in the respective build process.

In order to achieve this the component server operates to:
Submit purchase orders PO to the entities supplying the services associated with the respective components A, B and C, as shown in FIG. 17B;
Provide the data required to each of the sub-components A, B and C, to allow each of the sub-components to perform the services defined therein; and,
Supply sub-component agent addresses to allow the components A, B, and C to be erected once their agents have terminated.

In general, the component server contains many components at various stages of erection but for the purposes of the following explanation the component server will only operate on one component.

In particular, the component server presents the agents W, X, Y, Z to allow these to communicate with agents of other components, as required by the schematic. In addition to this as the component CP has sub components A, B and C, a number of internal interactions must also be resolved.

In general, users of the component CP are unaware that the component CP is formed from a number of sub-components A, B, C. Accordingly, the user needs not provide details of the interactions that need to be performed between the components A, B, C as this will be determined by the entity providing the component CP. Accordingly, when the component server orders the components A, B and C, the component server will also provide details of the interactions required between the components A, B, C.

Figure 17C:
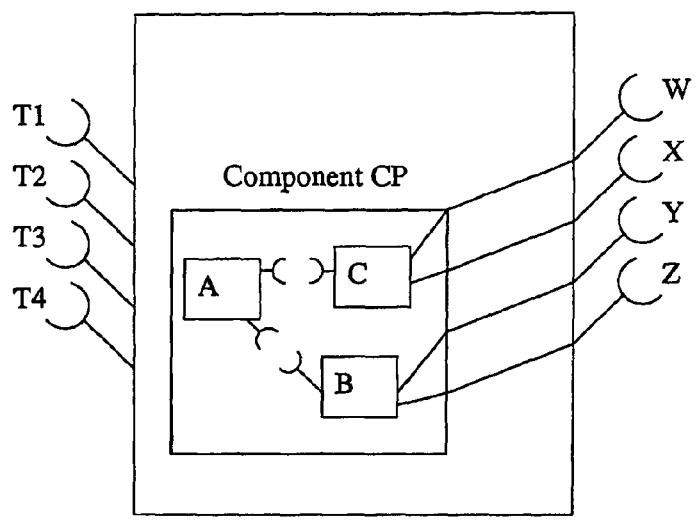
FIG. 17C is a schematic diagram demonstrating the operation of the component server of FIG. 17A to present agents to other components.

The component server also presents temporary agents T1, T2, T3 and T4 as shown in FIG. 17C to provide the interface between the internals agents of the component CP and the sub-components A, B and C. These temporary internal agents T1, T2, T3 and T4 are presented along with the external agents W, X, Y, Z as shown in FIG. 17C, thereby allowing the component to be implemented with all the agents having a chance to resolve and connect.

Hand-Off

In addition to agents making a static connection there exists an agent hand-off mechanism. The agent hand-off mechanism allows an agent to agent connection to terminate with one of the agents reconnecting to yet another agent.

This behaviour provides a means by which multiple agents can be managed as if a simple agents. This is achieved by a component performing some simple information transaction then handing the agent-off to another component to negotiate further. With only these simple transactions a complex overall transaction can occur with from appearances, a single component.

In particular, hand-off allows a component to present a service that internally is made up of carefully crafted arrangement of sub-components or processing. Thus although a component presents a number of agents and appears to perform a given service, in actual fact the service is supplied by many sub-components which have at least some of their agents satisfied by a hand-off from a parent agent. In order to achieve this, an agent of the parent must first connect to some outside component, then order that agent at the other end to connect to a sub-component.

A walk through of the hand-off mechanism demonstrates the steps involved in the hand-off process.

Figure 18A:
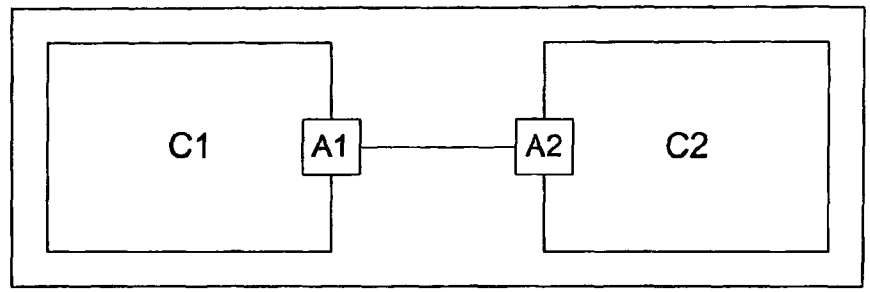
FIGS. 18A to 18E are schematic diagrams of a first example demonstrating the operation of hand off of agents.
Figure 18B:
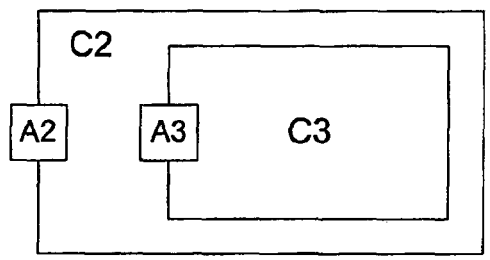

FIG. 18A represents a schematic involving a hand-off. In FIG. 18A agent A1 of components C1 and agent A2 of component C2 connect as normal, however C2 has sub-component C3 as shown in FIG. 18B.

Figure 18C:
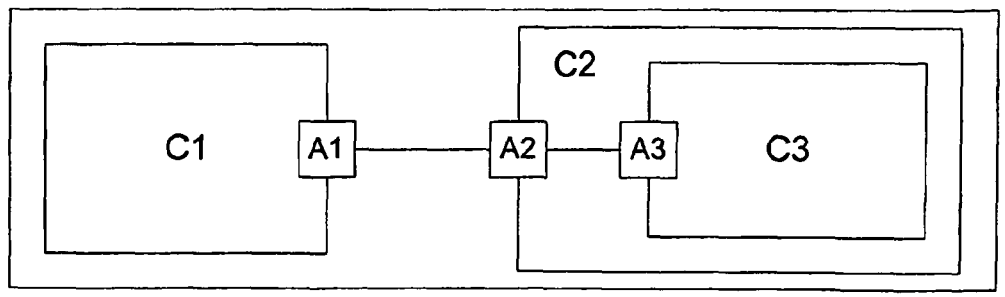

The component C2 intends to hand-off the agent A1 to the agent A3 of the sub-component C3 as shown in FIG. 18C.

Figure 18D:
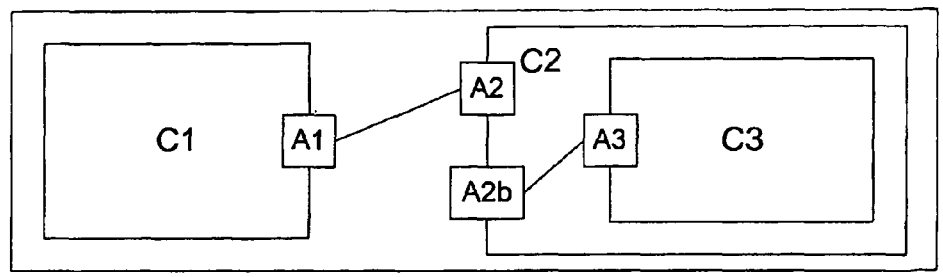

To simplify the agent protocol, it is assumed that each agent only connects to one other agent at a time. Thus the agent A2 could not connect to the agents A1 and A3 at the same time. As a result of the agent A2 being connected to the agent A1, it is not possible to include details of the agent A2 in the purchase order that cause component C3 to be generated. To allow the component C3 to be built and access to the agent A3 to be gained, a temporary agent A2b is created as shown in FIG. 18D.

The details of agent A2b can be included in a purchase order, allowing the component C3 to be built and the agent A3 to connect to agent A2b providing means for the component C2 to communicate to the component C3. When the agent A1 is connected to the agent A2 and the agent A2b is connected to the agent A3, the component C2 can direct the agents A2 and A2b to terminate and cause the agent A1 to reconnect to the agent A3

Figure 18E:
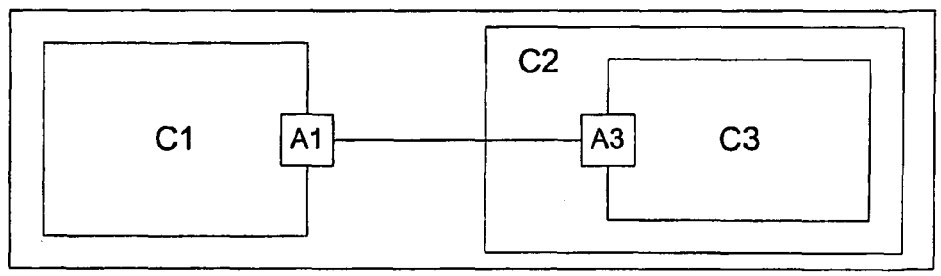

Thus, the component C2 uses the local agents A2 and A2b to communicate the hand-off order to the agents A1 and A3 respectively, resulting in the agents A1 and A3 connecting as shown in FIG. 18E.

This is generally achieved by having the agents exchange the identifiers of A1 and A3, allowing them to connect directly.

Figure 19:
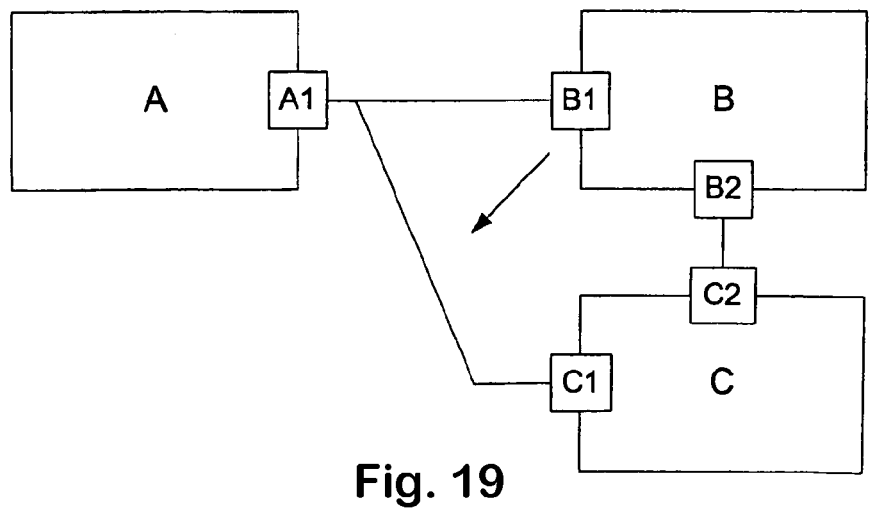
FIG. 19 is a schematic diagram of a second example demonstrating the operation of hand off of agents.

An example of the hand-off mechanism handing from one component to another will now be described with reference to FIG. 19. In particular, in this example, the schematic includes three components A, B, C, each of which has respective agents A1; B1, B2; C1, C2.

In this example, the agent A1 gets the address of the agent B1 from the schematic purchase order. Similarly the agent B1 gets the address of the agent A1 from its schematic purchase order. Using the agent connection mechanism outlined above agents A1 and B1 connect and authenticate.

Agents A1 and B1 perform their information transfer, which results in the agent B1 deciding to hand off the agent A1 onto the agent C1. The component B obtains the agent address of the agent C1 by having the agent B2 communicate with the agent C2. The agent B1 then uses its authenticated link to the component A, and sends a hand-off request together with the agent address of the agent C1.

The agent A1 simply disconnects from the agent B1 and connects with the agent C1. Should the agent C1 be busy with a connection elsewhere. The agent A1 simply waits for the agent C1 to become available. Similarly the component B obtains the address of the agent A1 and transfers this to the agent C1, allowing the agent C1 to reconnect to the agent A1. Thus, the connection between agents A1, B1 and agents B2, C2, is handed-off as shown by the arrow, to result in connection between the agents A1, C1, as shown.

As mentioned above, the agents may be no more than a "dumb" interface to allow manual negotiation and data transfer, for example through a chat or e-mail type interface.

It will be appreciated that hand-off is not strictly necessary in single event transaction systems, as the messages can simply be forwarded on to subsequent agents.

Combining Agents

As described above, each agent interacts with one other agent, which is typically associated with another component. In general, components may include many inputs and outputs and therefore may have many agents. If it were necessary for individuals to define connections between each agent of each component when creating the schematic, the task would be onerous in situations where a large number of related connections are to be made.

Accordingly, it is typical for related agents to be combined, thereby allowing a single connection to be defined. This may be achieved using complex payloads and/or bundling.

Complex payloads are formed when the payloads from each of the agents are combined into a single payload. In this case, a component P having sub-components A, B, C could have a single external agent, which provides a single payload which corresponds to a concatenation or other combination of each of the payloads of the agents of components A, B, C. In this case, the single agent can be presented to a component Q having sub-components D, E, F. In this case, in order for the sub-components D, E, F to interact with the data, it is necessary for the complex payload to be deconstructed by the component Q, to allow respective individual payloads to be formed, which can then be provided to the agents of the components D, E, F.

In the case of bundling, agents are combined via the use of a bundle component such that two or more agents are effectively treated as a single agent. An unbundling component is then used to deconstruct component bundles as required. This in turn allows agent hand-off to be implemented so that agents not actually involved in any interaction can transfer the interaction requirements to other agents as described above.

This allows complex interactivity between multiple components whilst presenting to the user as a simple single agent.

Bundling

Often a component will require a number of agents to resolve information for a specific task. Since these agents are sometimes related it makes sense to group the agents into a bundle to hide the complexity and so deal with the bundle like a single agent. This greatly simplifies the schematic and reduces errors.

Thus, the purpose of the bundling is to manage agents more effectively. Although not strictly necessary bundling allows related agents to be attached to each other so that their relationship is preserved making the management of large numbers of agents an easier task.

Special components provide the service of bundlers/debundling and these will hereinafter be referred to generally as bundlers. In this example, bundlers have three agents—two "inputs" and an "output", whereas bundlers operating to debundle (which may be referred to as "debundlers") have two "outputs" and an "input". The terms output and input are in inverted commas as the bundler and debundler perform almost exactly the same task. They both gather the addresses of a pair of agents and send it through a third agent, however the bundler is the one that initiates the communication, and so gathers the addresses first—making the pair of agents inputs and the lone agent an output. As soon as the debundler has received the addresses through its input the roles are reversed. Once the bundler and debundler have swapped agent information, they hand-off the connected components to each other and retire. If either of these connected components is a bundler or debundler, the process begins again.

Figure 20A:
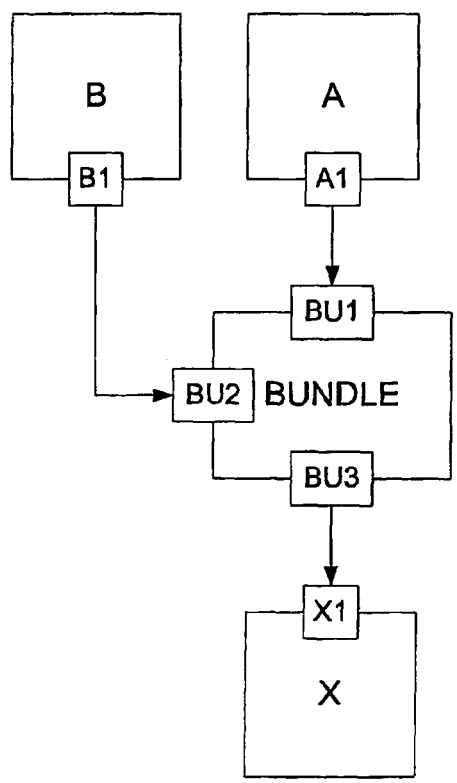
FIGS. 20A and 20B are schematic diagrams demonstrating the operation of agent bundles.

FIG. 20A represents two agents A1, B1 from respective components A, B coupled through a bundle component BUNDLE, which provides bundle agents BU1, BU2, BU3. The bundle agent BU3 is used to connect to the component X. The bundle agents BU1, BU2, BU3 are indistinguishable from a normal agent.

In use, the component BUNDLE depicted in FIG. 20A receives connections from the agents A1, B1 and presents the agent BU3. The role of the agent BU3 is to provide the addresses of the agents A1, B1 to the component X.

In the example shown in FIG. 20A, the components A, B, X receive addresses of the agents BU1, BU2 and BU3 respectively from the schematic purchase orders. Similarly the bundle component BUNDLE gets the agent addresses A1, B1 and X1 from a respective schematic purchase order. The agents A1, BU1 connect and authenticate while the agents B1, BU2; and, X1, BU3 do the same. The component X negotiates with the component BUNDLE and determines that the payload of the agent BU3 represents a bundle.

Figure 20B:
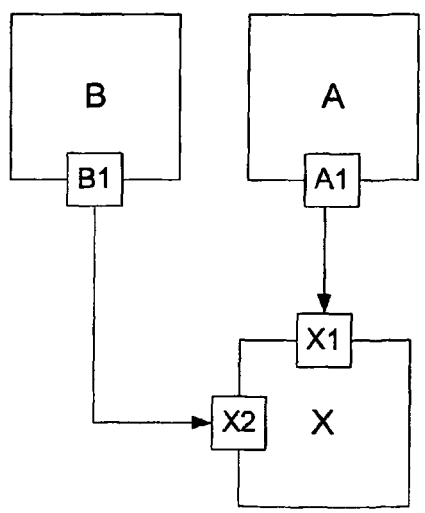

Accordingly, by using the hand-off mechanism as described above, the component X can determine the addresses of the agents A1, B1, and order the bundle component BUNDLE to hand-off A1, B1 as shown in FIG. 20B. Thus, in FIG. 20B the component X through agent BU3 learns of the agents A1, B1. The component X then orders the bundle component BUNDLE via the agent BU3 to hand-off the agents A1, B1 to the agents X1 and X2 respectively. The bundle component and its respective agents has then completed its service and can retire.

Figure 21:
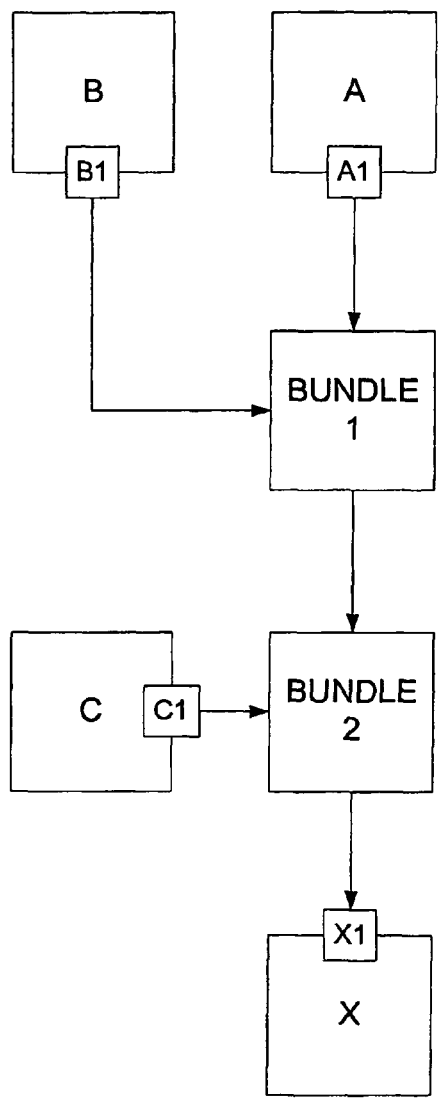
FIG. 21 is a schematic diagram demonstrating the operation of a sequence of agent bundles.

The bundling component BUNDLE as shown in FIG. 21 has no concern as to the nature of the agents A1, B1. As far as the bundling component is concerned, they are any two agents and their payload is irrelevant. This enables cascading of bundling components as shown in FIG. 21. Any number of bundling components may be cascaded.

In addition to providing bundle components for bundling agents, debundling components are provided for performing the opposite function.

Figure 22:
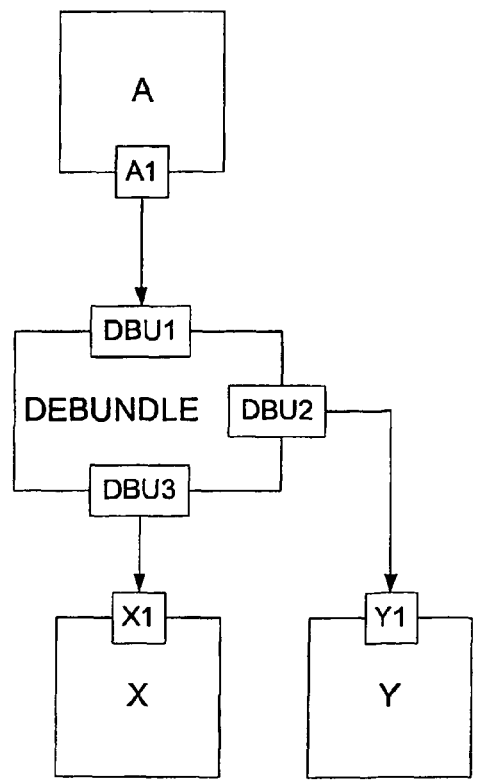
FIG. 22 is a schematic diagram demonstrating the operation of a debundle component.

An example of this is shown in FIG. 22, in which a component A is coupled to a debundling component DEBUNDLE, which in turn is connected to two components X, Y, as shown. In this example, the debundling process starts with the component agents A1, DBU1; DBU3, X1; and DBU2, Y1 connecting and authenticating as specified in the purchase order.

The debundling component then learns the addresses of the two agents represented by the bundle. It then requests X1 and Y1 to hand off in accordance with the addresses provided by agent A1. At this point the debundling agent has then completed its service and can retire.

Figure 23:
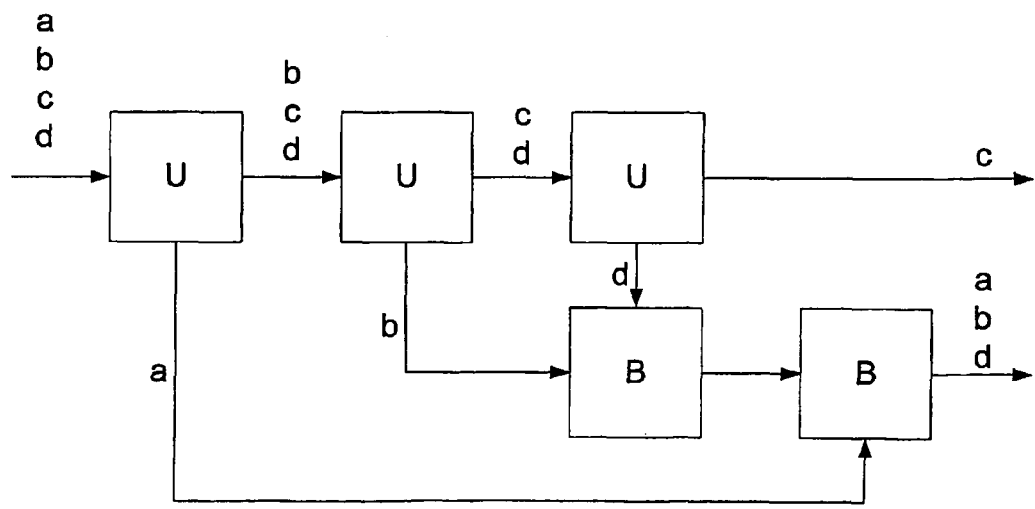
FIG. 23 is a schematic diagram demonstrating the operation of bundle manipulation.

With components bundle and debundle a number of useful operations can be performed on bundles. For example, agents a, b can be reordered within a bundle by extracting the agents a, b from the bundle and reassembling the bundle with the agents b, a in the reverse order. Furthermore, selective debundling can be used to extract desired agents from bundles, as shown in FIG. 23.

In this example, a respective agent c in a bundle of agents a, b, c, d is required to be separated from the bundle. This is achieved by debundling the bundle using the debundle components U until the agent of interest is available, then rebundling the bundle using the bundling components B.

Hierarchical Bundling

It is typical for agent bundles to include a large number of agents, up to for example a hundred or more. In order to improve the efficiency of the bundling/debundling process, it is typical for agent bundles to be arranged hierarchically so that those agents or bundles of agents which need to be accessed on a large number of occasions are more easily accessible.

Figure 24A:
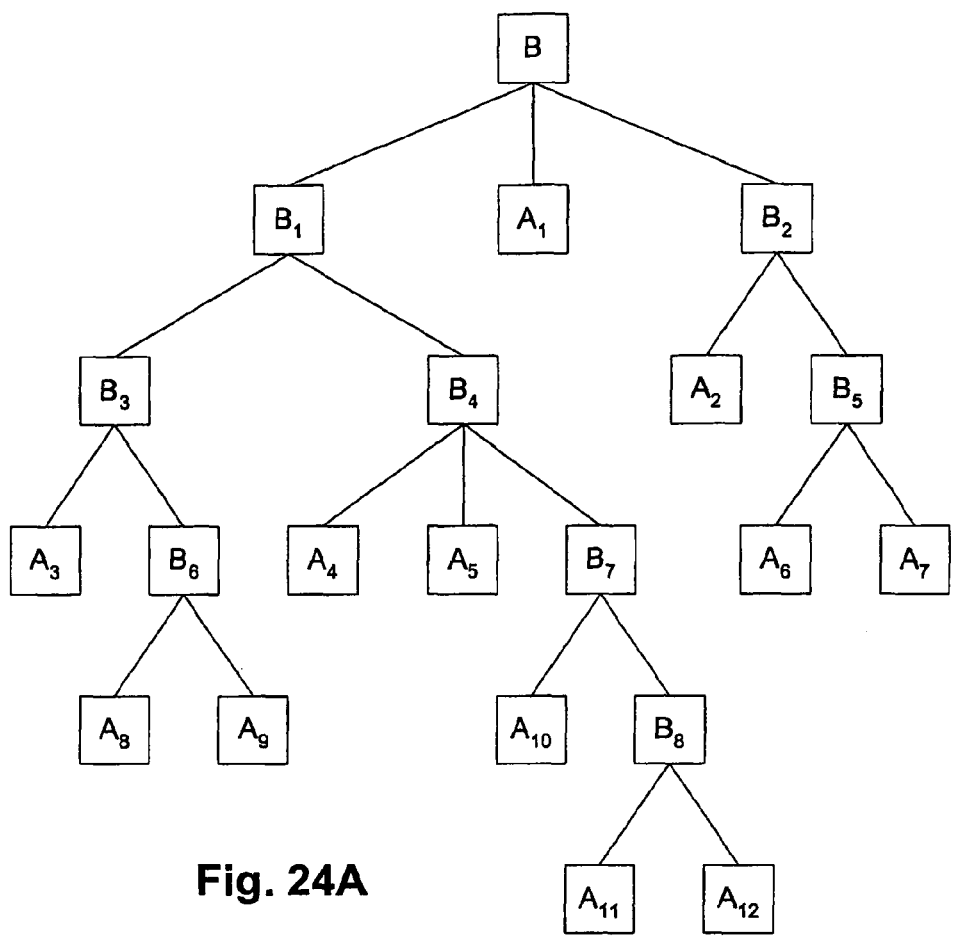
FIG. 24A is a schematic example of a hierarchical bundle.

A number of different hierarchy structures may be used, such as linear or dynamic hierarchies or structures reflecting the application. Bundles can be arranged in a hierarchical tree fashion as shown for example in FIG. 24A.

Figure 24B:
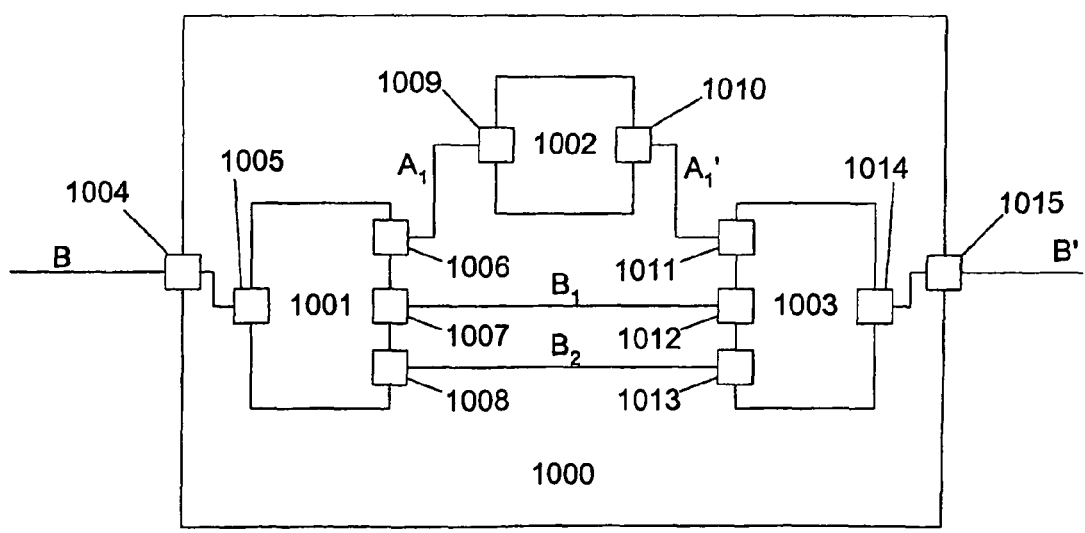
FIG. 24B is a component schematic of an example of a component adapted to modify the payload of the agent $A_1$ shown in FIG. 24A.

This presents the structure of an example bundle. In particular, in this example, the bundle B contains the agents $A_1$-$A_{12}$ arranged as shown. Thus some of the agents $A_1$-$A_{12}$ are arranged with bundles $B_1$-$B_8$ which are themselves contained within the bundle B. Thus, if a component requires interaction with the agent $A_1$, the bundle may be debundled at a first level to provide access to the agent $A_1$. In this case a debundle component is used to break the bundle B down at the first hierarchical level and extract the agent $A_1$ allowing this to be provided to a respective agent as required. At this time the bundles $B_1$-$B_2$ are also typically extracted from the bundle B. An example of this is shown in FIG. 24B.

In this example, a component 1000 is provided having sub-components 1001, 1002 and 1003 as shown. In use, the component 1002 is adapted to operate on a payload provided by the agent $A_1$ in the bundle B. Accordingly, in use the component 1000 operates to receive the bundle B at the agent 1004 which operates to transfer the bundle to the agent 1005. This will typically be achieved by a hand off mechanism with the agent 1004 simply handing off the bundle B to agent 1005.

In any event the component 1001 is a debundle component which operates to debundle the bundle B to the first level in the hierarchy. The agent $A_1$ is then output via the agent 1006 with the bundles $B_1$, $B_2$ being output via the agents 1007 and 1008 respectively. The agent $A_1$ is transferred to the agent 1009 allowing the component 1002 to obtain the payload of the agent $A_1$ and provide any data manipulation as required. An output may then be provided via the agent 1010.

It will be appreciated that this is all that is required in order to interact with a particular agent within a bundle. Thus, the bundles $B_1$ and $B_2$ may themselves be transferred on to other components for further processing. Similarly, the agent $A_1$ may now have fulfilled its purpose. Whether further use is made of the bundle, or any agents extracted therefrom is not essential to the bundling process.

However, in this example, for illustrative purposes only, the component 1000 is adapted to provide a modified bundle B' at the output agent 1015.

Thus, in this example, the output provided at the agent 1010 may include a modified version of the payload from the agent $A_1$, as indicated at $A_1$'. The agent $A_1$', together with the bundles $B_1$, $B_2$ are then transferred to the component 1003 via the agent 1011, 1012, 1013 respectively. The component 1003 operates to rebundle the bundle B as now modified, indicated by B' providing this via the agent 1014 to the output agent 1015, as shown.

Thus, the component 1000 allows the payload of the Agent $A_1$ to be modified. It will be appreciated that the rebundling of the modified agent $A_1$' into the bundle B' is not required, and instead, agents may simply be extracted from bundles and used as required.

Figure 24C:
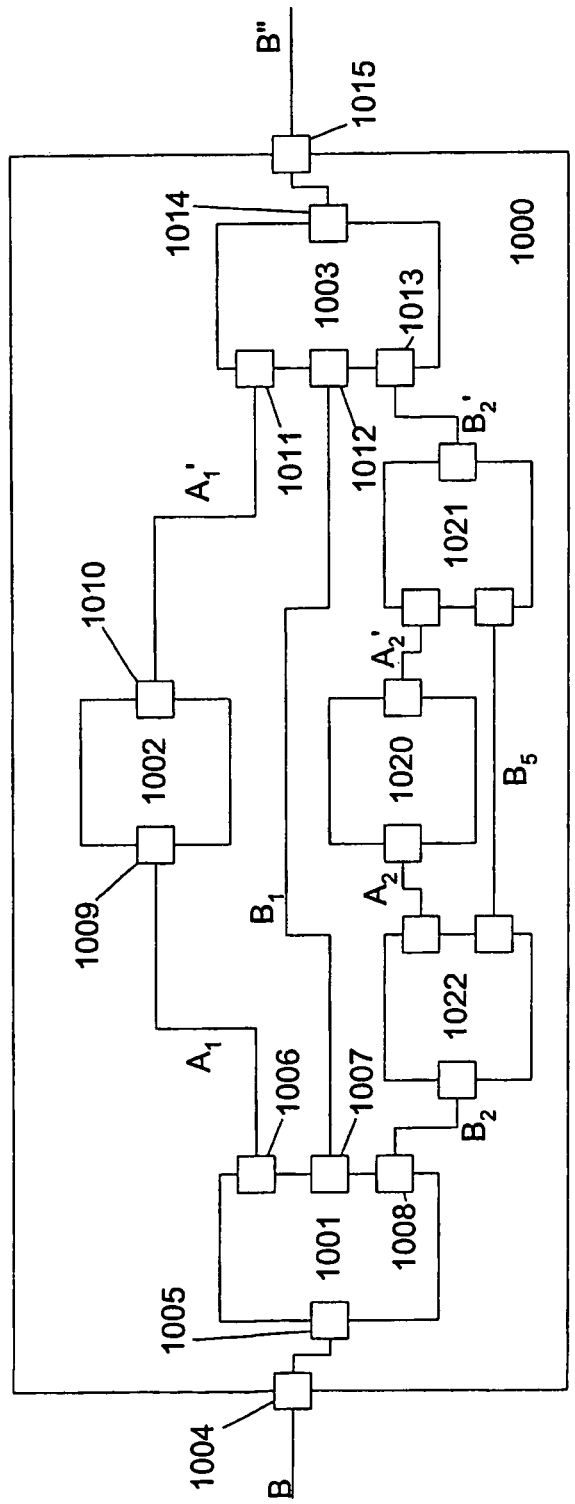
FIG. 24C is the component schematic of an example of a component adapted to modify the payload of the agents $A_1$, $A_2$ shown in FIG. 24A.

FIG. 24C shows a modification of the component 1000 in which an additional component 1020 provides additional interactivity with the payload of the agent $A_2$. In order to achieve this an additional debundle component 1021 and bundle component 1022 are used as shown.

It will be appreciated that the functionality of this is similar to that described above and this will not therefore be described in any further detail.

Bundle Hand-Off

As described above, hand-off of agents occurs to allow agents not explicitly involved in interactions, to pass on responsibilities to other sub-components.

In order for agent hand-off to be performed correctly it is necessary for hand-off to be performed in accordance with a predetermined order. This is particularly important where bundles are involved.

Figure 25A:
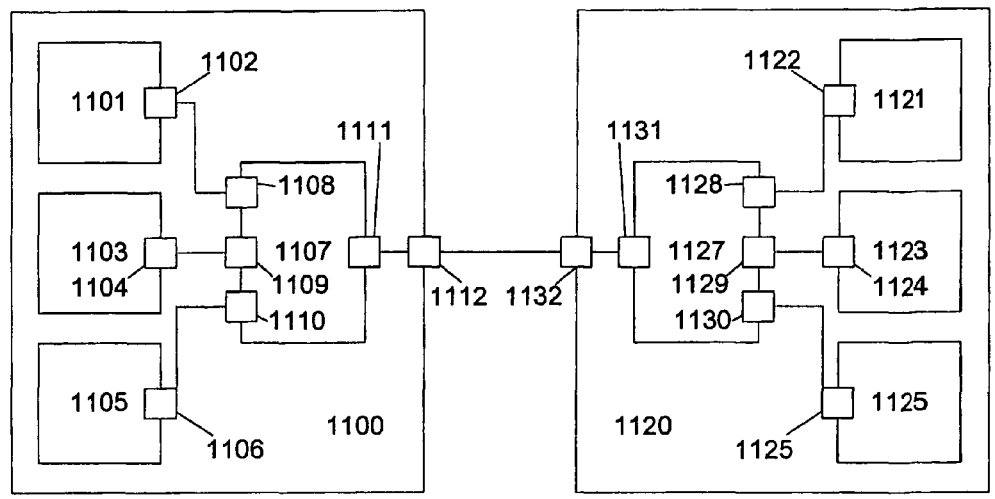
FIGS. 25A to 25E are a schematic example of the process of handing-off an agent bundle.

An example of this will now be described with reference to FIGS. 25A-E. In particular FIG. 25A shows a schematic including a component 1100 which includes three sub-components 1101, 1103, 1105 each which has respective agents 1102, 1104, 1106 adapted to be coupled to a bundle component 1107 via agents 1108, 1109, 1110. The bundle component 1107 includes an agent 1111 adapted to be coupled to an agent 1112 of the parent component 1100. Similarly, a component 1120 is provided which includes a similar schematic as shown.

In this Figure, the connections between the agents have not yet been implemented and are therefore shown as dotted lines.

Figure 25B:
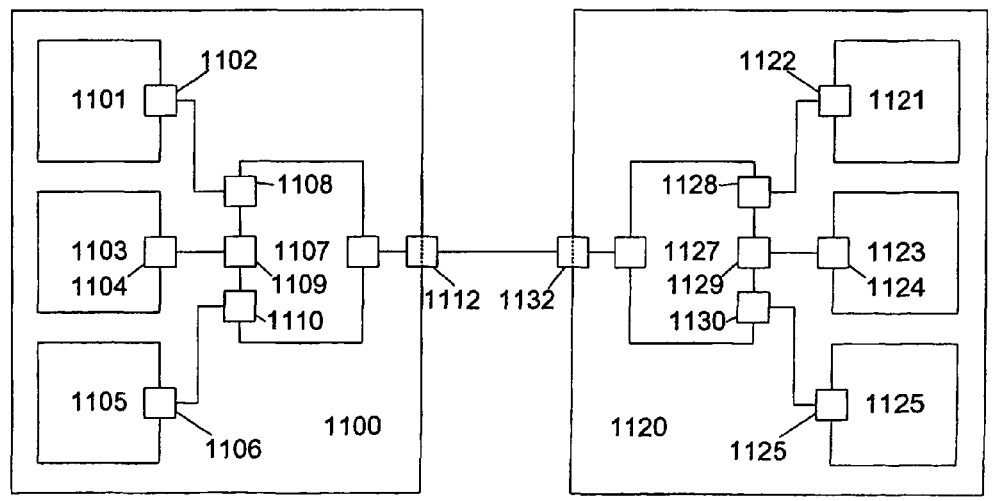

Initially, as shown in FIG. 25B, when the schematic is first built, with the respective component instances and corresponding agents being generated, the agents operate to connect as shown in FIG. 25B. Thus, initially, the agents 1102, 1104, 1106 connect to the agents 1108, 1109, 1110, with the agents 1112, connecting to the agents 1132.

The agents 1112 and 1132 negotiate and determine they do not need to take any further part in the process, and in particular, they determine that they can hand-off to the agents 1111, 1131. In order to achieve this the agents 1111, 1131, will need to exchange the addresses of the agents 1111, 1131. As each agent can only connect to a single other agent, this is achieved by creating a temporary agent associated with each of the agents 1112, 1132. This is represented by the dotted lines in the agents 1112, 1132, in FIG. 25B.

In this case, the agent and associated temporary agent are referred to an internal agent and an external agent. In the case of agent 1112, the internal agent will couple to the agent 1111, with the external agent connecting to the external agent of the 1132.

Figure 25C:
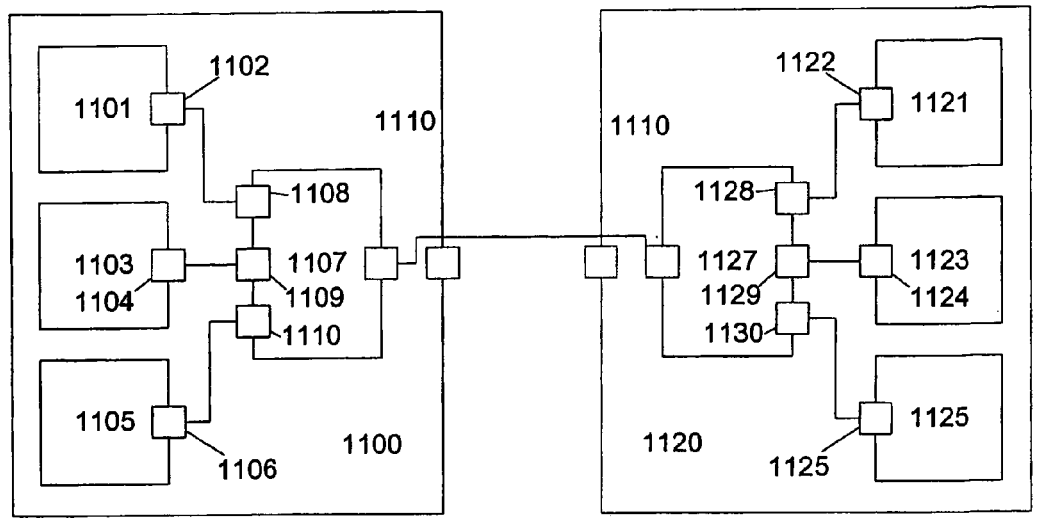

Each internal agent 1112, 1132 determines the address of the respective agent 1111, 1131. The addresses are then transferred between the external agents 1112, 1132, and transferred on to the agents 1111, and 1131 as required. Once the agents 1111, 1113 have obtained each other's address, they can communicate directly, allowing these agents to negotiate directly with each other. The agents 1112, 1132 will then retire, as shown in FIG. 25C.

In this instance, when agents 1111 and 1131 negotiate it is found that components 1107, 1127 can now perform their service. In particular, it will be determined that further hand-offs can now be performed as the bundle and debundle components have corresponding inputs and outputs.

Figure 25D:
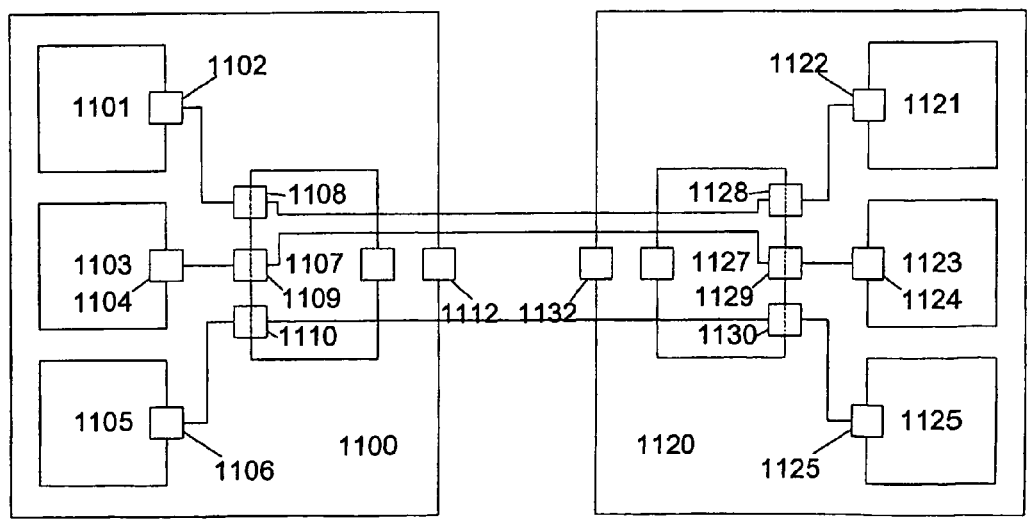

Accordingly, addresses of the agents 1108, 1109, 1110 will be included in a bundle, which is transferred from the agent 1111 to the agent 1131. This will be debundled with the addresses of the agents 1108, 1109, 1110 being transferred to the agents 1128, 1129, 1130 respectively. A similar process will be performed in the opposite direction. Once the agent addresses have been transferred, connections need to be formed between the agents 1108, 1109, 1110 and the agents 1128, 1129, 1130. In order to achieve this, temporary agents will need to be generated as described above, such that the external agents 1108, 1109, 1110 will be connected to the agents 1102, 1104, 1106, and the internal agents 1108, 1109, 1110 will be connected to the internal agents 1128, 1129 1130, as shown in FIG. 25D. At this point the agents 1111 and 1131 can retire.

Figure 25E:
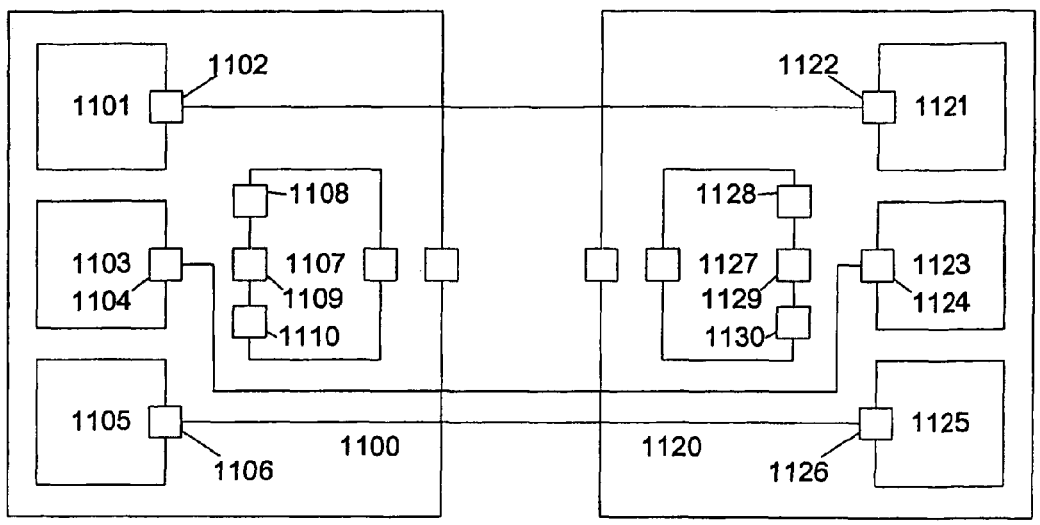

Once this is complete the agents 1108, 1128; 1109, 1129; and 1110, 1130 negotiate to allow the addresses of the agents 1102, 1122; 1104, 1124; 1106, 1126 to be exchanged, in a manner similar to that described above. Thus, for example, the address of the agent 1102 will be determined by the external agent 1108, transferred to the internal agent 1128, and then transferred via the internal agent 1128 to the agent 1122. Once this has been completed, hand-off can occur, with the agents 1108, 1109, 1110, 1128, 1129, 1130 retiring, and the agents 1102, 1104, 1106 communicating directly with the agents 1122, 1124, 1126 directly, as shown in FIG. 25E. Also at this point components 1107 and 1127 can also retire.

It will be appreciated that the use of hand-off reduces interaction required by agents. Furthermore, when implemented in conjunction with bundling, allows hand-off of entire bundles, corresponding to many agents. This thereby further reduces computational load and operator complexity due to the simplified schematic.

Chaining

A further useful technique in implementing the build process is a technique known as chaining.

In particular chaining operates by transferring agents, or more usually agent bundles, through a schematic allowing the agent or agent bundles to have payloads modified as required, in a manner similar to that described above. In addition to this, the chain is intended to pass through the schematic, or a portion thereof unbroken. This allows modification of payloads to be passed through the system, and returned as required.

An example of chaining will now be described with respect to the example shown in FIGS. 26A to 26G.

As shown in FIG. 26A, three components 1151, 1154, 1157, each having a respective input agent 1152, 1155, 1158 and respective output agent 1153, 1156, 1159, are connected as shown to agents 1160, 1161. The components are provided to produce executable code, and operate by inserting code fragments into a build bundle.

In particular, a header file is provided by the agent 1160 to the agent 1151. This is typically provided in the form of an agent payload. When the component 1150 receives the header file it appends its code to the end of the header file and forwards it on via the agents 1153, 1155 to the component 1154. Again, this will typically be in the form of an agent payload.

In any event, component 1154 receives the executable code fragment appended to the header file, and appends its own executable code fragment. Alternatively, or additionally the component 1154 may modify the code fragment provided by the component 1150. In any event, the header file including the appended code fragments is transferred on to the component 1157 in a similar manner for further code fragments to be added. The process proceeds until all required code fragments are added to the header file and the resulting executable code is supplied to the agent 1161.

An example of the structure of the header file and appended code fragments is shown schematically in FIG. 26B, with the reference numeral being indicative of the component generating the respective code portions.

It will be appreciated that many more details are required to effectively construct an executable program, such as RAM allocation, processor register allocation, physical address details and general global details of the target construction site.

In order to supply all the above data it is necessary to expand the simple single agent connections as described in the first example to include additional agents, and indeed additional components. Considering the example shown in FIG. 26C, where four sets of agents form several unbroken chains allowing each component in turn to add code, allocate memory, reserve or relinquish a CPU register etc. In this case, the file header is received from and returned to a single component 1063. It will be appreciated that interconnecting all the agents for all the components would be time consuming and would make the schematic unwieldy.

In the example, each of the components 1151, 1554, 1157 has a number of inputs agents and a number of output agents. These can be replaced by a single agent so that the respective component can access the chain involved in code construction or memory allocation using a single agent.

All these related agents then can be combined into a single build bundle, as described above, thereby allowing the functionality of separate agents to be retained, whilst allowing a single simple agent to be presented. Thus the schematic shown in FIG. 26C, can be replaced with the schematic shown in FIG. 26D. In this case, components 1164, 1165 are CAT components designed to concatenate agents, with the component 1163 being a component used in code construction. Thus, for constructing an executable file for use with Linux based systems, this could be in the form of an ELF INIT component, which is described in detail in Appendix A.

Figure 26D:
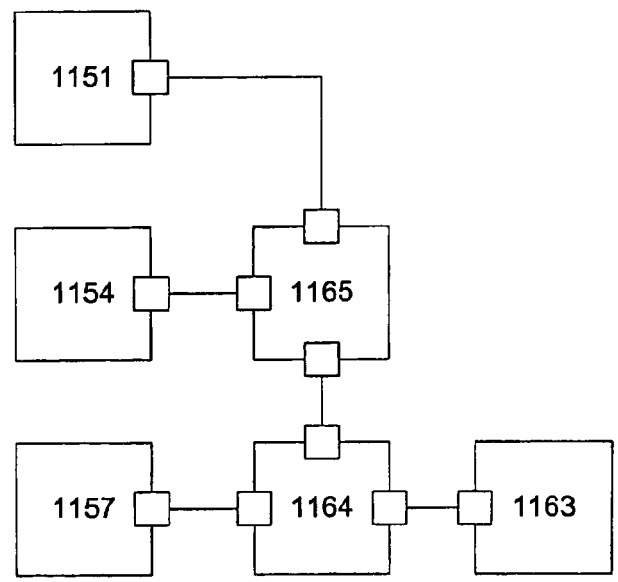
Figure 26E:
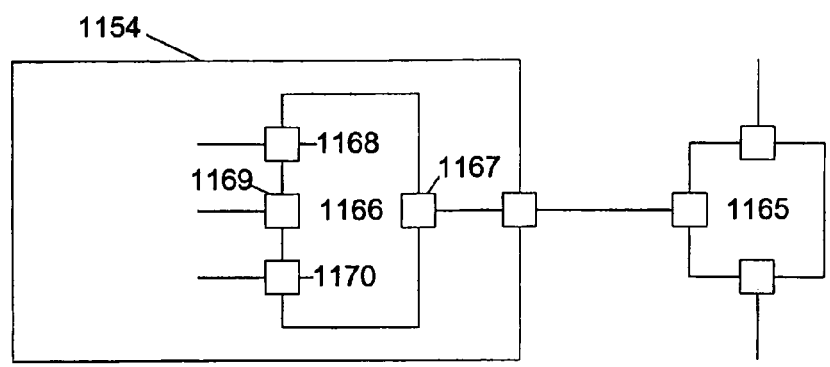

Further components can be added to simplify the processing internal to components 1151, 1154, 1157. These additional components effectively shield the components 1151, 1154, 1157 and all other components from the details of the build bundle. An example of this is provided by the build bundle described above, which allows a bundle received by the component to be debundled. An example of this is shown in FIG. 26E, with the component 1166 being a build component, which received the build bundle at the agent 1167, presenting respective bundles or agents at the agents 1168, 1169, 1170.

It will be appreciated that if each of the components 1151, 1154, 1157 may include a respective build sub-component, in which case the file header must also be passed to these components.

Thus, for example, the ELF INIT component 1163 can start the process by supplying a header into the top of the chain and allowing each component connected to the chain to append (using some suitable component) their code until the executable is constructed. Alternatively the ELF INIT component 1163 can wait for the outcome of the chain and prepend a header forming the ELF executable format as required by the operative system.

The result is a tree of components of sub-components connected by an unbroken line facilitating construction.

Arbitrary length chains can be easily constructed while hiding the complexity. In any event, this allows the supplier of the build component to expand the Build Bundle into hundreds or thousands of agent's as required to coordinate even complex construction sites.

In addition to the functionality described above, a component may export part of the build bundle to another component to insert code into the relevant section.

Figures 26F, 26G:
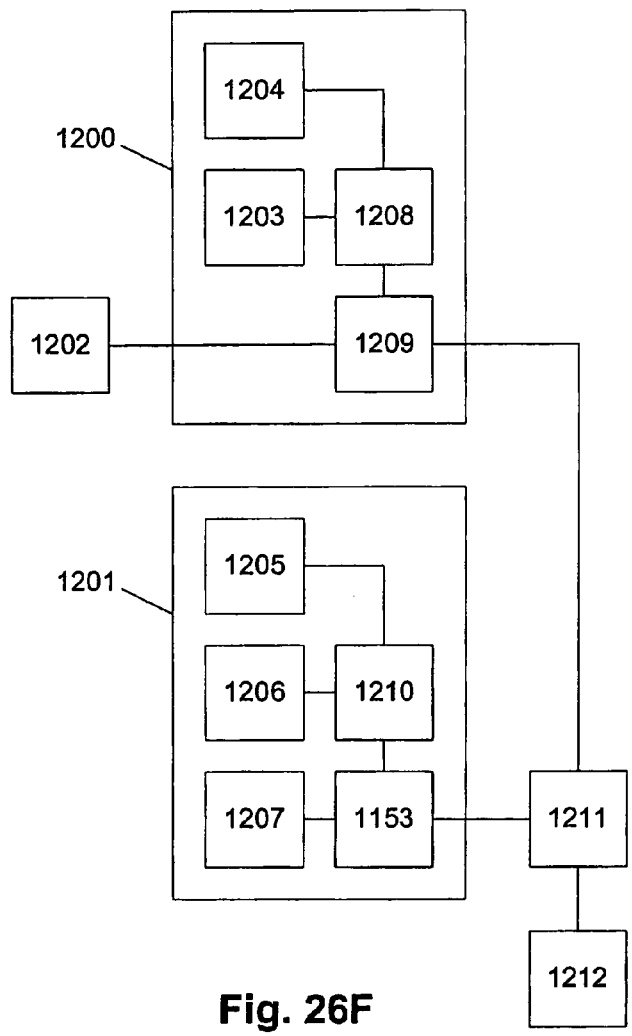

An example of this is shown in FIG. 26F. In particular, this system includes three components 1200, 1201, 1202, adapted to generate respective executable code fragments. In this example, the components 1200, 1202, include respective sub-components 1203, 1204, 1205, 1206, 1207, also adapted to generate code fragments. These components, 1200, . . . 1207 are connected via a number of build cat components 1208, 1209, 1210, 1211, to an ELF INIT component 1212. In use the header file is passed in turn to the component 1200, and hence to the components 1203, 1204, 1202, before being passed to the component 1201 and hence the components 1205, 1206, 1207.

Accordingly, this results in the header file being appended with code fragments as shown in FIG. 26G.

In this example, if the link between the component 1200 and the component 1202 is created dynamically then the tree structure can be converted to a mesh structure, by creating links at build time.

This may be used for example to allow data to be output to a predetermined location as specified. However, in order to provide an output it may be necessary for the component to have obtained a predetermined memory location or the like, or be able to insert data into a bundle for transfer to the root component. In this instance, the root component typically generates a bundle and transfers this to the output of the component. This is then transferred onto the output of each of the sub-components which is to generate an output for transfer to the root server.

It will be appreciated that this mechanism allows the data to be generated and constructed on the root server in desired memory locations.

In order for this to function correctly it is necessary for the chain to be passed from the output agents through any sub-components and back to the output agent.

Connections

In all the above examples interaction between agents has been performed on a one-to-one basis. Thus, a single output from a component is connected to a single input on a subsequent component with each agent being adapted to interact with a single corresponding agent.

This vastly reduces the complexity of the system by ensuring that it is simple for agents to negotiate. In this case, components such as the DUP component described in more detail below, can be used to duplicate an output from an agent, allowing this output to be transferred to a number of subsequent agents, to thereby provide effective one-to-many connections. However, as an alternative, agent behaviour can be modified to provide one-to-many, many-to-one and many-to-many interactions to be performed between agents. Thus, for example, an output from a single component may be coupled to the inputs on several successive components. It will be appreciated that in this instance data provided at the output of a component may be provided to the inputs of several subsequent components simultaneously without the need for a connecting DUP component. In this instance, the agent associated with the output will need to negotiate with several agents simultaneously.

An example of this will now be described with reference to FIG. 27.

Figure 27:
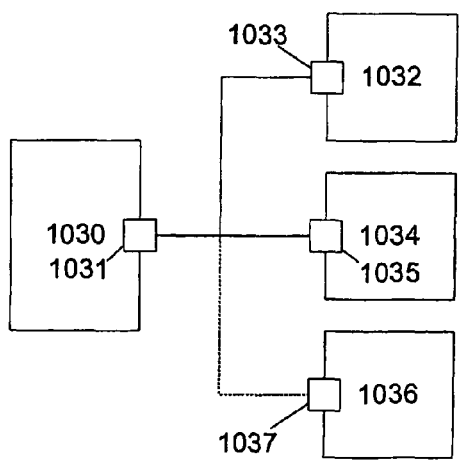
FIG. 27 is a schematic of an example of a component adapted to provide one-to-many interconnections to other components.

FIG. 27 shows a component 1030 having an agent 1031, which in this example is adapted to provide an output in decimal, binary or hexadecimal code, in that preferred order. The component 1030 is coupled to components 1032 and 1034 via respective agents 1033, 1035 adapted to receive data in decimal or hexadecimal and hexadecimal or binary data forms as required. Accordingly, in this case it will be appreciated that the agents 1031, 1033, 1035 must negotiate to determine a common data format which in this case is hexadecimal code.

The component 1030 will then operate to provide an output in hexadecimal code format. Thus, the agent 1031 must provide the output in a least preferred format. In this case, if a third component 1036 is provided adapted to receive data via an agent 1037 which is only adapted to operate in decimal code it will be appreciated that no common data format can be found thus causing a build exception error to occur. Thus, it can be appreciated that providing for too many outputs, interactions will vastly complicate the negotiation and data transfer process.

Despite this, there are significant advantages in providing for one-to-many, many-to-one and many-to-many connectivity between agents in that this will allow broadcast data to be provided from a single agent to a number of other agents, which can result in increases of efficiency in some circumstances.

Staged Construction

Staged construction can be used to allow dynamic components or dynamic schematics to be implemented. In particular, staged construction typically refers to a situation where a designer deliberately lays out a schematic in a number of stages to control a difficult build, then implements this when satisfied of the progress of the early stages. However, this can also be implemented at the component level.

In particular, this allows for dynamic components where the functionality of the component may be modified during implementation dependent on the results of earlier data manipulations. An example of this will now be described with reference to FIGS. 28A-28C.

Figure 28A:
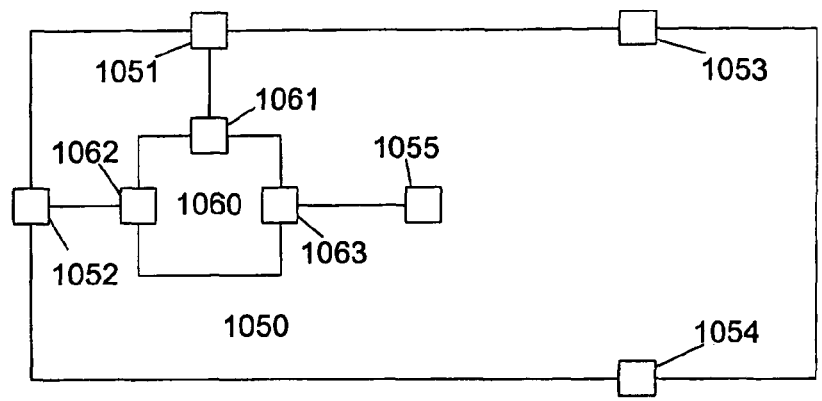
FIGS. 28A to 28C are a schematic example of the process of staged construction.

As shown in FIG. 28A, a component 1050 having agents 1051, 1052, 1053, 1054 and 1055 is provided. The component is adapted to receive inputs via the agents 1051, 1052, 1053 and provide an output via the agent 1054. The component 1050 includes a sub-component 1060 having input agents 1061, 1062 and an output agent 1063. As shown the input agents 1061, 1062 are coupled to the input agents 1051, 1052, with the output agent 1063 being coupled to the internal agent 1055.

In use, the component 1050 is adapted to receive data via the agents 1051, 1052, 1053, manipulate these and then provide an output via the agent 1054. In this example, when data are received via the agents 1051, 1052 these are transferred to the component 1060 which manipulates the inputs and generates an output transferred via the agent 1063 to the internal agent 1055.

Figure 28B:
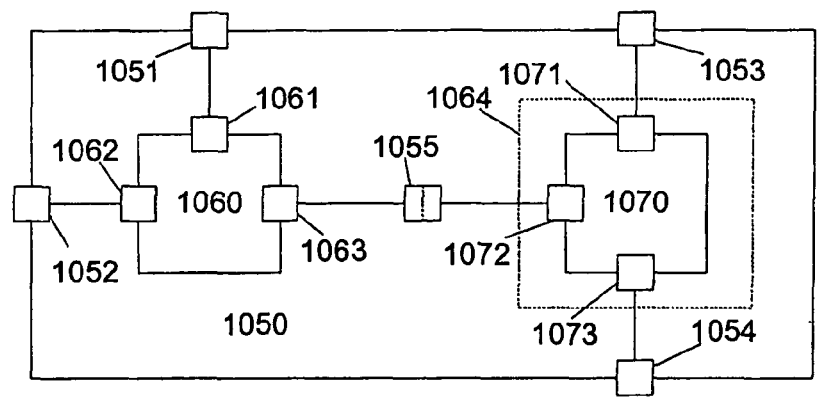

The internal agent 1055 is a particular type of agent known as a selector. In particular, the agent 1055 will operate to examine the payload received from the agent 1063 and then cause one or more schematics to be built depending on the data contained therein. Thus for example, if the payload received from the agent 1063 is a decimal number the selector agent 1055 may select a schematic 1064 containing a single component 1070 and cause this to be incorporated into the schematic of the component 1050 as shown in FIG. 28B. Accordingly, agents 1071 and 1072 will be coupled to the agents 1053 and 1055 as shown, with an output agent 1073 being coupled to the agent 1054.

It will be appreciated that the schematic 1064 may have external agents, coupled to the agents 1071, 1072, 1073, which will need to hand-off as described above, to allow the agents 1071, 1072, 1073 to connect to the agents 1053, 1054, 1055, as shown. Similarly, as the selector agent 1055 cannot connect to two agents simultaneously, the connection will also require the creation of a temporary agent 1055, as shown by the dotted line in FIG. 28B.

In use, once the component 1070 has been incorporated into the specification the agent 1055 can operate to hand-off the agent 1063 to the agent 1072 in a manner similar to that described above, thereby allowing the component 1070 to manipulate data received via the agents 1071, 1072 as required. Manipulated data can be provided via the agent 1073 as will be appreciated by a person skilled in the art.

Figure 28C:
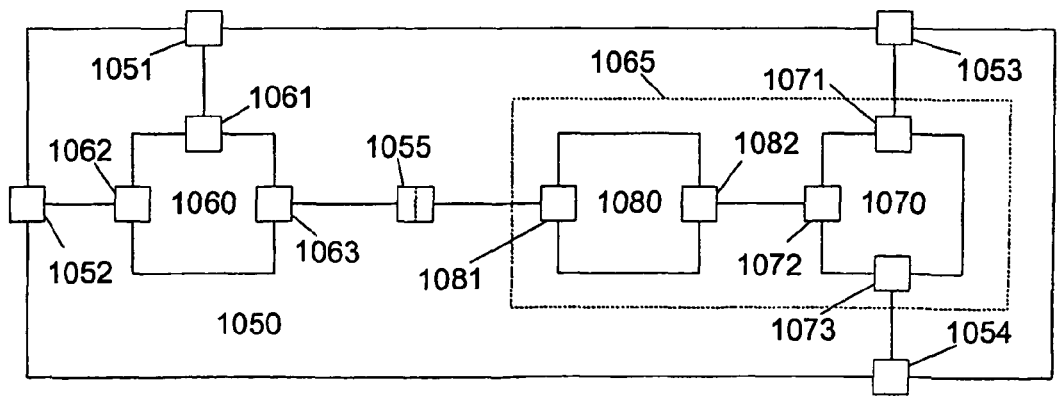

However, the agent 1055 may determine that the output provided by the agent 1063 is in a hex format in which case the selector agent 1055 must select a different schematic 1065. An example of this is shown in FIG. 28C, in which case the incorporated schematic includes the component 1070 coupled to an additional component 1080 for converting the hex number into a decimal format. Thus the schematic shown in FIG. 28C includes the component 1080 having an input agent 1081 coupled to the internal agent 1055 and an output agent 1082 coupled to the input 1072 of the component 1070.

In this instance, the internal agent 1055 will cause the schematic to be built before transferring the payload to the agent 1081, allowing the agent 1080 to convert the data into a decimal format before it is transferred via the agent 1082 to the agent 1072. Again, this may require the formation of a temporary agent 1055, as shown. The remainder of the operation will be as described above.

In the above process, the selector agent therefore needs to analyse the output provided by the component 1060 in order to determine the subsequent schematic 1064, 1065. Thus during the build process, the selector agent 1055 will operate to negotiate with the agent 1063 in the normal way. When this has been completed and the component 1060 performs the service embodied therein, the agent 1063 will supply the output to the selector agent 1055 as a payload. The selector agent determines the output contained in the payload, and then selects the subsequent schematic 1064, 1065 as required. The subsequent schematic can then be built and implemented in the normal way in which any sub-component would be implemented.

It will be appreciated from this that the agent 1055 may terminate the connection with the agent 1063 before the schematic is selected in which case a temporary agent 1055 will not be required.

In order to implement this form of component, the entity implementing the component 1050 will therefore need to modify its mode of operation. In particular, if the schematic of the component 1050 is predefined, as in normal circumstances, when the entity receives a purchase order it will generate a component instance 1050. This component instance will in turn determine that additional component instances are required for any sub-components such as the component 1060. Accordingly, respective component instances are initiated for the components 1070 and/or 1080 as defined in the schematic. It will be appreciated that these component instances may be implemented on different component servers to the component 1050, and indeed may be implemented by different entities.

When the entity receives a purchase order for the component 1050 it will initially initiate a single component instance, corresponding to the component 1060. In this situation the component instance 1060 will operate to perform data manipulations in the usual way providing the output to the schematic selector agent 1055. The selector agent 1055 will then operate to determine a schematic needed to implement the remaining service, or data manipulations as required.

Thus in the case of the schematic shown in FIG. 28B the schematic selector agent 1055 will select a schematic resulting in the use of a component instance corresponding to the component 1070, whereas in the case of the schematic of FIG. 28C the selector agent 1055 will initiate the schematic 1065 resulting in the use of two respective component instances corresponding to the components 1080 and 1070.

Staged construction may be implemented either automatically or manually depending on the preferred implementation.

In the case of manual operation, the internal agent 1055 may be adapted to provide an output to the entity operating the component 1050, such as an indication of the data received in the payload from the agent 1063. An operator will examine the output and construct the remainder of the component schematic shown for example in FIGS. 28B, 28C as required. The user defines the schematic and then operates to build it, causing respective component instances to be generated in the normal way. Thus, the agent 1055 will perform hand-off as described above. Once the components have been implemented and agent negotiation completed, the component 1050 then allows the remaining data manipulations to be completed as required.

Alternatively, in the case of the automatic operation the agent 1055 will trigger the selection of the remaining components and their interconnections automatically. It will be appreciated that this generally has to be achieved in accordance with predefined schematics which are selected from a predetermined list stored in the memory, or the like. This selection can therefore use the data received from the agent 1063 to access a Look-Up Table (LUT) and determine the required schematic for example.

In order for this to function reliably, provision for schematics to handle any data that may be potentially provided at the agent 1063 must be made, or the overall build process may fail, or have to divert to a manual operation.

Thus, in the above example, the build process is completed in two stages, although any number of stages may be provided. In any event, the technique of staged construction allows a wide range of functionality to be achieved.

In particular, the use of stage construction can apply to overall schematics. Thus, users may define a schematic designed for staged construction. In this case, the user can define three or four different schematics with the final schematic used depending on results obtained part way through the manipulation. In the case in which this is performed, any components that potentially will perform data manipulation after a selector agent will not be constructed until the selector agent has made a decision on the schematic to be used.

This decision may be made in conjunction with input from the user. Thus, the user can partially define a schematic to produce a stage output. Once the stage output has been obtained, the user can complete the remainder of the schematic in response to the particular output obtained.

It will be appreciated that in this instance, purchase orders are not issued for the components involved in the second stage of construction, until the first stage has been completed and the desired output obtained.

This allows users to perform data manipulations and build executable code in stages. This in turn reduces the expense incurred if the build process fails, as well as providing users opportunity to optimise schematics since the number of variables to be considered may be reduced.

Staged construction also allows dynamic components to be implemented. That is components where the schematic may change given the conditions rather than a fixed static schematic. In this case, the entity may define a component that requires staged construction in order to complete, with this fact being transparent to the user. The component will interact with other components in the schematic during the build process, by offering the external agents, such as the agents 1051, 1052, 1053, 1054, in the normal way. This allows other components to be constructed as normal, with the output from the component 1050 only being provided once the second internal stage of construction is complete.

As a result, it is generally the entity that issues any purchase orders required to implement the components required in subsequent stages of construction, and it will therefore be appreciated that this may be performed automatically in some cases. The entity server may therefore act as a root server for the second stage of construction, particularly if the components used in the second stage of construction are provided by another entity.

Prototype Components

In the examples above the components are predefined, even in the case of dynamic components. This is because the nature of the input and output data is predetermined. This means that when the user selects a component from the forum they are aware of the specific input and output requirements of the component.

Thus, in the example described above with respect to FIGS. 28A-28C the component may be dynamic and this may allow, for example, the component to receive inputs having different formats. However, it is still necessary for these formats to be predefined thereby providing the user with only limited options for implementation.

As an alternative, an entity may provide a prototype component which is situated on the forum. The prototype component will not include a defined component schematic and similarly will not include finalised input and output specifications. Instead, the prototype component will include an indication of the functionality that may be provided. Accordingly, the user may select a prototype component which is capable of combining inputs.

At this stage, the nature of the inputs and/or outputs, and in particular the data formats that can be handled are undefined. Accordingly, when the user selects the prototype component and includes this in a schematic it will be necessary for the user to provide the entity with an indication of the data formats that they wish to combine. This procedure can be performed in a number of ways.

In a first example when the user selects the component and attempts to add this into a schematic the user will be prompted to provide input and/or output specifications they desire for the component, with this being transferred to the entity for review. The entity then assesses if it will be possible to provide the respective service in accordance with the requirements. If so, and the component can be implemented, confirmation of this is sent to the user together with defined input and output specifications for the components agents as required. The specifications will then be used to finalise the component allowing it to be added into the schematic.

This form of prototype component will hereinafter be referred to as a conditional prototype as this requires confirmation from the entity that the component can be implemented before it may be incorporated into the schematics.

As an alternative however if the entity is confident that they can perform the data manipulation service embodied in the component regardless of the input and output specifications required, then the prototype component can be provided as unconditional prototype.

In this case, the prototype component may simply be incorporated into the schematic immediately. In this instance, the agents of the component will be adapted to communicate with agents of other components and determine input and output specifications therefrom. The agents will therefore effectively accept any input or output options selected by corresponding agents during the build process when the agents negotiate in the normal way.

Agent negotiation is basic in that the agent of an input of one of the unconditional prototype components will simply indicate that it can receive data from an output in accordance with the preferred format specified by the output agent. Similarly, the output will simply indicate that it can provide data in the format required by the agent associated with the input of a subsequent component.

Accordingly, the input and output specifications of the unconditional prototype are therefore effectively determined in accordance with the input and outputs specifications required by other adjacent components in the schematic.

It will therefore be appreciated that if two conditional prototypes components are interconnected, common specifications may not be defined automatically. In this instance, some user input either by the user creating the schematic or by the entities implementing the components will be required in order for the schematic build to be successful.

In any event, in the case of unconditional prototype components, when the component is to be implemented the entity will simply operate to receive the data and perform the required data manipulations regardless of the format. It will be appreciated that this may be performed automatically if a suitably flexible component can be defined.

Fundamental Components

As described above, the system allows components to be combined hierarchically to allow a complex series of data manipulations to be performed. Thus complex components can be constructed using basic fundamental components, which may be provided via the forum.

The fundamental components represent basic data manipulations that will be required in most schematics, such as logic manipulations, or the like, and are typically implemented automatically utilising suitable executable code. Examples are provided in Appendix A.

Context Dependency

To provide protection for the component suppliers service implementation, the system can be implemented so as to generate context dependent code.

Context dependant code is where the code is produced in such a way that it exploits the context in which the code will be run. This context dependence makes it very difficult to extract the executable code produced by a component and to use it in another project, and is therefore useful in providing inherent IP (intellectual property) protection for a component.

In particular when a supplier delivers code to the customer, the customer received a unique solution based on the context as provided by the customer, the environment and fellow suppliers. Thus, in contrast to supplying context independent code from which the customer could conceivably work out certain supplier process details by examining the outcome as supplied, the supplier's IP is obscured by the customised nature of the solution. If the supplier deeply and finely constructs their solution into the customers outcome, then it enhances the obscurity.

In contrast to this, conventional coding practices encourage code to be made reusable by making it context independent. This allows the code to be reused in a range of different projects all without modifying the code. If components were to produce code in this manner it would eliminate the need for anyone to repurchase the component, undermining the economics of producing the component. Thus in this case there would be no IP protection for the component provider.

Since components are services there should be encouragement for their reuse and it is therefore beneficial if they produce context dependent code. This is achieved by the component producing customised output, which is based on the requirements for the code, by exploiting the context in which code will be used.

Context may include such things as:
Known state of the executable at start-up
Known state of registers from the previous instructions
Known state of the stack and memory
Allocation of registers, stack and memory
Number of myself (component) in the project
What components are connected to my component
Location where our code is to be placed Context dependant code exploits the fact that there are many ways of performing the same task, some of which are dependant on other parts of the system. By creating dependant code it prevents a third party from easily reusing or reverse engineering the code without extensive rewriting. Past some level of dependency it becomes more economical to simply repurchase the component, rather than to reverse engineer and rewrite.

Context dependency is achieved by the supplier examining the context in which the outcome is to be delivered. Since each context is unique, it is possible to customise for each context.

For example the code to terminate a program may be constructed, ignoring the context thus:

Example 1

Note: This is x86 assembly, also assembly is presented instead of hex.

| | |
|---|---|
| mov eax, 1 | ;store number 1 in register eax |
| mov ebx, 0 | ;store number 0 in register ebx |
| int 0x80 | ;trap call to Unix OS |

This results in the constants 1 and 0 being loaded into the registered eax and abx respectively, then executing a software interrupt to trap back to the operating system. Executing this code would result in the operating system terminating the program and freeing the code from memory. Example 1 is context insensitive in that delivering this to the customer gives away the IP of the supplier.

If the context is included, then certain modifications can be made to:

1) reduce the amount of code delivered
2) reduce the execution time
3) allow the code to only operate in this specific context Execution of previous instructions may have left known constants in the CPU registers. In the rare case that eax and ebx already contain 1 and 0 respectively, the outcome for this context could simply be:

Example 2 int 0x80

There are many other combinations. For example, if a different register contains the correct constant, then a register to register move would be cheaper than moving a constant into a register. Similarly, a register could be incremented if the existing constant was very similar to the one required. In each case, the outcome delivered would be unusable in any other context. Further, the customer would be unaware of the many other combinations for their respective contexts.

Context dependency can be achieved using a number of different mechanisms as will now be described.

Assembly Level Context Dependency

In one example, the process described above uses a supply chain of components to produce the code for an executable application. At the bottom of the code producing components supply chain, are components that resemble something similar to assembly instructions. Each of these bottom-rung components produce typically 1-3 machine code instructions, some examples might be:

assign
add
multiply
divide
subtract
jump condition

Each of these components would understand what effect they would have on registers, stack memory, heap memory and the machine state.

The machine state is a progressive calculation of the known state of the processor on the selection of the instructions used in a program. For example:

```
              ;machine state after each instruction (x86 assembly)
                          ;eax=?, ebx=?, ecx=?, edx=?
mov eax, 1    ;eax=1      ;eax=1, ebx=?, ecx=?, edx=?
mov ebx, 2    ;ebx=2      ;eax=1, ebx=2, ecx=?, edx=?
add eax, exb  ;eax=eax+ebx ;eax=3, ebx=2, ecx=?, edx=?
mov ecx, eax  ;ecx=eax    ;eax=3, ebx=2, ecx=3, edx=?
```

For example, if the machine state was {eax=2, ebx=10, ecx=0, edx=1}, then there are multiple ways of achieving an assignment of 1 to eax, as set out in Table 1.

TABLE 1

| Name | Pseudo code | x86 | Level of dependence |
|---|---|---|---|
| Mov number | eax=1 | mov eax, 1 | 0 |
| Set to 1 | eax=0<br>eax=eax+1 | xor eax, eax<br>inc eax | 0 |
| Decrement self | eax=eax−1 | dec eax | 1 |
| Subtract other | eax=ebx<br>eax=eax−9 | mov eax, ebx<br>sub eax, 9 | 1 |
| Add other | eax=ebx<br>eax=eax+(−9) | mov eax, ebx<br>add eax, −9 | 1 |
| Increment other | eax=ecx<br>eax=eax+1 | mov eax, ecx<br>inc eax | 1 |
| Copy other | eax=edx | mov eax, edx | 1 |
| Subtract self other | eax=eax−edx | sub eax, edx | 2 |

In general the option that maximises the level of dependence, while minimising size and speed is best option. The above example shows several rules that match the assignment number and the machine state of the input. Additional details are shown in Table 2.

TABLE 2

| Name | Speed (~cycles) | Size (bytes) | Pseudo code | x86 | Level of dependence |
|---|---|---|---|---|---|
| Mov number | 1 | 5 | eax=1 | mov eax, 1 | 0 |
| Set to 0 | 1 | 2 | Eax=0 | xor eax, eax | 0 |
| Set to 1 | 2 | 3 | eax=0<br>eax=eax+1 | xor eax, eax<br>inc eax | 0 |
| Decrement self | 1 | 1 | eax=eax−1 | dec eax | 1 |
| Decrement other | 2 | 3 | Eax=ebx<br>dec eax | mov eax, ebx<br>dec eax | 1 |
| Increment self | | | eax=eax+1 | inc eax | |
| Increment other | | | eax=ecx<br>eax=eax+1 | mov eax, ecx<br>inc eax | 1 |
| Subtract self | 1 | 1 | eax=eax−9 | sub eax, 9 | 1 |
| Subtract other | 2 | 6 to 7 | eax=ebx<br>eax=eax−9 | mov eax, ebx<br>sub eax, 9 | 1 |
| Add self | 1 | 5 to 6 | eax=eax=(−9) | add eax, −9 | 1 |
| Add other | 2 | 6 to 7 | eax=ebx<br>eax=eax+(−9) | mov eax, ebx<br>add eax, −9 | 1 |
| Copy self | 0 | 0 | (eax is already set) | No code | 1 |
| Copy other | 1 | 1 | eax=edx | mov eax, edx | 1 |
| Subtract self other | 1 | 2 | eax=eax−edx | sub eax, edx | 2 |
| Add self other | 1 | 2 | eax=eax+edx | add eax, edx | 2 |

Single Parameter Context Dependence

Single parameter dependence is when the code produced is dependant on the state of a single register. Single parameter dependence represents the minimum level of machine state context dependence.

The following describes an implementation of an assign component. This component sets a specific register to a specified constant value known at construction time. For example assign(eax, 1) would produce code that results in eax obtaining the value of 1. The assign component achieves context dependence by using the known machine state prior to the assign code being executed to create code that will achieve the outcome.

Multi-Level Context Dependency

The hardest level to implement is to create context dependency at a low level near assembly. This is due to the limited number of ways that a given problem can be implemented. If higher level components use these context dependant components then they too inherent context dependency.

If the assembly like code generating primitives are sufficiently context dependant then components using these as sub-components will become dependant to the point where it will be easier to rewrite the entire code then reverse engineer.

Specific examples of context dependency are shown in Appendix C.

Variable Context Dependency

In the previous example, if the code generation is performed multiple times, the same output will result each time, as the result is directly dependent on the context.

However, in order to provide further protection it is possible to modify the output code so that the result is different each time the code is generated in the same context. This can be achieved by:

- Introducing random context (known as dithering)
- Selecting from multiple possible outputs (for example table 1 shows eight possible outcomes for the given context, with one of these eight options being selected randomly for use as the output)
- Negotiating redistribution of data manipulation (known as Meshing).

Thus, for example, components can be adapted to introduce random context for use by subsequent components, for example by setting registers to random values, or the like. Additionally, the system can operate to select an output from a number of equally applicable but different context dependent solutions.

Specific examples of this are described in Appendix C.

Dithering

Figure 29A:
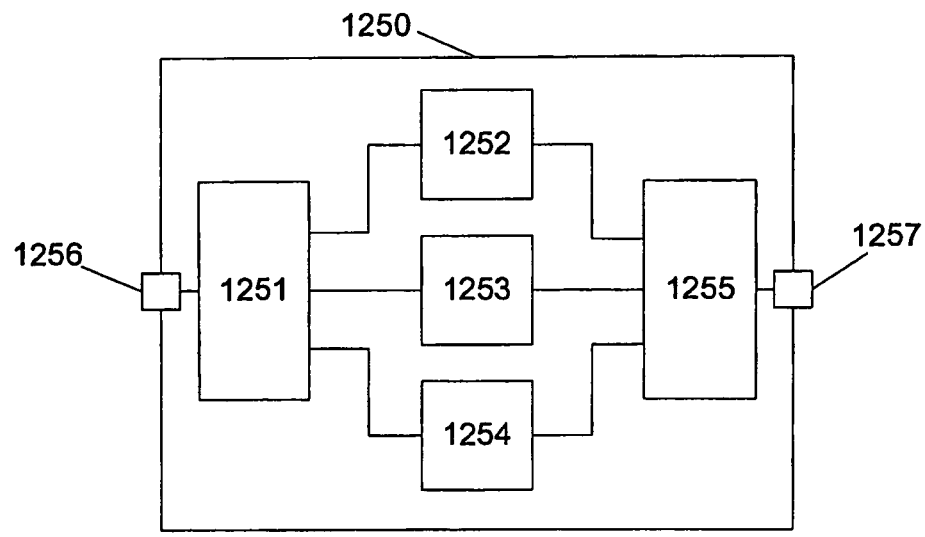
FIGS. 29A and 29B are examples of component schematics highlighting the operation of dithering; and, FIGS. 30A and 30B are examples of component schematics highlighting the operation of meshing.

In this case, components are adapted to internally perform data manipulations using a number of different techniques. In this case, the techniques are configured to generate different resulting code. An example of this will now be described with respect to FIG. 29A.

In particular, in this example, a component 1250 is shown. In this case, the component includes five sub-components 1251, 1252, 1253, 1254, 1255, coupled together as shown. The exact nature of the sub-components is not important for the purpose of this example, however, for the purpose of illustration only, the component 1250 is adapted to assign a value to the register eax. In this case, the value to be written into the register eax via an external agent 1256. The value is transferred to a DUP component 1251, which copies the value to each of the components 1252, 1253, 1254.

In this example, each of the agents 1252, 1253, 1254, is adapted to assign the value in a different way.

Thus for the value "V", the component 1252 may be adapted to simply write the value into the register using the command eax=V. The component 1253 may be adapted to clear the register and add the value "V" using the commands eax=0, eax=eax+V. Finally the component 1254 can be adapted to set the register to a predetermined value and then modify the register as required using for example the commands eax=10, eax=eax−(10−V).

Accordingly, it will be appreciated that each one of the components 1252, 1253, 1254 will generate different commands for achieving the same end result.

In this case, the results of the component processing, in the form of the determined commands are transferred to the component 1255. The component 1255 is a dither component, which is adapted to receive a number of different inputs from which one is randomly selected.

Accordingly, when the component 1250 is implemented and a value V received, each of the components 1252, 1253, 1254 will generate appropriate commands based on the value V. The commands will be passed onto the dither component which randomly selects one of the commands for output via the agent 1257. Thus, each time the component 1250 is performed for a given value V, one of three different commands will provided at the agent 1257 as an output.

In this case, the component 1250 is external context independent, that is to say that the component is not capable of taking into account the existing state of the register eax. However, it is still desirable to provide dithering so that the resulting code generated may be different in each case.

It will therefore be appreciated that this system operates to ensure that different outputs are provided even in the event of the same external context. This helps ensure that the manner in which the component performs the service will be retained as secret.

Figure 29B:
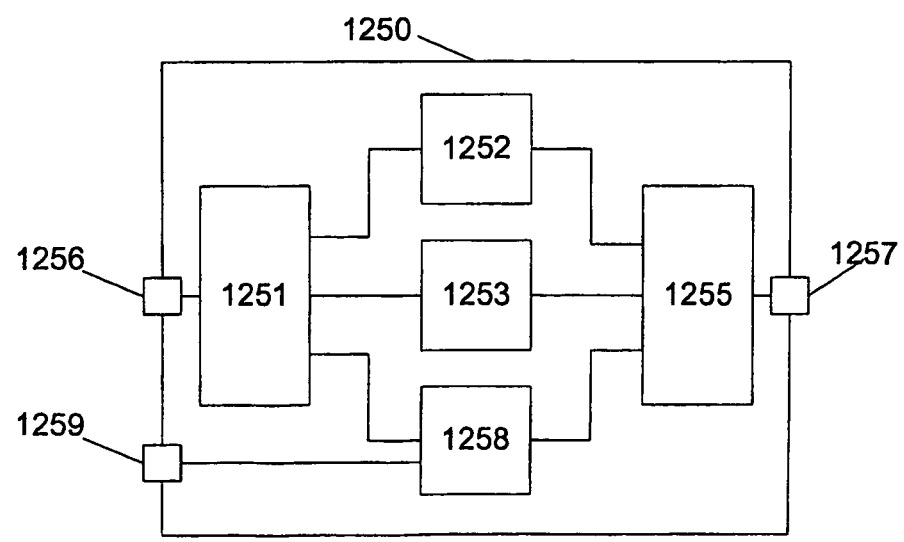

It will be appreciated that this is a simplistic example to highlight the operation of the dither component 1255, but that the techniques may be implemented in more complex environments, to thereby introduce automatic variations in the output from the component This can also be implemented together with external context dependency, as shown for example in FIG. 29B. In this example, the component 1254 is replaced by a component 1258, with an additional input agent 1259 being provided as shown. In this case, the agent 1259 provides an indication of the existing value "$V_2$" of the register eax if it is known.

Accordingly, in this case, the component 1258 is adapted to set the value of the eax using the command eax=eax−($V_2$−V). Accordingly, it will be appreciated that the output from the component 1258 introduces external context dependency, thereby further enhancing the context dependency of the component 1250. In the case in which no value $V_2$ is received at an input agent 1259, the component may be adapted to produce no output, in which case the component 1255 will simply select one of the outputs provided by the components 1252, 1253. However, if an output is provided by the component 1258, then the dithering component can be adapted to randomly select an output from any one of the components 1252, 1253, 1258 as the output of the component 1250.

Meshing

In the event of meshing, components cooperate to allow the output of each component to be modified based on the respective working of each component.

An example of this will now be described with respect to FIGS. 30A, 30B.

Figure 30A:
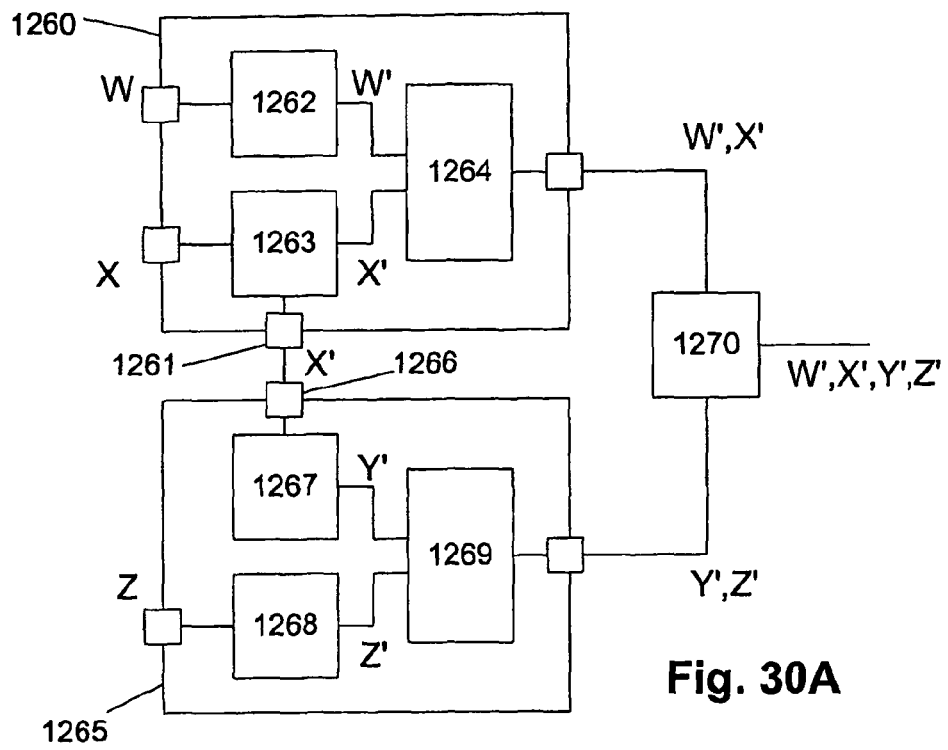
Figure 30B:
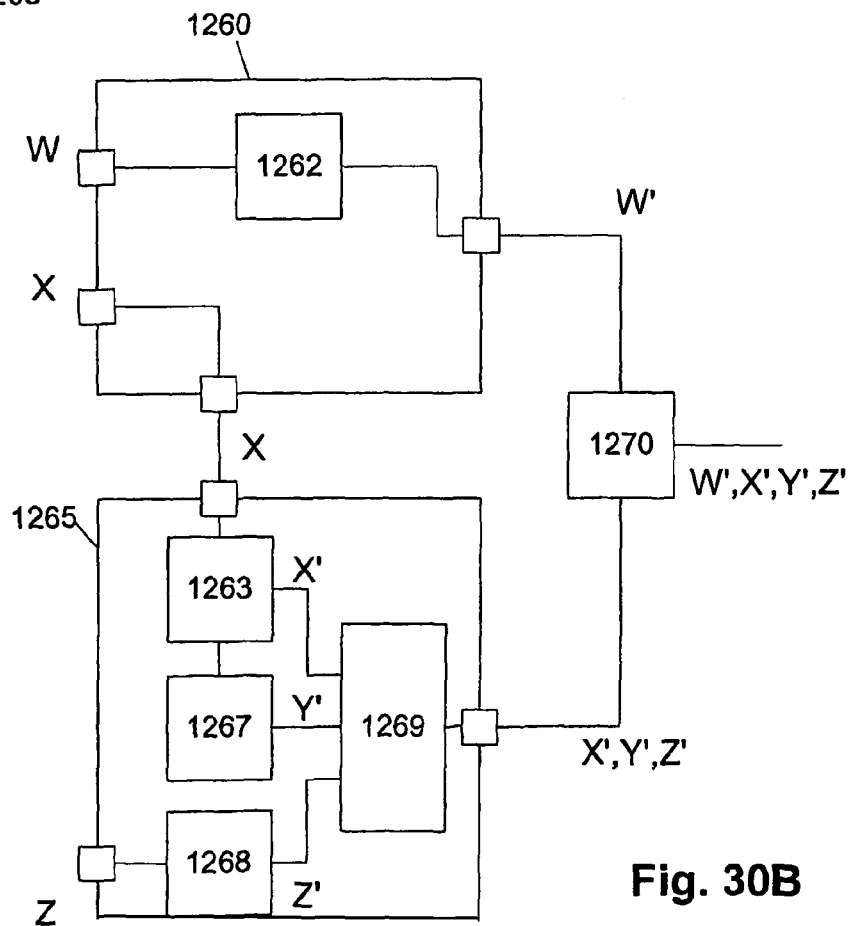

In this case, in FIG. 30A, two components 1260 and 1265 are provided, with the component 1260 including sub-components 1262, 1263, 1264, and the component 1265 including the sub-components 1267, 1268, 1269. In this example, the components 1260, 1265 are adapted to receive inputs W, X, Z, and generate respective outputs W', X', and Y', Z', as shown. In this case, the final outputs are combined using a concatenate component 1270 to form the final resulting code W', X', Y', Z'.

However, by meshing, the components 1260, 1265 can operate to modify the code that each component produces.

Accordingly, in this instance the components 1260, and 1265 negotiate and determine that the exact location of implementation of the sub-component 1263 is not essential to the operation of the components. In particular, the functionality of the components means that the component 1263 can be implemented as a sub-component of the component 1265.

It will be appreciated that in this example, the input agent remains unaltered, with the inputs W, X, Z still needing to be received by the components 1260, 1265 in an identical manner.

However, following the meshing procedure, the resulting output generated by the components has changed. Thus in the arrangement of FIG. 30B, the components outputs are W' for the component 1260, and X', Y', Z' for the component 1265.

As a result, following the meshing, the output of the components 1260, 1265 have changed.

In this example, the outputs of the components 1260 and 1265 are concatenated by the component 1270. This highlights that the end result of implementing the components 1260 and 1265 can integrate into a schematic without effecting the overall schematic and the way in which this operates, even though the components themselves produce different outputs.

Thus, this introduces context dependency by modifying the output of the components dependent on other components in the schematic. It will be appreciated that this will exacerbate the ability of any third parties to monitor the outputs of the components 1260 and 1265 to thereby reverse engineer the service implementation.

In this respective example there are a number of unexpected benefits to the meshing procedure. In particular, the agents of the component 1260 which receive the input X and subsequently output X' can simply hand-off so that the input X is provided to the component 1265.

Furthermore, the component 1260 now no longer needs to implement a concatenate component 1264. This vastly reduces the processing required by the component 1260, whilst only marginally increasing the processing required within the component 1265. In this scenario, the use of meshing can therefore also result in an overall increase in the efficiency of the implementation of the schematic.

It will be appreciated that the above described meshing process depends on the components implemented within a schematic. Accordingly, meshing can only be implemented during the build process.

In general the ability to perform meshing is achieved by having the entity provide an indication of willingness to negotiate meshing as part of the functionality of the agents. In this case, the entity may therefore create an agent which operates to detect the type of component to which it is connected and then offer a negotiate option. This may include for example details of any sub-components that could be readily implemented by other components without undue effect on the remainder of the component.

In the event that an agent receives a negotiate request, the agent will determine if an option to negotiate has been set, indicating that negotiation is acceptable.

Once negotiation is commenced, this may be implemented in a variety of manners. For example this may require manual intervention by the operating entities. Typically however, this can be achieved by having the agents exchange lists of sub-components which can be implemented externally to the component without undue effect on the component operation.

Thus in the above mentioned example, when instances of the components 1260 and 1265 are constructed, the agent 1261 will provide an indication of the sub-component 1263 to the agent 1266. In this case, the agent 1266 will perform checking based on the component schematic and determine that the component 1266 can be integrated into the component schematic relatively easily. Accordingly, the agent 1266 will indicate to the agent 1261 that this is to be performed.

During the build process, the component 1265 will therefore generate the purchase orders requesting the implementation of the component 1263, as will be appreciated by persons skilled in the art. Hand-off can then be used to allow the agent 1261 to hand-off to the 1265, as described above.

It will be appreciated by persons skilled in the art that this process can readily be achieved by having component designers anticipate common meshing that may be used, based for example on the functionality of the components. This allows the entity to implement the component as a dynamic component.

Thus if the entity providing the component 1265 can anticipate that there may be occasions on which the component 1263 may be implemented as a sub-component therein, this allows the entity to create the component 1265 as a dynamic component. In this case, the entity defines two schematics for the component 1265, one including the component 1263, the other without. In this case, when the agent 1261 proposes meshing, the agent 1261 will provide an indication of the component 1263. The agent 1266, which is implemented as a selector agent, can therefore receive the indication of the component 1263, and use this to select the schematic used for implementation of the component 1265.

It will be appreciated that whilst anticipating potential meshing options, and creating appropriate schematics that can be implemented as dynamic components increases the complexity of the component creation, it will also help the implementing entity retain the method by which the component performs the data manipulation as secret. Accordingly, this investment in making the component flexible with respect to potential meshing is rewarded with additional protection for the entity's knowledge in performing the data manipulation.

It will be appreciated that the entity providing 1260 on agreeing to cooperate with the entity providing 1265 for the purposes of meshing may provide a build bundle so that component 1263 or the like, while being purchased by 1260 delivers code via 1265.

It will be appreciated that meshing need not be performed in accordance with dynamic components, and instead may be performed manually.

In any event, it will be appreciated that the techniques described above for producing context dependent code can provide significant barriers to the reverse engineering of the method of performing the respective data manipulation, thereby providing significant protection for the entity with respect to protecting their investment in the development of the components.

This protection for the entity in developing components significantly rewards investment in development, thereby allowing entities to compete with respect to providing services.

General

Accordingly, in one example, the above described systems allows users to perform data manipulation or generate computer code by defining combinations of components. In this case, each component corresponds to a respective data manipulation service and accordingly, the component combination defines a sequence of data manipulations which when performed will result in the desired data manipulation being performed or the desired code being generated.

The components are generally provided by respective entities which are capable of performing the data manipulation service defined therein, and this may be achieved either manually or through automated procedures. Accordingly, in order to allow a user to define a suitable component combination, the components are usually made available through a centralised system, which is often referred to as a forum. This is typically implemented by one or more processing systems and may be achieved by having the forum receive formal definitions of the components in the form of component specifications.

In order to allow the data manipulations to be performed, it is necessary to be able to define the component combination with sufficient detail to allow the components to interact. In order to achieve this, in the examples described above, a schematic is defined which sets out the components to be used, and the interactions therebetween. The schematic is typically defined using a suitable GUI, which therefore allows users to select components presented on a forum, drag and drop these into the schematic, and define suitable connections between the components to define the component interactions. In this regard the forum is provided by one or more processing systems that operate as a portal to provide access to the component specifications.

Once the schematic is completed, this may then be implemented in a process known as a build.

During a build a respective component instance can be generated for each component in the schematic.

Each component instance may be created on a respective component server which is typically implemented using a processing system provided by the respective entity. In use, when the system is implemented data may be transferred between the respective component instances with at least some of the component instances performing required data manipulations on received data, so as to provide an output of manipulated data as required.

It will be appreciated that the component instances can be capable of communicating with each other, and in particular, can be capable of transferring information and data in a form that can be understood by both components.

In one example, this is achieved using agents, with a respective agent being provided for each component port. Thus, an agent associated with a port on one component will cooperate with an agent associated with a port output on another component. Whilst the ports are generally used for bi-directional exchanges of information, there is often a directionality associated with the transfer of data and the ports are therefore commonly referred to as inputs and outputs.

Communication between agents is typically achieved by transferring messages including a header with address information and a payload containing any data to be transferred. The interaction between the agents can be as simple as causing one agent to send a message to another agent, with no further communication occurring. Alternatively a two stage process may occur including negotiation followed by data transfer. In this case, the agents will first negotiate with each other to determine a common data format which can be used to transfer data between the respective components, before proceeding with the data transfer as required. Thus, during negotiation, the payload will typically include a list of acceptable data formats that may be handled by the agent, or the like. Thus, a first agent will transfer a suitable list to a second agent with the second agent responding with an indication of a format which is acceptable. In the case of transferring data to be manipulated, the data will be included in the payload.

Thus, in one example the agents represent the only form of interaction between the components.

When a schematic is to be built during a build process, this can be achieved by sending purchase orders to each entity providing components within the schematic. Each entity can then construct a respective component server including a respective component instance together with any associated agents. Once this has been completed, the agents perform any required negotiations before the transfer of data between the components occurs in order to allow the components to perform the respective data manipulations embodied by the component.

In this example, an entity receives a purchase order for a respective component this will specify connections that need to be formed between agents associated with the component, and other agents. In particular, this will include the agent addresses of the other agents so that when the component instance and corresponding agents are constructed, the agents will be able to communicate directly with the other agents.

Furthermore, in one example the generated code can be context dependent code as described above, allowing the system to providing a viable economic development model by protecting both the customers and suppliers Intellectual Property (IP). In one example, all rights to the resultant code can be bestowed on the customer whilst the IP used by the supplier and the method by which the code was created is never exposed to the customer. The customer therefore purchases the outcome rather than the process that created that outcome. A real world example would be to purchase a car from the manufacturer. The customer is only interested in the car, not how the car was constructed.

As the above techniques capture how software is constructed this provides an IP protection mechanism for protecting the supplier's IP. That is, "how" is never exposed to the customer. This may be further enhanced by the generation of context dependent code, which in turn assists the supplier to protect their special capability.

It will be appreciated that the above examples describe systems that can be adapted to generating code which is context dependent and therefore substantially reduced in size compared to conventional code. Furthermore, the specialisation that can be achieved by allowing component suppliers to focus on small but detailed aspects of the code generation process enable a dramatic increase in reliability and optimisation to be achieved.

Accordingly this provides a completely new process for constructing software moving away from the current "artisan" approach (in which individuals or small groups work linearly on all parts of a larger application from start to finish) to an "industrial" model (using specialist component suppliers, high level coordination and assembly line concepts) which replicates current best practice in manufacturing industries.

This may be achieved using one or more of a number of techniques including:
  Adding a competitive element to software development.
  Allowing supplier specialisation.
  Protecting both supplier and customer IP.
  Creating fully transferable ownership rights for clients.
  Creating an industrial style software supply chain.
  As a result, in some examples, the process can:
  Allow for competition between component suppliers by allowing component suppliers to compete directly to provide respective services.
  Symmetrically protect the IP of suppliers and clients.
  Allow for the development of component supply chains.
  Provide a fully distributed component processing engine.
  Support fully automated code generation.
  In one implementation this is aided through the use of the following tools:
  Component Designer—an application supporting visual assembly of components.
  Component Public and Private specification files—for defining components in a predetermined format such as XML.
  Component Server—an application supporting the supply of services as specified by the component public specification file;
  A set of server-to-server communication messages embodied by agents, that coordinate the serving of a component.

IP Protection

The process can protect the intellectual property of suppliers by providing an intrinsic mechanism to allow components to be individually identified and to produce useable outputs only within the context for which they were designed.

In this regard it will be noted that existing compiler technologies may use proprietary processes to generate code, but the resulting code is always the same (context independent) and may be reused by others as they wish without recognising the IP of its creator. For example, a "printf" function in C may be reused indefinitely via code libraries or even binary code without any recognition for its creator.

However, in the techniques described above the supplier can learn how to protect their component IP by defining components yielding context based IP protection as a by-product of the construction process.

The IP protection is symmetric in the sense that component suppliers provide their service by running the component server. The supplier may have no access to information on how the component is ultimately used by a component consumer.

Pay-Per-Use

In addition to this the model described above allows a pay-per-use component strategy as opposed to current coding practice which encourages the development of code from passive reusable elements which exist in a context independent environment. Context independent components eliminate the need for users to repurchase these components for each use, undermining the economics of producing the component originally.

Legal licensing mechanisms are currently the only safeguard in effect to protect context independent code. However, the introduction of the context dependent code generation, together with direct market competition between component suppliers makes extraction and reuse of the executable code produced by an individual component difficult enough so that it would be cheaper to purchase rather than reverse engineer that component.

Supply Chains

The described processes support industrial type supply chains. In this case, when a purchase order for a given component arrives with a supplier, a Component Server deployed at the component vendor's site automatically generates purchase orders for the required sub-components. Such automation creates an efficient "just-in-time" component supply chain.

Distributed Construction

The process supports truly distributed code construction.

Persons skilled in the art will appreciate that numerous variations and modifications will become apparent. All such variations and modifications that become apparent to persons skilled in the art, should be considered to fall within the spirit and scope that the invention broadly appearing before described.

APPENDIX A

This section includes examples of primitive components that will typically be used in the construction of executable code.

In the following examples the executable code actually used to implement the components will not be described as this is generally straight forward and well within the scope of any programmer as will be appreciated by a person skilled in the art. In any event, it will also be appreciated that different forms of fundamental component implementation may be provided.

Bundle

The bundle component operates to bundle agent connections together into a single agent connection, as described above. A range of different bundling components may be provided including different numbers of inputs and outputs.

The BUN2 component shown in FIG. 31A is a primitive component that can bundle two agents provided via the agent inputs 1, 2 into a single agent. The bundle is named with the name gathered from an NI agent. When connected to another BUN2 component the bundle name from the remote BUN2 component will be presented on the NO agent to permit error checking. The agent B presents the bundle while the agent E presents any errors in operation.

The BUN3 component shown in FIG. 31B is a primitive component that can bundle three agents presented at the input agents 1, 2, 3. The bundle is named with the name gathered from the NI agent. When connected to another bundle 3 the bundle name from the remote bundle 3 will be presented on the NO agent permitting error checking. The agent B presents the bundle while the optional agent E presents any errors in operation.

DUP

The dup components includes an input agent I coupled to two or more output agents O, as shown for example in FIG. 31C.

In use, an input payload received at the input agent I is duplicated and supplied by each output agent O as required. This allows data from a single agent to be copied and distributed to multiple agents as required.

D2H

This component, shown in FIG. 31D converts a payload received on agent I from decimal to Hex and presents it on agent O. It is done with a precision given by agent P. Any errors in the conversion are presented on optional agent E.

H2B

The H2B component shown in FIG. 31E converts a payload received via the agent I from Hex to binary and presents it on agent O. It is done with a precision given by agent P. Any errors in the conversion are presented on optional agent E.

Endian

The endian component shown in FIG. 31F performs a byte wise reversal of input hexadecimal number received as the payload on agent I and presents it on agent O. For example with an input of 01234567 the output would be 67452301. It is done with a precision given by agent P. Any errors in the conversion are presented on optional agent E.

Find & Replace

This component shown in FIG. 31G will search through a string presented at the agent In for every appearance of the string presented at the agent Find, and will replace each of those appearances with the string presented at the agent Replace, with the result being sent via the agent Out.

If the string Find is not found, the agent string In will appear at agent Out unchanged.

Find Tag

This component shown in FIG. 31H will search an XML document presented at the XML In agent for the tag presented at Tag In agent.

It will return:

the value associated with the tag at Value Out
the remainder of the XML document at XML Out
any exceptions that occurred at Exception
For example, if payload at the agent XML In is:

```
"<b>
    <a>1</a>
</b>
<a>2</a>
<b>
    <a>3</a>
</b>"
``` and the payload of the Tag In agent is "a" then Value Out will be "2" and XML Out will be:

```
"<b>
    <a>1</a>
</b>
<b>
    <a>3</a>
</b>"
```

An exception will occur when the payload of the XML In agent is not valid XML or the payload of the Tag In agent is not found. If an exception occurs, nothing will appear at either output.

If the XML contains data that is Base-64 encoded, it will appear Base-64 encoded in the payload of the XML Out agent, but will be decoded if and when it appears at Value Out agent.

Add_Tag

The add tag component shown in FIG. 31I creates an XML tuple of the form <Tag In>Value In</Tag In> in valid XML, based on the tag presented in the payload at the Tag In agent, and in accordance with the value provided at the Value In agent. If the value needs to be stored as a Base-64 number, then it will be done. If the tag is not valid for XML, an exception will occur and the payload of the XML Out agent will not include anything.

Cat

This component shown in FIG. 31J will concatenate the strings provided in payloads at the agents 1 and 2, and output the result at the remaining agent. For example, if the string 1 was "banana" and the string 2 was "smoothie", the output agent will output "banana smoothie".

Len

This component shown in FIG. 31K will measure the length of the string received at the agent I, and send the length from agent O. For example, if the input string at agent I was "ABCDEF" the output would be 6.

LUT

This component shown in FIG. 31L searches a lookup table, supplied in XML at the agent "T" and complying to the "lookup table" protocol, for an input "I", and returns the matching output at agent "O".

The table is comprised of a number of entries, mostly made up of input/output tuples. If the input at agent "I" matches the input of the tuple, the output at agent "O" will be the output from the same tuple. The table also has an optional entry, containing the single tag "otherwise". If this tag is present and no matching tuple has been found, then the output "O" will be the output value associated with the "otherwise" tag. If not match could be found, or the table data does not comply with the protocol, then an exception will occur. If an exception occurs, nothing will appear at the output O.

An example of the "lookup table" protocol is as follows:

```
<protocol>
    <protocol_name>lookup table</protocol_name>
    <protocol_data>
        <entry>
            <input>input 1</input>
            <output>output 1</output>
        </entry>
        <entry>
            <input>input 1</input>
            <output>output 1</output>
        </entry>
        <entry>
            <otherwise>output otherwise</otherwise>
```

```
        </entry>
    </protocol_data>
</protocol>
```

And

This component shown in FIG. 31M computes the logical AND of the boolean strings provided in the payloads at agents 1 and 2, and outputs the result in the payload of agent O. An exception will occur if either of the inputs are not able to be parsed into boolean strings, and nothing will be sent from the agent O. For example, if 1 was "true" and 2 was "false", then O would be "false".

Math

FIGS. 31N, 31O and 31P show mathematical operator components DIV, ADD EQ, for performing the mathematical functions of divide, add and an equals determination of the payloads presented at the agents 1, 2. In this case, the result is presented at the respective output agent O, with an exception indication being provided at the agent E.

Build ASM 1

Figure 31Q:
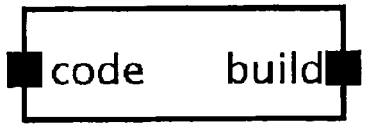
FIGS. 31A to 31V are examples of primitive component schematics.

The Build ASM 1 component shown in FIG. 31Q is a member of the build components which manipulate build chains representing the data structure responsible for collecting code fragments.

Build ASM 1 receives code via the agent code and proceeds to insert it into the build chain which is connected to the build agent.

Figure 31S:
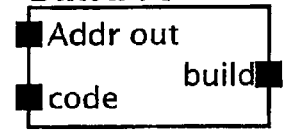
Figure 31R:
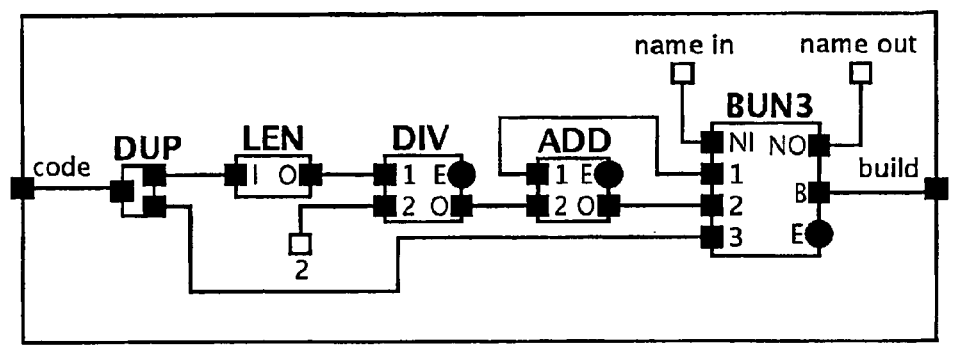

An example of the internal schematic of the Build ASM 1 component is shown in FIG. 31R. It can be seen that the external agent code is handed off onto the internal agent DUP which makes two copies of the payload of the code agent. The first copy of the code agent is presented to a component LEN which computes the length of the code string. This is then presented to the DIV component for division by 2 before being added to an address chain. The address chain is received on the agent 1 of the component BUN3 and is returned on the agent 2 of the component BUN3. The second copy of the code agent is presented to the agent 3 of the BUN3 to deliver the code to the build chain. The component BUN3 serves to bundle the address in/out and the code agents together for delivery to the other members of the build family.

Build ASM 2

The Build ASM 2 component shown in FIG. 31S is also a member of the build components.

Build ASM 2 is adapted to receive code on the agent code and proceeds to insert it into the build chain which is connected to the agent build. Build ASM 2 also provides the current address of the memory allocated for the code on agent Addr out.

Figure 31T:
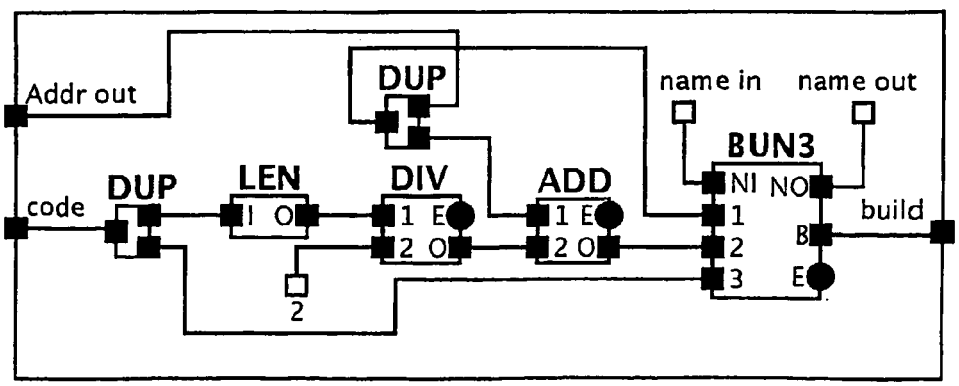

An example of the internal schematic of the Build ASM 2 component is shown in FIG. 31T. It can be seen that the external agent code is handed off onto the internal agent DUP which makes two copies of the payload of the code agent. The first copy of the code agent is presented to a component LEN which computes the length of the code string. This is then presented to the DIV component for division by 2 before being added to the address chain. The address chain is received on the agent 1 of the component BUN3 and is duplicated using the component DUP before being returned on the agent 2 of the BUN3 component.

The second copy of the address is presented on the Addr out agent. The second copy of the code agent is presented to the agent 3 of the component BUN3 to deliver the code to the build chain. The component BUN3 serves to bundle the address in/out and code agents together for delivery to the other members of the build family.

Init_Elf

Figure 31U:

The Init_elf component shown in FIG. 31U is also a member of the build components.

The Init_elf component presents a build bundle for interfacing with the other members of the build family. Via this build bundle the Init_elf component receives the code which is formed into a file format for execution and loading (ELF). This file format data is presented on the elf agent.

Figure 31V:
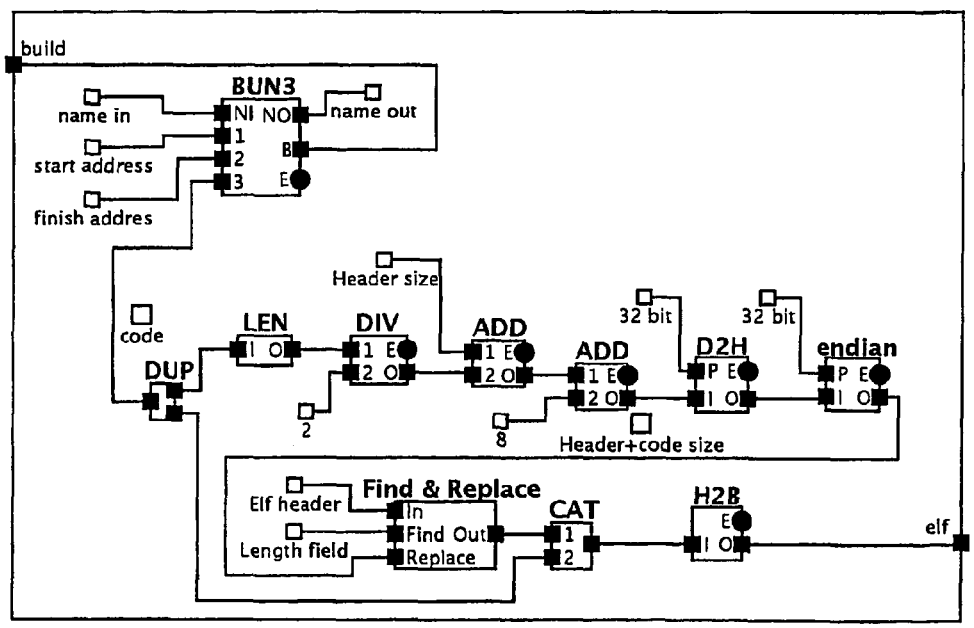

An example of the internal schematic of the Init Elf component is shown in FIG. 31V. It can be seen that the agent build is handed off to the component BUN3 which unpacks the bundle to recover the address in/out and the code agents. Because this is a simplified version of the build chain designed for this example, it has only limited capability. Thus when the code is incorporated into the execution and loading file format (ELF) the address information is ignored. The address agents are only used to track the code address as fragments are added. Once the code agent is recovered on agent 3 of the BUN3 component it is presented to the DUP component which makes two copies. The first copy is used to compute the total size of the ELF file for inclusion into the header via component Fine & Replace while the second copy of the code is appended to the header via the CAT component and converted to binary with the B2H component before being presented to the external agent elf for delivery to the parent.

APPENDIX B

Specific Examples

Alternative techniques are outlined in a number of specific examples set out in detail below.

First Specific Example

The first example results in the construction of a schematic containing a single component. This straightforward example serves to highlight the steps involved in construction.

Figure 32A:
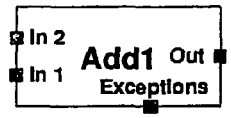
FIG. 32A is an example of a component representation of an "Add1" component.
Figure 32B:
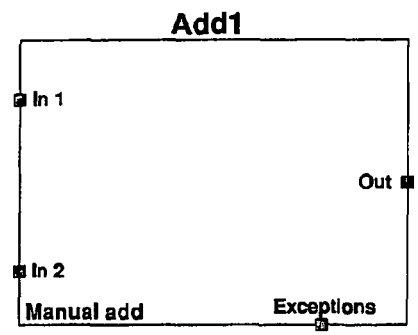
FIG. 32B is an example of an internal schematic of the "Add1" component of FIG. 32A.

FIG. 32A shows an external component representation Add1 of a component "Add1" that offers an "add" service. An internal component representation is shown in FIG. 32B. As shown the component includes two inputs IN1, IN2, and two outputs OUT, EXCEPTIONS.

Figure 32C:
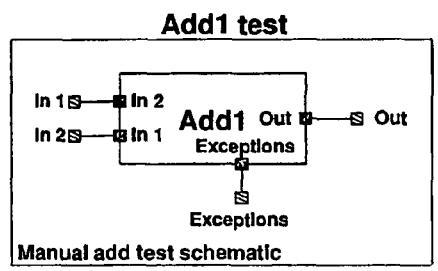
FIG. 32C is an example of a test schematic using the "Add1" component of FIG. 32A.

In this example, the component representation Add1 is layered-up into a schematic "Add1 test" as shown in FIG. 32C. This schematic consists of an outer box called the root component, the component representation Add1, and connected to this are four internal agents IN1, IN2, OUT, EXCEPTIONS denoted by the crosshatched boxes of FIG. 32C. In this example, all agents are connected in pairs with a single line.

Every build begins with the starting of a root component server, which in this example corresponds to one of the processing systems outlined in the example above. Theoretically any one of the base station 1, the end stations 3 and the entity stations 5 in the example set out above could act as the root component server, although in this example it is the end station 3 of the user.

When the root component server receives a build request it proceeds to construct the root component. In this example the root schematic associated with the root component is loaded and scanned. All component representations in the root schematic are then identified and secondary build requests are issued by the root component server. In this case only a single build request is issued to an "Add1" component server since the example schematic only contains this one component.

On the "Add1" component server, which may for example be one of the entity stations 5 operated by a respective entity and positioned at a remote location, there is an "Add1" schematic associated with the component in much the same way as the root schematic is associated with the root component. FIG. 32B represents the "Add1" schematic residing on the "Add1" component server. Of note is that the schematic contains nothing. Accordingly, the component Add1 does not include any sub-components.

When the "Add1" component server receives the secondary build request that was issued from the root server it creates a new instance to serve as a vehicle for providing the "add" service to this new customer. Similar to the actions of the root component server the "Add1" component server loads the schematic associated with "Add1" and scans it for any component representations so that further build requests can be sent out. In this example however the "Add1" schematic is empty and thus no further build requests are issued.

It is important to note that the "Add1" build request issued by the root component server supplies information about the agents associated with the "Add1" component. That will allow the "Add1" component instance's agents to connect to the correct destination, which in this case are on the root component server.

The next step for the root component server is to scan its root schematic for internal or external agents. Since it is a root component it will not contain any external agents. However the schematic does include the four internal agents IN1, IN2, OUT, EXCEPTIONS as shown in FIG. 32C.

The root component server then proceeds to create these internal agents and they begin to contact their respective partners, namely the agents IN1, IN2, OUT, EXCEPTIONS on the "Add1" component server. The "Add1" component server performs a similar function. The "Add1" schematic is scanned for agents and only four external agents IN1, IN2, OUT, EXCEPTIONS are found. The "Add1" component server then proceeds to create these external agents and they also begin to contact their partners at the root component server.

Since the root component server and the "Add1" component servers were successful in creating their internal and external agents respectively, they connect successfully.

At this point the root component server has established four communications paths to the "Add1" component server and the user can now utilise the service at the "Add1" component server via the agents available on the root component server.

Since the "Add1" schematic is empty the service supplied by the entity must be performed manually by an operator stationed at the "Add1" component server. Thus when the user of the root component server enters a number in the internal agents IN1, IN2, respectively, the operator at the "Add1" component server will receive these numbers and can then perform their service. In this example the operator at the "Add1" component server must add the numbers manually and return their result using the agent OUT.

If the "Add1" component wished to verify the formatting of the inputs or outputs, for instance, the base of the number system to be used, or the number of decimal places to be used, the agents are free to send additional payload packets until all parties are satisfied. In this case, as there is no need to transfer further information, the agents are free to terminate the link.

Once the transaction is complete the agents can be terminated at both the root component server and the "Add1" component server, and the root component instance and "Add1" component instance can be retired respectively.

Although this example is quite simple it serves to highlight the concept of the component servers, how the agents interact and that a service performed remotely at the component server, which will typically be situated remotely to the end station 3. Thus, for example, the root component server may be located in Townsville, with the "Add1" component server in Rome. Despite this, the location of the "Add1" component server is transparent to the user in Townsville.

The last point to note is the use of the EXCEPTIONS agent, which can be used should the entity providing the Add service have any difficulty in performing the service as contracted, the exception agent can be used to communicate the difficulty.

Second Specific Example

Figure 33:
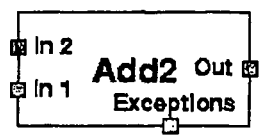
FIG. 33 is an example of a component representation of an "Add2" component.

The second example is substantially the same as the first example, except that in this example, the provision of the "Add" service is through the use of a component "Add2" which is automated. An example of the component representation Add2 of the component "Add2" is shown in FIG. 33. As shown the component representation Add2 is substantially the same as the component representation Add1.

This example shows it is very easy to automate the services of simple components. In particular, automation is achieved by monitoring states of the agents belonging to each instance of an automated add, and performing certain tasks as the states change.

In this example, at the time when the agents IN1, IN2 of the "Add2" component have received payloads and the agent OUT is connected, the payloads from the agents IN1, IN2 are added together and sent out as a payload packet via the agent OUT.

As this automated add component is designed to work for only decimal addition, it will send a message indicating that an input was incorrectly formatted if an input is not a valid decimal number. When the agent OUT has received a termination indication, the agents IN1, IN2 send terminate packets to their partners.

The result of this is that if the root component sends the numbers 5 and 4 to the automated "Add2" component, the result, 9, will quickly arrive at the agent OUT of the root component. If the root component was to then send the number 6 via the agent that had sent the number 5, the number 10 will arrive at the output, allowing for any corrections without the need for a restart.

If the root component were to send the letters "five" and the number 4 via the agents IN1, IN2 respectively, agent IN1, will receive the message "Number formatted incorrectly" from the automated "Add2" component.

Third Specific Example

The third specific example extends the complexity of the add component allowing it to handle input numbers of different number bases, such as decimal and hexadecimal. This is an addition that can accept inputs as either decimal or hexadecimal numbers and can output either a decimal or hexadecimal number.

Figure 34A:
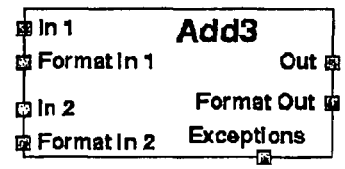
FIG. 34A is an example of a component representation of an "Add3" component.
Figure 34B:
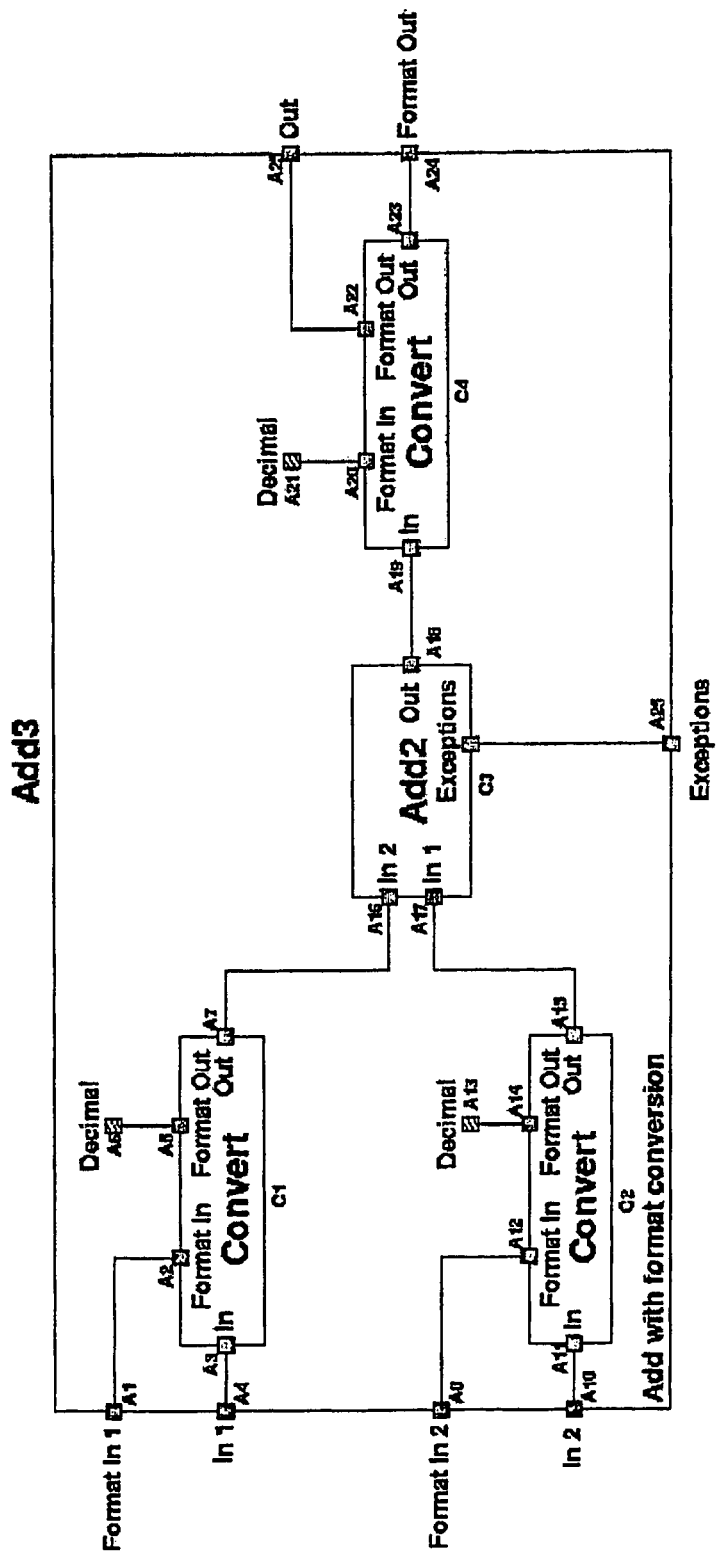
FIG. 34B is an example of an internal schematic of the "Add3" component of FIG. 34A.

FIG. 34A is an example of the component representation Add3 of an "Add3" component. The "Add3" component includes inputs and output having agents IN1, IN2, FormatIN1, FormatIN2, FormatOUT, EXCEPTIONS, as shown. In this example, the "Add3" component is a compound component containing many internal components that have been selected and arranged in such a way as to perform this more complex service. FIG. 34B is the internal schematic of the "Add3" component and this introduces a number of new components in order to perform this more complex service.

Detailed in the schematic shown in FIG. 34B are a number of "convert" components, which perform the service of converting a number in a particular format to another format. In this way a user of the "Add3" component can specify the format of each number.

Because the automated "Add2" component will only work with decimal numbers it is rather fragile. However the "Add3" component performs the same basic service but is much more robust in that it can handle input numbers of many formats and even produces the output number in any format desired. This is despite using the fragile "Add2" component.

Formatting is achieved using the agents FormatIN1, FormatIN2, FormatOUT.

Each of the input numbers supplied to the agents FormatIN1, FormatIN2, are converted to decimal using the respective "convert" components, before being transferred to the "Add2" component. Each "convert" component has four agents IN, FormatIN, OUT, FormatOUT.

The number from the respective IN agent of the "Add3" component is presented at the agent IN, and is interpreted as being of the format specified by the respective FormatIN agent of the "Add3" component.

In this example, three instances of the "convert" component are used, one for each of the agents belonging to the "Add2" component. This is necessary as the "Add2" component only works with decimal numbers.

When the "Add3" component is used in a build all of the external agents IN1, IN2, FormatIN1, FormatIN2, FormatOUT, EXCEPTIONS, will become connected to their respective partner agents on the root component (not shown).

The "Add3" component will then build its internal schematic corresponding to FIG. 34B. This will send build requests and agent connection details to all the sub-components. All the external agents IN1, IN2, FormatIN1, FormatIN2, FormatOUT, EXCEPTIONS, of the "Add3" component are connected directly to the respective "convert" sub-components and so they are handed off resulting in the subcontractor "convert" components connecting directly to the partner agents on the external agents. Apart from the external agents the "Add3" component has three internal agents DECIMAL, which are set to automatically deliver their payload as soon as the agent has connected. As these agents send their payload automatically and send terminate as soon as they receive a terminate packet, they are in effect automated agents.

If the conversion component is automated, then the entire "Add3" component is in effect automated. This is a good example of the building of complex programming components from simpler programming components, and also of non-primitive automation. The "Add2" component was automated, but as there is no way of performing the task via a sub-schematic it is classified as a primitive component. In effect, all software produced with these techniques will be derived out of primitives at the lowest level.

The "Add3" component is more versatile than the automated "Add2" component. The purchaser of an "Add3" component will be able to perform addition without worrying about how the conversions work, demonstrating a level of complexity hiding.

Fourth Specific Example

This specific example is the most complicated add component to be discussed.

In this example, an "Add5" component also provides additional testing and functionality to the "add" service. However it will be noted that the discussion only adds sufficient complexity to illustrate certain key features of the technology. The "Add5" component demonstrates the use of agent bundling, basic input testing, schematic selection and exception handling.

Figure 35A:
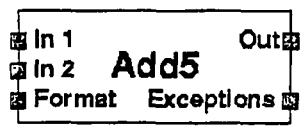
FIG. 35A is an example of a component representation of an "Add5" component.

The "Add5" component extends the "Add3" component by including input validation for the Format specification and uses bundling to reduce the number of external agents. FIG. 35A shows the component representation of the "Add5" component. It has 5 agents that are briefly described in the table 3 below:

TABLE 3

| Agent | Description |
| --- | --- |
| IN1 | Input number 1 (Bundle of number value and number format) |
| IN2 | Input number 2 (Bundle of number value and number format) |
| FORMAT | Specifies the required format of the output number (ie. decimal or hexadecimal) |
| OUT | Output result of the addition (Bundle of number value and number format) |
| EXCEPTIONS | Indicates if any build exception occurs. |

Figure 35B:
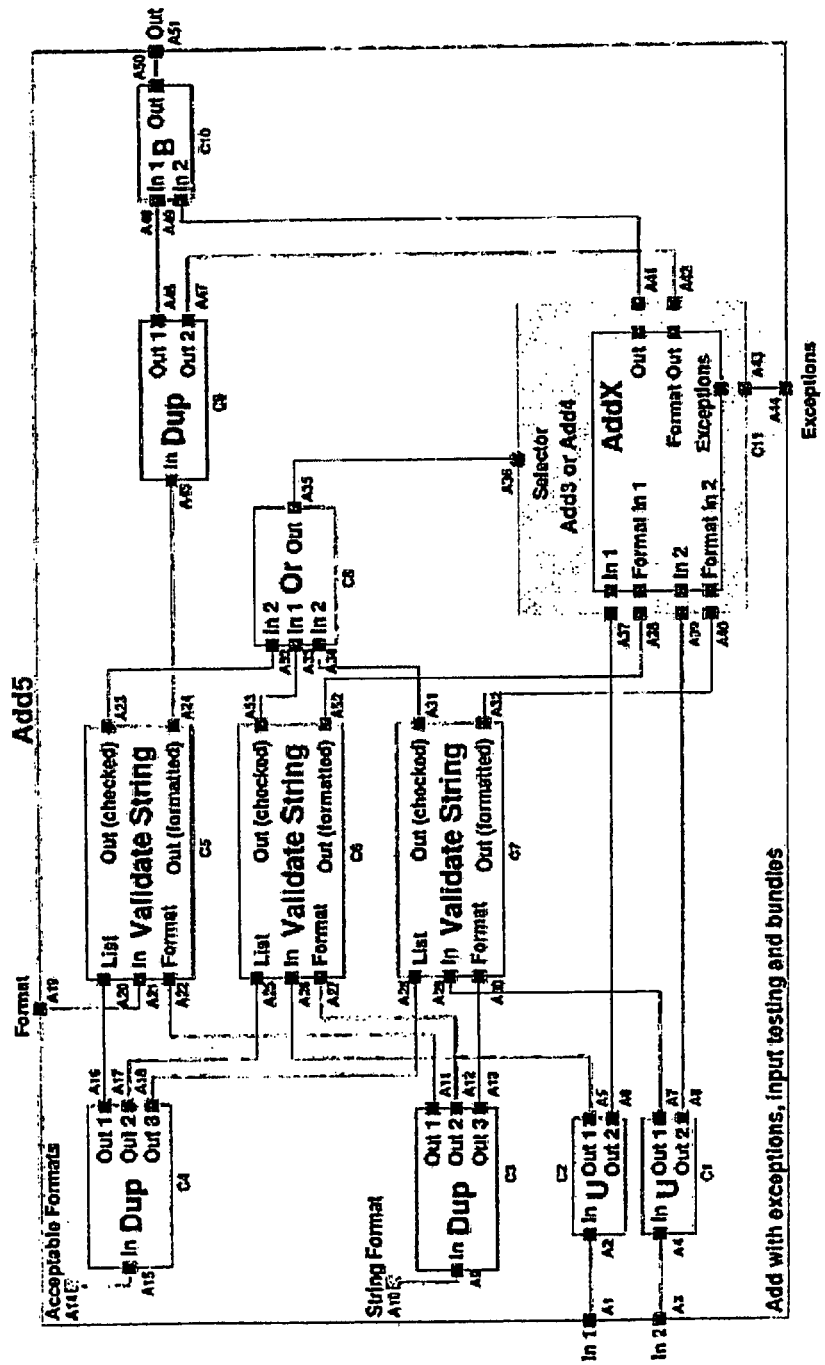
FIG. 35B is an example of an internal schematic of the "Add5" component of FIG. 35A.

FIG. 35B shows the internal schematic of the "Add5" component. This example uses 6 other components as briefly described in Table 4.

TABLE 4

| Component | Designators | Brief description |
| --- | --- | --- |
| Dup | C4, C3, C9 | Duplicates the payload of its IN agents to all of its OUT agents. |
| Validate String | C5, C6, C7 | Checks an input string against a list of valid strings. It outputs the result of the checking and reformats of the input string to a given specification. |
| Or | C8 | OR Boolean logic, output is true if any input is true, else output is false. |
| U | C1, C2 | Unbundle. Splits a bundle of agents. |
| B | C10 | Bundle. Combines two agents into a bundle. |
| Schematic selection | C11 | Selectively builds one of n schematics based on the payload of the selector agent. |
| Add4 | | Same as an Add3 except that the service is performed manually, allowing much more power resolution of problems than the automatic Add3 component. |

Validate String

The Validate String component works by comparing the input string (In) to a list of valid strings on the LIST agent. In this example the list would be "Decimal" and "Hexadecimal". If the input string is valid than it is passed as being valid resulting in the OUT(checked) agent returning "true". If the string were not valid the OUT(checked) agent would return "false". An additional service of the validate string is to reformat the input string into a specified output format. This might include the removal of white space (space, and carriage return character), converting the string to lower case and also trimming the string length. The FORMAT agent specifies this output formatting.

Or

The Or component is a logical operator used when to trigger an event based on input from multiple sources. It combines all its inputs so that if any of them are true it will output a true. When Or is first purchased all of its input agents are undefined as each of the agents will only have just connected and will thus have no payload. The Or component then waits for agent payloads until it has sufficient information to decide what output it should deliver. It will output a "true" as soon as any of the input agents have a payload of "true", otherwise it will wait until all input agents are specified as "false", at which point it will output "false".

Bundled Agents

The agents IN1, IN2, OUT use bundling to combine two agents together, one representing the value of the number and one for specifying the format of the number. This bundling assumes that the number format is in the first position of a bundle, and the number value is in the second location. This combination of these two particular agents will be referred to as a number bundle. To ensure compatibility the agents IN1, IN2 must only be connected to agents that produce a number bundle and the OUT agent must only be connected to an agent that can handle a number bundle. For more information about bundling refer to the section on bundling and unbundling.

The number inputs In1, In2 of the agents IN1, IN2 of the "Add5" component are unbundled by the components C1, C2 to get the number value and number format agents. After the components C2, C1 perform their service the number value of In1 becomes connected to the agent A37 and the number format becomes connected to the agent A26.

For the number input In2 the number value becomes connected to the agent A39 and the number format becomes connected to the agent A29. The number formats for each of the inputs In1, In2 is then verified and formatted by the Validate String components C6, C7. The agent A19 specifying the output format is also checked using C5.

Duplicates and Validate Lists and Formats

The Validate String components allow the inputs to checked and formatted based on predetermined requirements.

In this example, it is necessary want to ensure that the Format specified for the Add component used in the addition component C11 is compliant with the agents FormatIN1, FormatIN2 and FormatOUT. Each of the Validate String components C5, C6, C7 require a specified list of valid strings, which is supplied by the internal agent A14, and duplicated three times by the Dup component C4. In this case the payload for the internal agent A14 would be "Decimal, Hexadecimal". The internal agent A10 specifies the required output format for the three Validate String components, which maybe something like "No white space, lower case". This is achieved by duplicating the string received from the internal agent A10 using the Dup component C3.

Selective Construction

The OUT(checked) agents A23, A53, A31 of the Validate String components indicate whether each of the Format specifications passed the input verification. It any of them fail, additional functionality is required to be performed manually. The OUT(checked) agents A23, A53, A31 are combined into a single agent A36 using an Or component C8, which will have an agent payload specifying whether to use a manual or automatic add provided by "Add4" or "Add3" respectively.

The core part of the schematic in FIG. 35B is performed by the addition component C11. This component is special in that the sub-schematic of the addition component is dependent on the payload of a selector agent A36.

Internally to the component C11, the agent A36 selects whether to construct an automated "Add3" or manual "Add4" component. If the inputs In 1, In 2 and Format provided to the agents A1, A3, A19 respectively pass the input checking performed by the validate string components C5, C6 and C7 then an "Add3" component is used to perform the addition operation. Conversely, if the inputs don't pass the validation than the addition is performed by a manual "Add4" component, allowing the inputs to be studied and queried by a human. If the information makes no sense whatsoever, an exception will be generated and passed to the parent component.

The addition component C11 demonstrates the use of selective construction, where a different sub-schematic is built based on the information provided by an agent. Although only a simple case has been presented in this example, in general this technique is extremely powerful. It allows the schematic design to be selected based on the input information to the component. It also allows the construction to be completed in stages; as each stage completes it can trigger the construction of the next stage.

Staged construction can greatly minimise the total number of component instances used at any one time, minimising computer resources. It also allows a trade off between a completely serial construction (ie. the components are purchased and built one at a time) and a completely parallel construction (ie. all components are purchases and built at the same time). A serial construction minimises computer resources but is inherently slower than a parallel construction.

The addition component C11 only has a single component in its sub-schematic, however in general it can contain a schematic of any size. The operation of the addition component C11 is transparent as for as the remainder of the schematic is concerned, and in this example acts just like a normal component.

In fact it could be implemented using a component server that selects the sub-schematic based on an agent payload. Alternatively it could be implemented directly as part of the "Add5" component. In this case each of the agents A36-A43 of the addition component C11 are implemented as internal agents, which get handed off when the sub-schematic of the addition component C11 is built.

Component Output

The output of the addition performed by the addition component C11 is combined into a number bundle using the bundle component C10.

Fifth Specific Example

In the previous four specific examples, it has been demonstrated how it is possible to perform processing of agent information. None of the previous examples have dealt with the construction of code, but were instead computer programs performing some task, which in these examples was the calculation of an addition. It will be appreciated from this that although the examples set out in the flow charts of FIGS. 1, 3A to 3B, and 10A to 10E are examples of producing software, these could also be used in performing processing operations directly.

In any event, the fifth specific example extends the concept by using the technology to construct executable code directly byte by byte.

In this example a component is outlined that constructs code, that when executed on an IBM PC will display a pixel on the screen, given a position and a colour. The code produced is not however a complete program, but instead a code fragment constructed to the requirements of the program in which this component has been designed into. This component produces x86 machine code as its output. The details of this component are specific to IBM PC architecture, and so the details will only be briefly described.

Figure 36A:
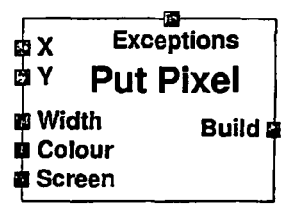
FIG. 36A is an example of a component representation of a "Put Pixel" component.

FIG. 36A shows the component representation Put Pixel of the "Put Pixel" component. It has five input agents X, Y, Width, Colour and Screen and two output agents Exceptions and Build.

A description of each of the agent is shown in Table 5 below.

TABLE 5

| Agent | Input/Output | Description |
| --- | --- | --- |
| X | Input | Horizontal position, from left to right in pixels, to draw the pixel. |
| Y | Input | Vertical position, from top to bottom in pixels, to draw the pixel. |
| Width | Input | Width of the screen in pixels. This must match the current mode of the screen and must be set up previously in the program. |
| Colour | Input | Colour of the pixel (colour code 1 byte) |
| Screen | Input | Segment address of the screen (Typically 0xA000) |
| Build | Output | Code produced by the component |
| Exception | Output | Indicates any build exceptions detected by the component. |

Figure 36B:
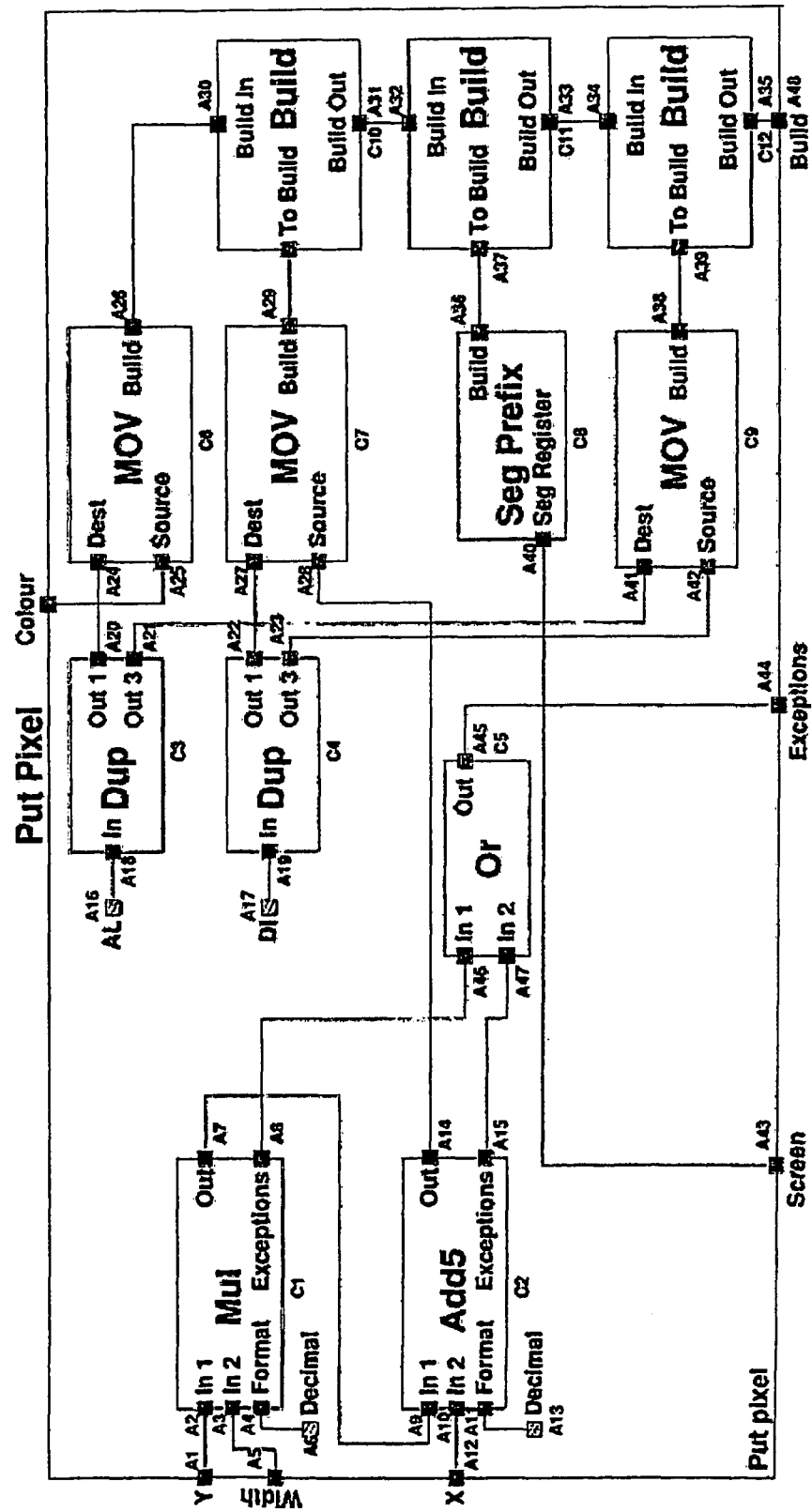
FIG. 36B is an example of an internal schematic of the "Put Pixel" component of FIG. 35A; and, FIG. 36C is an example of a test schematic using the "put Pixel" component of FIG. 35A.

FIG. 36B shows the internal schematic for the "Put Pixel" component. This component uses the "Add5" component from before, plus a number of new components (Mul, Mov, Seg Prefix, and Build).

An outline of the components is given in table 6 below.

All of the pixels on the screen are stored in video memory—which is just a certain set of addresses in normal memory. Changing anything in those areas of memory results in a change on the screen. Memory for IBM PCs is referenced by segment and offset. The segment selects large regions of memory, while the offset allows access to all the locations with in a segment. The screen memory is located at the segment address A000 hexadecimal. The offset determines the position of the pixel, and the value stored at that offset determines the colour of the pixel.

TABLE 6

| Component | Description |
| --- | --- |
| Mul | Similar to the Add5 except that it performs a multiply. |
| Mov | x86 Move assembly instruction. This creates machine code for move. |
| Seg Prefix | Calculates the prefix for the next move instruction based on which segment register is specified. For example: x86 segment register es corresponds to 38 in hexadecimal. |
| Build | Concatenates the code produced by two components. |

The offset of any point (x, y) on the screen is given by (y*width)+x as the screen image is store as a linear array, one row at a time. The multiply (C1) and add (C2) perform this calculation.

The "Put Pixel" component assumes that the screen has been set to the correct video mode, and that the segment register specified by the screen agent is set to A000 hexadecimal.

The "Put Pixel" component creates three MOV assembly instructions. The pixel colour is moved in to the AL register with C3 and C6. The calculated pixel offset (A14) is then moved into the DI register by C4 and C7. Then finally the value in the register containing the colour (AL) is moved to the memory location described by the value in the segment register and the value in the register containing the offset (AL→Segment:DI).

The assembly instructions use the MOV component, which takes a source and destination, and outputs the appropriate hexadecimal machine code for the requested MOV instruction.

The code produced by the individual components is collected and combined by the build components producing the deliverable executable code out the Build agent (A48).

This may be achieved using chaining, as will now be described.

In particular, in this example, the putpixel component is adapted to generate executable code which is provided via a build agent A48 as shown. In general, the resultant executable code will, when executed by a suitable processing system, cause the processing system to position a pixel at a required location on a screen.

The executable code will need to be constructed at a specific memory location on a root server, and the agents in the schematic will therefore need to know the memory location at which the executable code is to be constructed.

In order to achieve this, a build bundle formed from a bundle of appropriate agents required to construct the executable code, is provided by the root server. This will typically be achieved by having the root server implement appropriate agents as required. In this case, the payloads of agents in the build bundle will include details of the required memory locations. Thus the build bundle will specify memory locations at which specific data is to be constructed.

The root server transfers the build bundle to the build agent A48 and this is in turn handed off to the build output agent A35 of the build component C12. The bundle is then transferred back via the agents A34, A33, A32, A31, A30 to the agent A26. This allows the move component C6 to generate a move assembly instruction and include this as a payload within the build bundle as required. The move assembly instruction which is provided in the build bundle will be associated with a respective memory location as defined in the build bundle by the root server.

The build bundle, having been modified in this manner, is then transferred back via the agents A26, A30 to the agent A29 of the move component C7. The move component C7 will generate a corresponding move instruction and include this in the build bundle, allowing the build bundle to be transferred back via the agents A31, A32, A37 to the agent A36. In this case, the seg prefix component C8 will calculate a prefix for a next move instruction and include this in the build bundle as a respective payload before transferring the build bundle back via the agents A37, A33, A34, A39 to the agent A38. The move component C9 will then insert a further instruction before providing the build bundle back to the build agent A48 and hence back to the root server.

In the above example, the path of the build bundle through the putpixel component passes through the agents A48-A35-A34-A33-A32-A31-A30-A26-A30-A29-A31-A32-A37-A36-A37-A33-A34-A39-A38-A39-A35-A48 to form a chain.

Accordingly, it will be appreciated that in this instance the put pixel component is adapted not only to receive inputs at the agents X,Y, WIDTH, as required but also to receive a build bundle via the build output A48. In this case, as soon as data is received at a respective one of the inputs X,Y, WIDTH, this will be transferred onto and processed by the corresponding sub-components as required. Thus, inputs may be reacted to as soon as they are received.

Sixth Specific Example

Figure 36C:
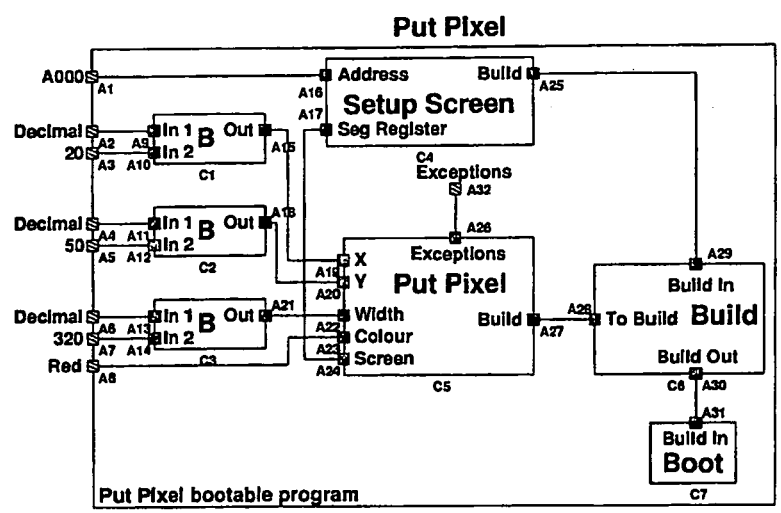

The final specific example demonstrates the usage of the Put Pixel component of FIG. 36A to create stand-alone program as detailed in FIG. 36C.

The "Put Pixel" component is used in conjunction with a "Setup Screen" component—responsible for changing the video mode and setting a segment register to the value of the screen memory. The address of the screen memory is input to the "Put Pixel" component, and the outputs are the bytes corresponding to the code produced, and the segment register used to store the memory, which is used by the put pixel component. The program is to be booted from a floppy drive, and will clear the screen (from the setup screen component) and then display a single pixel at location 20,50 of colour red.

The put pixel component gets its inputs from number bundles—bundles containing numbers and the corresponding formats of the numbers—which are input to the agents x, y, and width. The colour input is input directly from an internal agent of the root schematic. As mentioned above, the segment register used to store the segment address of video memory is input from the setup screen component. The output of the Put Pixel component, build, delivers the bytes generated by the component to a build component which appends the bytes to the bytes produced by the setup screen component. The Build component then delivers the complete program to a Boot component, which is responsible for correctly formatting the bytes as required for a boot disk.

APPENDIX C

Figure 37A:
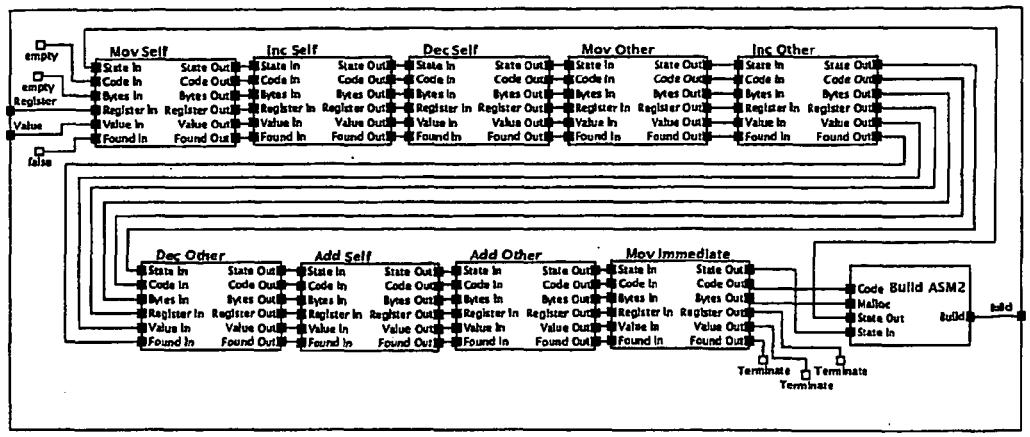

Variable Context Dependency will now be described with respect to an assign component used the internal schematic of which is shown in FIG. 37A.

The Assign component generates code that when executed will assign a specified numerical value (agent value) into a specified register (agent register). The Assign component works in conjunction with the build chain to calculate and record the known value of each register in the CPU, after each assignment. This information represents the state of the machine and in effect, acts as the context in which the assign component operates.

Machine State

The machine state records whether each register contains a value that can be determined at construction time, and if so what that value is. The value of a register becomes unknown if its value can only be determined at run time. In the following example the machine state corresponds to an XML payload with the following format:

```
<eax>A</eax>
<ebx>B</ebx>
<ecx>C</ecx>
<edx>D</edx>
``` where A, B, C or D correspond to a decimal numerical value of the register or the string "unknown". For example:

```
<eax>0</eax>
<ebx>1</ebx>
<ecx>unknown</ecx>
<edx>10</edx>
```

It will be appreciated that this example only tracks the machine state of four of the registers of the x86 CPU, and that this can be extended and modified depending on various CPU architectures.

Components

All the components in the build must support the machine state service, including the Init_elf, int 0x80, Bcat and Assign components. The Init_elf component initialises the build chain with the start up machine state of a Linux executable, which corresponds to the registers eax, ebx, ecx, and edx all containing a value of 0. The Assign component sets the value of one register entry in the machine state to match the assigning register and value. Int 0x80 component sets the eax entry in the machine state to "unknown" as the code generated by this component corresponds to a system call, that modifies the value of the register eax at run time. Bcat forms part of the build chain and supports the machine state by providing a machine state chain in parallel with the code chain, allowing each component to receive the machine state from the previous component in the chain and deliver the updated machine state to be next component.

This example demonstrates context dependant coding principally with the Assign component. In particular, an example of the internal schematic of the Assign component is shown in FIG. 37A.

As shown the Assign component is formed from a number of sub-components, the functionality of which is summarised in Table 7. Each of these components implement one rule for achieving an assignment of a register to a specified value. All these components, except Mov immediate, produce resulting code that is dependant on the known machine state. Mov immediate is a fall back position if no context information in available. These components are private components, meaning that they are not designed to be available on the open market. They merely assist in simplifying the design of the Assign component in order to be managed.

TABLE 7

| Priority | Rule | Description |
|---|---|---|
| 1 | Mov Self | If the specified register contains the assigned value then no code is required. |
| 2 | Inc self | If the specified register contains the value one less than the assigned value then increment the specified register |
| 3 | Dec self | If the specified register contains the value one more than the assigned value then decrement the specified register. |
| 4 | Mov other | If another register contains value to be assigned then copy value it from there. |
| 5 | Inc other | If another register contains the value−1, then copy and increment. |
| 6 | Dec other | If another register contains the value+1, then copy and decrement. |
| 7 | Add self | If the specified register has a known value then add an appropriate constant. |
| 8 | Add other | If any other register are known then select randomly, copy and add a constant to get the desired value. |
| 9 | Mov immediate | Assign value to a register directly. |

Each rule is tested in order of priority. If a match is found, then the calculated code is output and subsequent rule components pass the resulting code through to the Build ASM2 component, which inserts the code and updated machine state into the build chain.

An example of the external schematic of the Add Other component is shown in FIG. 8. FIGS. 37B-E show the internal schematics of the Add Other component. If a previous component has already performed the assign service then the Found In agent will receive "true", triggering the build of the schematic shown in FIG. 37C. This schematic simply passes through the results provided by the previous rule components.

Figure 37D:
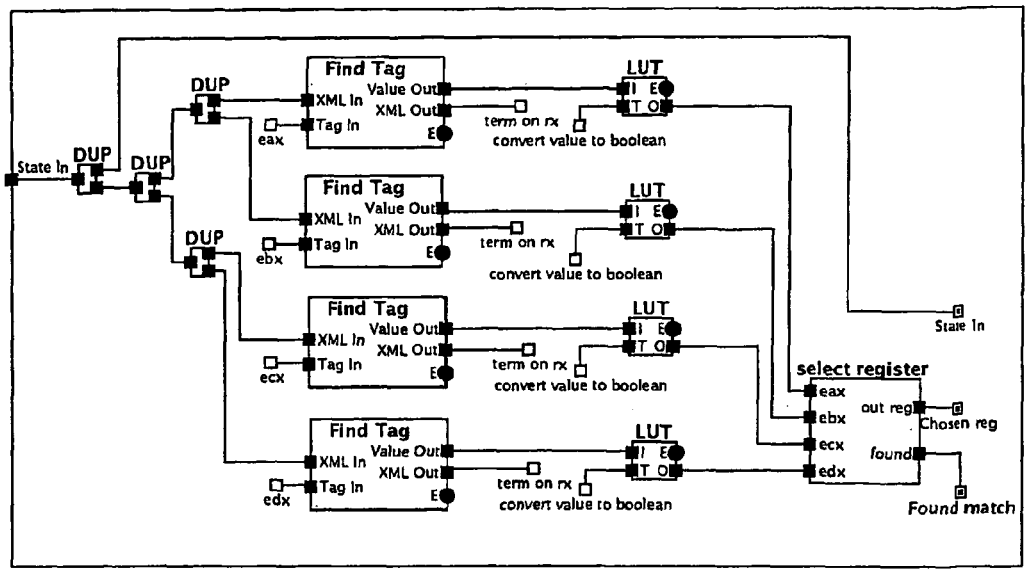

If agent Found In is "false" then the schematic shown in FIG. 37D is built. This schematic extracts each register entry from the machine state information then tests whether the register has a known value. A single register that has a known value is chosen by the select register component. If multiple registers have a known value then the select register component chooses randomly. This results in a dithering in the output code, as the code can vary even when the context and requirements are identical.

Figure 37E:
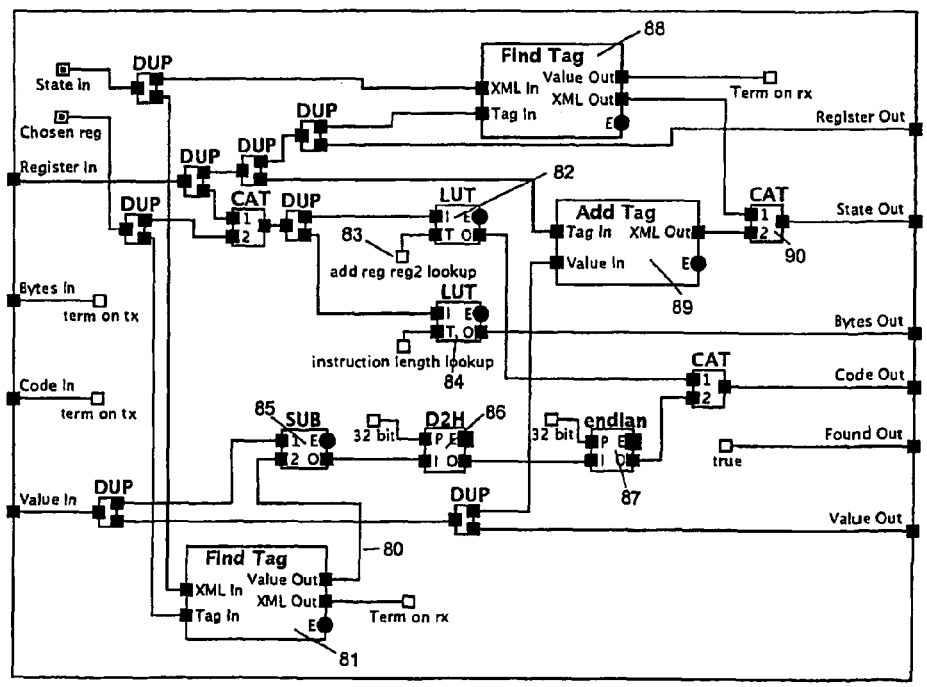

In FIG. 37D, the agent Found match triggers the construction of schematics FIG. 37C or FIG. 37E. If no registers with a known value were found then FIG. 37C is built. This occurs when the Add Other rule didn't match the machine state context FIG. 37C simply passes through the requirements to the next rule component, and terminates the agent Chosen reg generated by FIG. 37D. If a match was found then FIG. 37E is built. This schematic generates the appropriate code and updates the machine state.

This schematic generates machine code that has the following structure in assembly code:

Mov Reg1, Reg2

Add Reg1, K where Reg1 is the register to be assigned to, Reg2 is the register that contains a known value, and K is the number that needs to be added to the value in Reg2 to obtain the required assignment value. calculates the difference between the known value of the register.

Reg1 is specified by the payload received by the agent Register In, and corresponds to one of "eax", "ebx", "ecx", "edx". Reg2 is specified by the agent Chosen reg as a result of a search of known registers in by FIG. 37D. K is calculated from the difference between the known value of Reg2 (80), extracted from the machine state by component 81, and the required assignment value specified by agent Value In.

The generated machine code is calculated in two parts, the first corresponding to:

Mov Reg1, Reg2

Add Reg1 and the second corresponding to the value K. The first part is calculated using a lookup table component 82 to transform the Reg1, Reg2 information into the appropriate machine code.

An example of the payload delivered by agent 83 specifying the lookup table is as follows:

```
<protocol>
    <protocol_name>lookup table</protocol_name>
    <protocol_data>
        <entry>
            <input>eaxeax</input>
            <output>89C005</output>
        </entry>
        <entry>
            <input>eaxebx</input>
            <output>89D805</output>
        </entry>
        .....
    </protocol_data>
</protocol>
```

This lookup table contains one entry for each combination of Reg1 and Reg2, and so for registers eax, ebx, ecx, and edx there are 16 entries. A second lookup table 84 outputs the number of bytes corresponding to the code being delivered, including the code for K.

Components 85, 86 and 87 calculate K. The endian component 87 byte swaps the number to make it compatible with x86. This is then concatenated with the instruction machine code to generate the final output code. In addition to generating code the machine state is updated by components 88, 89 and 90.

Hello World Example

An example of this will now be described with respect to a "hello world" program. In particular, a conventional example of a "hello world" program written in "assembly like" code generating components is set out below.

```
BITS32
GLOBAL _start
section .text
_start:
    mov ebx, 1          ;standard out
    mov eax, 4          ;system write system call
    mov ecx, string     ;Pointer to string
    mov edx, 11         ;Length of string
    int 0x80            ;start system call
    mov ebx, 0          ;exit error code
    mov eax, 1          ;System exit system call
    int 0x80            ;start system call
section .data
    string db 'hello world'
```

This would be assembled and linked using:
nasm -f elf hello. asm -o hello.o -l hello.lst
ld -s hello.o. -o hello The disassembly of the executable is shown in Table 8. This shows the machine code and was created with:
ndisasm -e 128 -b 32 hello As a comparison with conventional code the same program was created using the assign component outlined above. This was achieved using a root schematic shown in FIG. 38A.

Figure 38A:
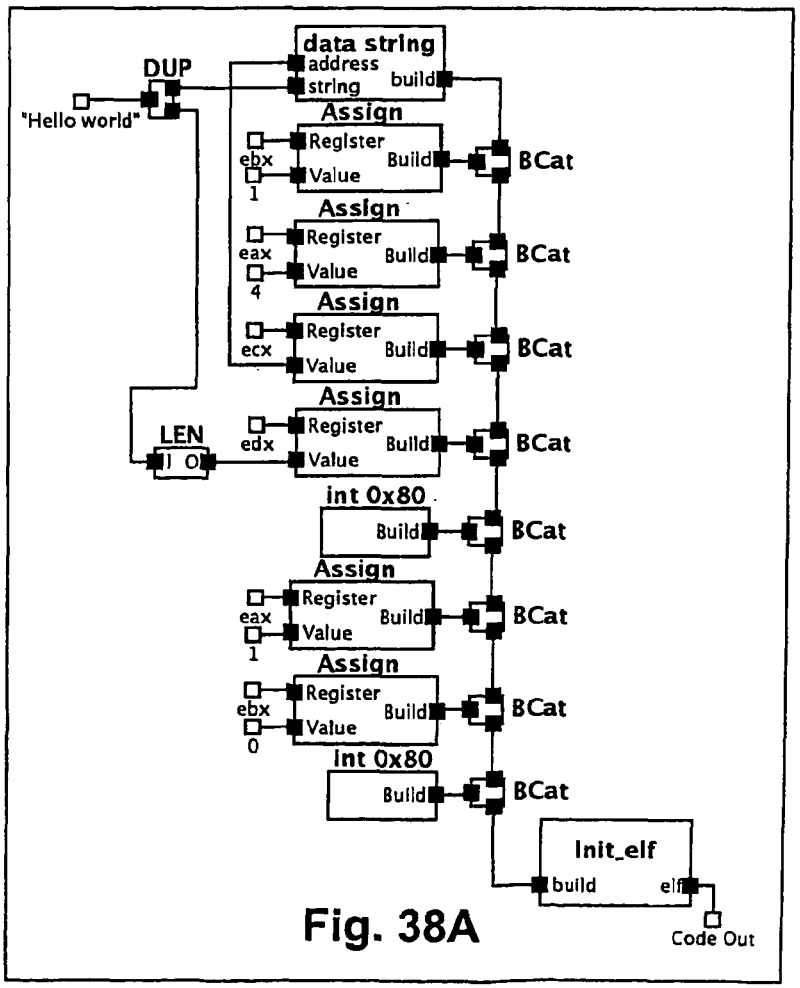
FIGS. 38A and 38B are examples of a root schematic for implementing "Hello World" and a double print "Hello World" examples.

For completeness the XML document representing the schematic shown in FIG. 38A is shown below:

```
<?xml version="1.0" encoding="UTF-8 ?>
<schematic>
```

```
    <name>test</name>
    <author>none</author>
    <description>undescribed</description>
    <w>400</w>
    <h>460</h>
    <agent>
        <x>371</x>
        <y>412</y>
        <agent_id>2147483647<agent_id>
        <agent_name>Code Out</agent_name>
        <agent_description></agent_description>
        <auto_term>manual</auto_term>
        <persistance>persistance</persistance>
        <payload></payload>
        <optional>false</optional>
        <auto_payload>false</auto_payload>
        <hand_off>true</hand_off>
        <sound_file></sound_file>
    </agent>
    ...
    <component>
        <filename>/dream/asm/techreview/assign.comp</filename>
        <schematic_component_id>1</schematic_component_id>
        <x>190.0</x>
        <y>66.0</y>
    </component>
    ...
    <link>
        <half_link>
            <schematic_component_id>10</schematic_component_id>
            <agent_id>3</agent_id>
        </half_link>
        <half_link>
            <schematic_component_id>17</schematic_component_id>
            <agent_id>1</agent_id>
        <half_link>
        <anchor>
            <x>190.0</x>
            <y>66.0</y>
        </anchor>
    </link>
    ...
</schematic>
```

A comparison of the resulting codes generated by conventional techniques and in accordance with the invention are set out in Table 8.

TABLE 8

| Generated with FIG. 38A (context dependant) | | Conventional (context independent) | | Function |
|---|---|---|---|---|
| 43 | inc ebx | BB01000000 | mov ebx, 0x1 | Print |
| 0504000000 | add eax, 0x4 | B804000000 | mov eax, 0x4 | string |
| 81C1D8900408 | add ecx, 0x80490d8 | B9A4900408 | mov ecx, 0x80490a4 | |
| 81C20B000000 | add edx, 0xb | BA0B000000 | mov edx, 0xb | |
| CD80 | int 0x80 | CD80 | int 0x80 | |
| 89D8 | mov eax, ebx | BB00000000 | mov ebx, 0x0 | System |
| 4B | dec ebx | B801000000 | mov eax, 0x1 | exit |
| CD80 | int 0x80 | CD80 | int 0x80 | |
| 68656C6C6F20 | 'hello world' | 68656C6C6F20 | 'hello world' | Data |
| 776F726C64 | | 776F726C64 | | section |

Accordingly, it will be appreciated that both codes are functionally identical, and include two logical blocks in the form of print string and system exit. However, the context dependent code makes use of the context in which it is run, and therefore is of a significantly reduced size, which in this example is 24 bytes against 34 bytes for the conventional technique For example, the conventional context independent code, if implemented as a C program hello.c:

```
main( ){
    printf("hello world");
}
``` when statically linked and stripped using:
  gcc -static hello.c -o hello
  strip hello
results in an executable that is 377 kB. This program uses printf, which is generic and context independent, and obviously highlights code bloat.

In this case, if the context independent conventional print string code were reused, only the string pointer (0x80490A4) would need to be modified. The system exit is completely context independent and would not require any modification for reuse.

However, in the context dependent version, the print string will only work if eax, ebx, ecx and edx are zero, which is the start up state for an executable in Linux. Additionally system exit will only work when ebx is 1. In the current example the system exit exploits the fact that ebx is initialised to 1 by the print string code.

Double Print String "Hello World"

Figure 38B:
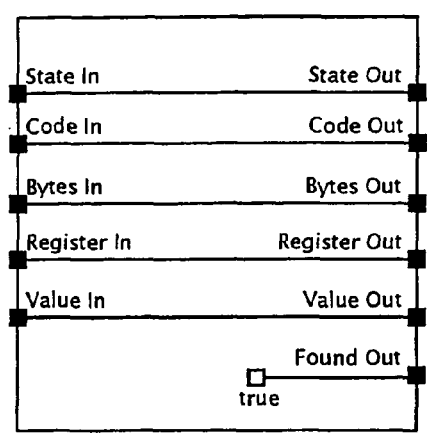
Figure 38B:
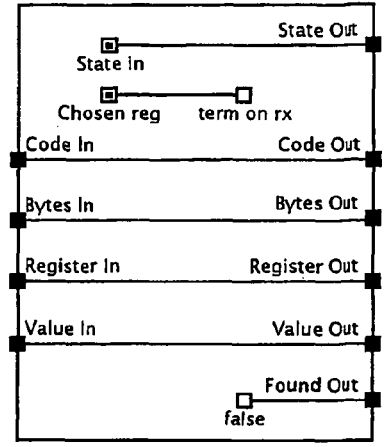
Figure 38B:
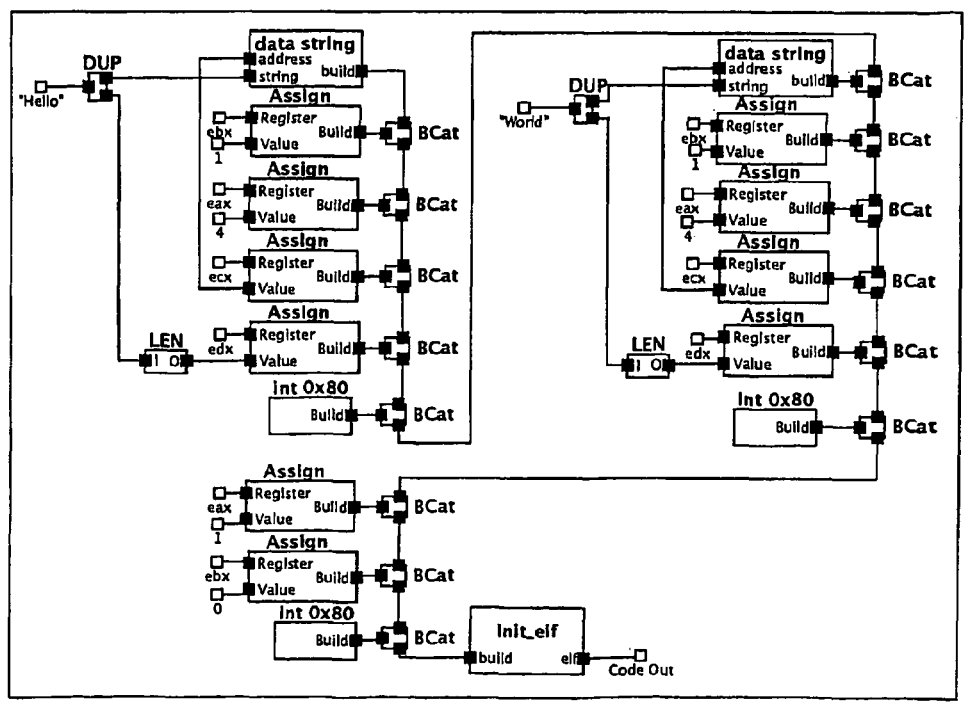

This example uses two print string system calls to print "Hello" then "world". An example of a schematic for performing this in accordance with the invention is shown in FIG. 38B, with a comparison of the resultant code against hand optimised context independent code, with results shown in Table 9. The conventional assembly code is as follows:

```
BITS32
GLOBAL _start
section .text
_start:
    mov ebx, 1          ;standard out
    mov eax, 4          ;system write system call
    mov ecx, string1    ;Pointer to string1
    mov edx, 6          ;Length of string1
    int 0x80            ;start system call
    mov ebx, 1          ;standard out
    mov eax, 4          ;system write system call
    mov ecx, string2    ;Pointer to string2
    mov edx, 5          ;Length of string2
    int 0x80            ;start system call
    mov ebx, 0          ;exit error code
    mov eax, 1          ;System exit system call
    int 0x80            ;start system call
section .data
    string1 db 'hello '
    string2 db 'world'
```

In this example, the context independent example is hand optimised, and as will be appreciated by those skilled in the art, is significantly reduced in size as compared to the equivalent standard C++ program. Of interest is the setting of ecx to the pointer of string 2 in the second print string of the code valley output (add ecx, 0x6). In this case the previous print string initialised ecx to the value of string1. The address of string2 is calculated relative to the previous value of ecx. This is achieved using the Add self in the assign component.

TABLE 9

| (context dependant) | | Conventional (context independent hand optimised) | | Function |
|---|---|---|---|---|
| 43 | inc ebx | BB01000000 | mov ebx, 0x1 | Print |
| 0504000000 | add eax, 0x4 | B804000000 | mov eax, 0x4 | string |
| 81C1D8900408 | add ecx, 0x80490d8 | B9B8900408 | mov ecx, 0x80490b8 | |
| 81C206000000 | add edx, 0x6 | BA06000000 | mov edx, 0x6 | |
| CD80 | int 0x80 | CD80 | int 0x80 | |
| 89F8 | mov eax, edi | BB01000000 | mov ebx, 0x1 | Print |
| 0504000000 | add eax, 0x4 | B804000000 | mov eax, 0x4 | string |
| 81C106000000 | add ecx, 0x6 | B9BE900408 | mov ecx, 0x80490be | |
| 4A | dec edx | BA05000000 | mov edx, 0x5 | |
| CD80 | int 0x80 | CD80 | int 0x80 | |
| 89D8 | mov eax, ebx | BB00000000 | mov ebx, 0x1 | System |
| 4B | dec ebx | B801000000 | mov eax, 0x4 | exit |
| CD80 | int 0x80 | CD80 | int 0x80 | |
| 41 bytes, 13 instructions | | 72 bytes, 13 instructions | | |

Note:
the data section contains the strings has been omitted as it is common in both cases, except for the starting address.

In this example, on each generation of the code there is a random output from Mov other, Inc other, Dec other, and Add other. Each of these select randomly from multiple solutions, as shown in Table 10. This shows that even without changing the requirements or context that different outputs are generated that satisfy the requirements of the application whilst being functionally the same.

TABLE 10

| (context dependant 2) | | (context dependant 3) | | Function |
|---|---|---|---|---|
| 43 | inc ebx | 43 | inc ebx | Print |
| 0504000000 | add eax, 0x4 | 0504000000 | add eax, 0x4 | string |
| 81C1D8900408 | add ecx, 0x80490d8 | 81C1D8900408 | add ecx, 0x80490d8 | |
| 81C206000000 | add edx, 0x6 | 81C206000000 | add edx, 0x6 | |
| CD80 | int 0x80 | CD80 | int 0x80 | |
| 89D0 | mov eax, edx | 89D0 | mov eax, ebx | Print |
| 05FEFFFFFF | add eax, 0xfffffffe | 0503000000 | add eax, 0x3 | string |
| 81C106000000 | add ecx, 0x6 | 81C106000000 | add ecx, 0x6 | |
| 4A | dec edx | 4A | dec edx | |
| CD80 | int 0x80 | CD80 | int 0x80 | |
| 89D8 | mov eax, ebx | 89D8 | mov eax, ebx | System |
| 4B | dec ebx | 4B | dec ebx | exit |
| CD800 | int 0x80 | CD80 | int 0x80 | |

The claims defining the invention are as follows:

1. A method of generating computer executable code, the method including:
   a) determining a sequence of instructions to be performed by the computer executable code;
   b) selecting a plurality of components, each component representing a respective component server connected to a network of component servers, at least some of the components servers being used in performing data manipulation to generate a respective fragment of binary executable code corresponding to one or more machine code instructions;
   c) defining a component combination including the selected components and interconnections between the components, the defined interconnections being indicative of the sequence of instructions and being based on the data manipulation to be performed by the respective component servers that correspond to the selected components and being defined by analyzing the sequence of instructions;
   d) implementing the respective component server corresponding to each component in the component combination;
   e) causing the component servers that correspond to components to communicate with other component servers that correspond to other components through the network of component servers in accordance with the defined interconnections, thereby allowing each component server to determine a context for the code fragment to be generated;
   f) causing the component servers that correspond to the components to generate code fragments in accordance with the determined context, so as to generate machine code instructions; and,
   g) combining the code fragments at a root component server connected to the network of component servers, in accordance with the component combination and hence in accordance with the sequence of instructions, to thereby generate the computer executable code by:
      i) having component servers that correspond to components communicate with other component servers that correspond to other components;
      ii) determining from the communication a construction site location at the root component server; and,
      iii) transferring, by the corresponding component servers or other intermediate recipient component servers, generated code fragments to the construction site location, so that code fragments from multiple components are concatenated on the construction site to thereby form the executable code.

2. A method according to claim 1, wherein the method includes:
   a) having component servers determine a memory allocation requirement for code fragments to be generated;
   b) providing the memory allocation requirement to a construction site;
   c) having the construction site allocate a memory location based on the memory allocation requirement; and,
   d) providing an indication of the allocated memory location to the components servers, thereby allowing generated code fragments to be written into the allocated memory location.

3. A method according to claim 1, wherein the code fragments correspond to one or more CPU instructions.

4. A method according to claim 1, wherein the method includes:
   a) displaying details of a plurality of components; and,
   b) allowing a user to select components for inclusion in the component combination.

5. A method according to claim 1, wherein the method includes selecting from a plurality of components representing respective component servers able to generate a code fragment corresponding to a given instruction.

6. A method according to claim 1, wherein the method includes selecting the plurality of components from a number of available components based on a number of factors including one or more of:
   a) an entity implementing the component server corresponding to the component;
   b) a cost;
   c) a location of the entity implementing the component server that corresponds to the component;
   d) a popularity of the component;
   e) data format/types that can be received by or output from the component server that corresponds to the component; and,
   f) ratings given to the component.

7. A method according to claim 1, wherein the context includes any one or more of:
   a) a state of the executable at start-up;
   b) a state of registers from the previous instructions;
   c) a state of the stack and memory;
   d) an allocation of registers, stack and memory;
   e) a number of components in the component combination;
   f) interconnections to other components; and
   g) a construction site location where a generated code fragment is to be placed.

8. A method according to claim 1, wherein the method includes:

a) identifying a plurality of data manipulation operations to be performed;
b) for each data manipulation operation:
   i) presenting a plurality of components to the user, each of the components representing respective component servers for performing the data manipulation operation and each provided by a different component supplier, each component including associated data identifying its associated component supplier, price, performance rating, and any data formats that can be received and/or produced by the respective component server; and,
   ii) a user selecting one of the plurality of components and paying the associated price to use the component; and
c) combining the plurality of selected components to perform the plurality of data manipulation operations.

* * * * *